US010774228B2

(12) United States Patent
Sato et al.

(10) Patent No.: US 10,774,228 B2
(45) Date of Patent: *Sep. 15, 2020

(54) MICROCAPSULE, AQUEOUS DISPERSION, METHOD FOR MANUFACTURING AQUEOUS DISPERSION, AND IMAGE FORMING METHOD

(71) Applicant: FUJIFILM CORPORATION, Minato-ku, Tokyo (JP)

(72) Inventors: Noriaki Sato, Kanagawa (JP); Ichiro Koyama, Kanagawa (JP); Shota Suzuki, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/043,184

(22) Filed: Jul. 24, 2018

(65) Prior Publication Data

US 2018/0346742 A1   Dec. 6, 2018

Related U.S. Application Data

(63) Continuation of application No. PCT/JP2017/002173, filed on Jan. 23, 2017.

(30) Foreign Application Priority Data

Feb. 5, 2016 (JP) ................. 2016-021361

(51) Int. Cl.
| | |
|---|---|
| *C09D 11/30* | (2014.01) |
| *B01J 13/16* | (2006.01) |
| *C08F 2/50* | (2006.01) |
| *C08L 75/00* | (2006.01) |
| *B41J 2/21* | (2006.01) |
| *B41M 5/00* | (2006.01) |
| *B41M 7/00* | (2006.01) |

(52) U.S. Cl.
CPC .............. *C09D 11/30* (2013.01); *B01J 13/16* (2013.01); *B41J 2/2107* (2013.01); *B41M 5/0023* (2013.01); *B41M 7/0081* (2013.01); *C08F 2/50* (2013.01); *C08L 75/00* (2013.01)

(58) Field of Classification Search
CPC  B41M 5/0011; B41M 5/0017; B41M 5/0047; B41M 7/00; B41M 7/0072; B41M 5/52; B41M 5/5218; B41J 2/04588; B41J 2/04595; B41J 2/04586; B41J 2/14274; B41J 11/0015; B41J 11/002; B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/161; B41J 2/1623; B41J 2202/00; B41J 2202/03; B41J 2/14201; B41J 2/045; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52
See application file for complete search history.

(56) References Cited

U.S. PATENT DOCUMENTS

| | | | |
|---|---|---|---|
| 5,646,203 A | 7/1997 | Etoh et al. | |
| 2004/0253544 A1* | 12/2004 | Oshima | ................. B41C 1/1008 430/302 |
| 2014/0002556 A1* | 1/2014 | Sato | ...................... B41J 2/2107 347/100 |
| 2017/0022379 A1* | 1/2017 | Loccufier | ................. B01J 13/14 |
| 2017/0218565 A1* | 8/2017 | Loccufier | ................. D06P 1/18 |
| 2018/0320012 A1* | 11/2018 | Sato | ........................ B01J 13/16 |
| 2019/0023918 A1 | 1/2019 | Koyama et al. | |
| 2019/0023920 A1 | 1/2019 | Koyama et al. | |
| 2019/0023921 A1 | 1/2019 | Sato et al. | |

FOREIGN PATENT DOCUMENTS

| | | |
|---|---|---|
| CN | 1112948 A | 12/1995 |
| CN | 101230220 A | 7/2008 |
| CN | 103497589 A | 1/2014 |
| CN | 103951774 A | 7/2014 |
| EP | 1442877 A2 | 8/2004 |
| EP | 2933374 A | 10/2015 |

(Continued)

OTHER PUBLICATIONS

International Search Report issued in International Application No. PCT/JP2017/002173 dated Mar. 7, 2017.
Written Opinion of the ISA issued in International Application No. PCT/JP2017/002173 dated Mar. 7, 2017.
Office Action dated Jun. 17, 2019, issued by the EPO in corresponding EP Patent Application No. EP17747245.3.
Extended European Search Report dated Nov. 22, 2018, issued in corresponding EP Patent Application No. 17747245.3.
Office Action dated Nov. 19, 2019, issued by the EPO in corresponding EP Patent Application No. EP17747245.3.
English language translation of the following: Office action dated Jul. 3, 2020 from the SIPO in a Chinese patent application No. 201780009336.6 corresponding to the instant patent application.

*Primary Examiner* — Manish S Shah
(74) *Attorney, Agent, or Firm* — SOLARIS Intellectual Property Group, PLLC

(57) ABSTRACT

Provided are an ink composition including water; and a microcapsule which includes: a shell that has a three-dimensional cross-linked structure containing at least one bond selected from a urethane bond or a urea bond, and including a core that contains a di- or lower functional polymerizable compound, a tri- or higher functional polymerizable compound, and a photopolymerization initiator, in which a proportion of the di- or lower functional polymerizable compound is 20% by mass or more with respect to a total mass of the di- or lower functional polymerizable compound and the tri- or higher functional polymerizable compound, and an image forming method using the ink composition.

15 Claims, No Drawings

(56) References Cited

FOREIGN PATENT DOCUMENTS

| | | | |
|---|---|---|---|
| JP | S64-7376 B2 | 2/1989 | |
| JP | 2005-99667 A | 4/2005 | |
| JP | 2005-255958 A | 9/2005 | |
| JP | 2006-89577 A | 4/2006 | |
| JP | 2006-205394 A | 8/2006 | |
| JP | 2006-205397 A | 8/2006 | |
| JP | 2007-292961 A | 11/2007 | |
| JP | 2009-6544 A | 1/2009 | |
| JP | 2009006544 A * | 1/2009 | ................ B41J 2/01 |
| JP | 2012-139643 A | 7/2012 | |
| JP | 2012-140574 A | 7/2012 | |
| WO | 2015/158652 A2 | 10/2015 | |
| WO | 2015/158654 A1 | 10/2015 | |
| WO | 2017135084 A1 | 8/2017 | |
| WO | 2017135085 A1 | 8/2017 | |
| WO | 2017135087 A1 | 8/2017 | |
| WO | 2017135088 A1 | 8/2017 | |

* cited by examiner ically reactive compound that is heated and/or irradiated with infrared rays so as to form a reaction product, and an average particle diameter of capsules is smaller than 4 μm (for example, refer to WO2015/158654A).

MICROCAPSULE, AQUEOUS DISPERSION, METHOD FOR MANUFACTURING AQUEOUS DISPERSION, AND IMAGE FORMING METHOD

CROSS-REFERENCE TO RELATED APPLICATIONS

This application is a continuation application of International Application No. PCT/JP2017/002173, filed Jan. 23, 2017, the disclosure of which is incorporated herein by reference in its entirety. Further, this application claims priority from Japanese Patent Application No. 2016-021361, filed Feb. 5, 2016, the disclosure of which is incorporated herein by reference in its entirety.

BACKGROUND OF THE INVENTION

1. Field of the Invention

The present disclosure relates to a microcapsule, an aqueous dispersion, a method for manufacturing an aqueous dispersion, and an image forming method.

2. Description of the Related Art

As image forming methods for forming an image on a substrate, there are an electrophotographic method, a sublimation-type thermal transfer method, a fusion-type thermal transfer method, an ink jet method, and the like.

The ink jet image forming method has advantages such as being able to be performed using an inexpensive device and incurring low running costs because ink can be efficiently used.

As one of the ink jet image forming methods, there is an image forming method in which an ink jet ink that can be cured by being irradiated with active energy rays such as ultraviolet rays is used.

As examples of the ink jet ink, there is proposed an ink jet ink containing water and a capsule in which a surround of a core is covered with a polymer shell, in which the capsule is dispersed in water by a dispersing group covalently bonded to the polymer shell, the core contains at least one chemically reactive compound that is heated and/or irradiated with infrared rays so as to form a reaction product, and an average particle diameter of capsules is smaller than 4 μm (for example, refer to WO2015/158654A).

In addition, as examples of other ink jet inks, there is proposed an ink jet ink containing water and a capsule in which a surround of a core is covered with a polymer shell, in which the capsule is dispersed in water by a dispersing group covalently bonded to the polymer shell, the core contains at least one chemically reactive compound that is irradiated with ultraviolet rays so as to form a reaction product and contains a photopolymerization initiator, and an average particle diameter of capsules is smaller than 4 μm (for example, refer to WO2015/158652A).

In addition, as the microcapsule, there is proposed a microcapsule containing a vinyl compound and a photopolymerization initiator as a core substance (for example, refer to JP1989-7376B (JP-S64-7376B)).

SUMMARY OF THE INVENTION

In a case where the core of the microcapsule contains a polymerizable compound, irradiation with light is performed, leading to polymerization between adjacent microcapsules, and therefore a film is formed. In this case, depending on the types of the polymerizable compound to be contained in the core, in one aspect, the formed film becomes to have excellent adhesiveness to a substrate but be inferior in hardness, whereas in the other aspect, the formed film becomes to have excellent hardness but be inferior in adhesiveness to a substrate. Therefore, it tends to be difficult to form a film in which adhesiveness to a substrate is compatible with film hardness, which are incompatible abilities.

In a case of the microcapsules contained in the ink jet ink disclosed in WO2015/158654A and WO2015/158652A, a film tends to have excellent adhesiveness to a substrate but be inferior in hardness. In addition, in a case of the microcapsule disclosed in JP1989-7376B (JP-S64-7376B), a film tends to have excellent hardness but be inferior in adhesiveness to a substrate.

The present disclosure has been made in view of the above circumstances, and an object thereof is to provide a microcapsule by which a film having excellent adhesiveness to a substrate and hardness is obtained, an aqueous dispersion, and a method for manufacturing an aqueous dispersion, and an image forming method by which an image having excellent adhesiveness to a substrate and hardness is obtained.

Specific means for achieving the object includes the following aspects.

<1> A microcapsule comprising: a shell that has a three-dimensional cross-linked structure containing at least one bond selected from a urethane bond or a urea bond; and a core that is in the interior of the shell and contains a di- or lower functional polymerizable compound, a tri- or higher functional polymerizable compound, and a photopolymerization initiator, in which a proportion of the di- or lower functional polymerizable compound is 20% by mass or more with respect to a total mass of the di- or lower functional polymerizable compound and the tri- or higher functional polymerizable compound.

<2> The microcapsule according to <1>, in which the shell has a hydrophilic group.

<3> The microcapsule according to <1> or <2>, in which the shell has a polymerizable group bound by a covalent bond.

<4> The microcapsule according to any one of <1> to <3>, in which a weight-average molecular weight of the di- or lower functional polymerizable compound is 200 to 1000, and a weight-average molecular weight of the tri- or higher functional polymerizable compound is 250 to 1500.

<5> The microcapsule according to any one of <1> to <4>, in which a weight-average molecular weight of the di- or lower functional polymerizable compound is 250 to 500, and a weight-average molecular weight of the tri- or higher functional polymerizable compound is 350 to 1200.

<6> The microcapsule according to any one of <1> to <5>, in which C═C valence of the di- or lower functional polymerizable compound is 4 mmol/g to 8 mmol/g, and C═C valence of the tri- or higher functional polymerizable compound is 5 mmol/g to 10 mmol/g.

<7> The microcapsule according to any one of <1> to <6>, in which the di- or lower functional polymerizable compound is a difunctional polymerizable compound.

<8> The microcapsule according to any one of <1> to <7>, in which an absolute value of a difference between a solubility parameter of the di- or lower functional polymerizable compound and a solubility parameter of the tri- or higher functional polymerizable compound is 1.5 MPa$^{1/2}$ or less.

<9> The microcapsule according to any one of <1> to <8>, in which the total mass of the di- or lower functional polymerizable compound and the tri- or higher functional polymerizable compound is 30% by mass to 70% by mass with respect to a total solid content of the microcapsule, and the proportion of the di- or lower functional polymerizable compound is 50% by mass to 90% by mass with respect to the total mass.

<10> The microcapsule according to any one of <1> to <9>, in which the photopolymerization initiator contains at least one of a carbonyl compound or an acylphosphine oxide compound.

<11> The microcapsule according to any one of <1> to <10>, in which the core further contains a sensitizer.

<12> An aqueous dispersion comprising: the microcapsule according to any one of <1> to <11>; and water.

<13> The aqueous dispersion according to <12>, further comprising a colorant.

<14> The aqueous dispersion according to <13>, in which a content of an anionic surfactant is 1% by mass or less with respect to a total mass of the aqueous dispersion.

<15> The aqueous dispersion according to any one of <12> to <14>, in which a total solid content of the microcapsule is 50% by mass or more with respect to a total solid content of the aqueous dispersion.

<16> The aqueous dispersion according to any one of <12> to <15>, which is used as an ink jet ink.

<17> A method for manufacturing an aqueous dispersion, comprising: a preparation step of mixing an oil-phase component containing a tri- or higher functional isocyanate compound, a di- or lower functional polymerizable compound, a tri- or higher functional polymerizable compound, and a photopolymerization initiator, with a water-phase component containing water, and emulsifying and dispersing the mixture so as to prepare an aqueous dispersion, in which a proportion of the di- or lower functional polymerizable compound is 20% by mass or more with respect to a total mass of the di- or lower functional polymerizable compound and the tri- or higher functional polymerizable compound.

<18> The method for manufacturing an aqueous dispersion according to <17>, in which at least one of the oil-phase component or the water-phase component contains a compound having a hydrophilic group.

<19> The method for manufacturing an aqueous dispersion according to <17> or <18>, in which the tri- or higher functional isocyanate compound is an isocyanate compound derived from at least one kind selected from isophorone diisocyanate, hexamethylene diisocyanate, trimethylhexamethylene diisocyanate, 1,3-bis(isocyanatomethyl)cyclohexane, m-xylylene diisocyanate, and dicyclohexylmethane 4,4'-diisocyanate.

<20> An image forming method comprising: an application step of applying the aqueous dispersion according to any one of <12> to <16> onto a substrate; and an irradiation step of irradiating the aqueous dispersion applied onto the substrate with active energy rays.

According to the present disclosure, the microcapsule by which a film having excellent adhesiveness to a substrate and hardness is obtained, the aqueous dispersion, and the method for manufacturing an aqueous dispersion, and the image forming method by which an image having excellent adhesiveness to a substrate and hardness is obtained, are provided.

DESCRIPTION OF THE PREFERRED EMBODIMENTS

Hereinafter, specific embodiments of the present invention will be described in detail, but the present invention is not limited to the following embodiments.

In the present specification, a range of numerical values described using "to" means a range including the numerical values listed before and after "to" as a minimum value and a maximum value.

In the numerical value ranges described in a stepwise manner in the present specification, an upper limit value or a lower limit value described in a certain numerical value range may be replaced with an upper limit value or a lower limit value of the numerical value range of other stepwise description. In addition, in the numerical value ranges described in the present specification, an upper limit value or a lower limit value described in a certain numerical value range may be replaced with values shown indicated in examples.

In the present specification, in a case where there are a plurality of substances corresponding to each component in a dispersion, unless otherwise specified, the amount of each component in the dispersion means the total amount of the plurality of substances present in the dispersion.

In the present specification, the term "step" means not only an independent step, but also a step that cannot be clearly distinguished from other steps as long as the intended goal of the step is accomplished.

In the present specification, conceptually, "light" includes active energy rays such as γ-rays, β-rays, electron beams, ultraviolet rays, visible rays, and infrared rays.

In the present specification, the ultraviolet rays are referred to as "Ultra Violet (UV) light" in some cases.

In the present specification, the light emitted from a Light Emitting Diode (LED) light source is referred to as "LED light" in some cases.

In the present specification, "(meth)acrylic acid" conceptually includes both the acrylic acid and the methacrylic acid, "(meth)acrylate" conceptually includes both the acrylate and the methacrylate, and "(meth)acryloyl group" conceptually includes both the acryloyl group and the methacryloyl group.

<Microcapsule>

A microcapsule of the present disclosure includes: a shell that has a three-dimensional cross-linked structure containing at least one bond selected from a urethane bond or a urea bond; and a core that is in the interior of the shell and contains a di- or lower functional polymerizable compound, a tri- or higher functional polymerizable compound, and a photopolymerization initiator, in which a proportion of the di- or lower functional polymerizable compound is 20% by mass or more with respect to a total mass of the di- or lower functional polymerizable compound and the tri- or higher functional polymerizable compound.

The microcapsule of the present disclosure is formed of the outermost shell having the three-dimensional cross-linked structure containing at least one of a urethane bond or a urea bond, and the core which is a region occupying the shell.

An aqueous dispersion of the present disclosure may include only one kind of the microcapsule or may include two or more kinds of the microcapsules.

Whether a microcapsule is the microcapsule can be checked by coating a substrate with an aqueous dispersion liquid of the microcapsule and drying the same so as to obtain a sample for morphological observation, and then cutting the sample so as to observe the cut surface using an electron microscope and the like.

Details of the action mechanism in one embodiment of the present invention are not clear, but it is presumed as follows.

In regard to the microcapsules contained in the ink disclosed in WO2015/158654A and WO2015/158652A, a film tends to have excellent adhesiveness to a substrate but be inferior in hardness. In addition, in regard to the microcapsule disclosed in JP1989-7376B (JP-S64-7376B), a film tends to have excellent hardness but be inferior in adhesiveness to a substrate. As such, in the microcapsule of the related art, there is a tendency that it is difficult to form a film in which adhesiveness to a substrate is compatible with hardness.

In the microcapsule of the present disclosure, the core that is in the interior of the shell contains the di- or lower functional polymerizable compound, the tri- or higher functional polymerizable compound, and the photopolymerization initiator, in which the proportion of the di- or lower functional polymerizable compound is 20% by mass or more with respect to the total mass of the di- or lower functional polymerizable compound and the tri- or higher functional polymerizable compound. The di- or lower functional polymerizable compound is likely to bleed out from the microcapsule after application onto a substrate and thus contributes to improvement of adhesiveness of a film to the substrate. On the other hand, the tri- or higher functional polymerizable compound increases the number of polymerization sites in the film and thus contributes to improvement of hardness of the film. Furthermore, it is considered that the core of the microcapsule contains the di- or lower functional polymerizable compound and the tri- or higher functional polymerizable compound, the di- or lower functional polymerizable compound being contained by a range of a predetermined proportion or more so as to share a function with the tri- or higher functional polymerizable compound, and therefore the film having excellent adhesiveness to a substrate and hardness can be formed.

In the present specification, the phrase "bleed out from the microcapsule" means that components contained in the core of the microcapsule move outside the shell.

[Core of Microcapsule]

The microcapsule has the core to be described later which is in the interior of the shell and contains the di- or lower functional polymerizable compound, the tri- or higher functional polymerizable compound, and the photopolymerization initiator, in which the proportion of the di- or lower functional polymerizable compound is 20% by mass or more with respect to the total mass of the di- or lower functional polymerizable compound and the tri- or higher functional polymerizable compound.

In the present specification, the di- or lower functional polymerizable compound and the tri- or higher functional polymerizable compound will be collectively referred to as "polymerizable compounds" in some cases.

The core may contain a component such as a sensitizer other than the above component.

(Polymerizable Compound)

The core of the microcapsule contains at least one kind of the di- or lower functional polymerizable compound and at least one kind of the tri- or higher functional polymerizable compound, in which the proportion of the di- or lower functional polymerizable compound is 20% by mass or more with respect to the total mass of the di- or lower functional polymerizable compound and the tri- or higher functional polymerizable compound.

The core containing the di- or lower functional polymerizable compound and the tri- or higher functional polymerizable compound allows polymerizable groups contained in these polymerizable compounds to function as polymerizable groups contained in the microcapsule.

The microcapsule has the polymerizable group, which makes it possible that microcapsules adjacent to each other are bonded to each other by irradiation with active energy rays so as to form a film.

The polymerizable group is not particularly limited as long as the polymerizable group is a group allowing a polymerization reaction to occur. As the polymerizable group, a group containing an ethylenic double bond is preferable, and a group containing at least one of a vinyl group or a 1-methylvinyl group is more preferable. As the polymerizable group, a (meth)acryloyl group is particularly preferable from the viewpoints of a polymerization reactivity and hardness of a formed film.

The polymerizable groups are preferably present in a surface portion of the microcapsule (a contact portion with a dispersion medium in a case where the microcapsule is dispersed by the dispersion medium, for example).

The polymerizable groups can be checked, for example, by Fourier transform infrared spectroscopy (FT-IR).

The core of the microcapsule containing the di- or lower functional polymerizable compound and the tri- or higher functional polymerizable compound by the above-described proportion makes the forming of the film having excellent adhesiveness to a substrate and hardness possible.

Particularly, there is a tendency that the di- or lower functional polymerizable compound is likely to bleed out from the microcapsule after the microcapsule is applied onto a substrate and thus contributes to improvement of adhesiveness of the film. In addition, there is a tendency that the tri- or higher functional polymerizable compound increases the number of polymerization sites in the film and thus contributes to improvement of hardness of the film.

Furthermore, the proportion of the di- or lower functional polymerizable compound being 20% by mass or more with respect to the total mass of the di- or lower functional polymerizable compound and the tri- or higher functional polymerizable compound in the core, makes improvement of adhesiveness to a substrate and film hardness possible.

Hereinafter, detailed descriptions of physical properties of the di- or lower functional polymerizable compound and the tri- or higher functional polymerizable compound will be described.

—Weight-Average Molecular Weight—

A weight-average molecular weight of the di- or lower functional polymerizable compound is not particularly limited, and for example, 150 to 1500 is preferable, 200 to 1000 is more preferable, 250 to 500 is even more preferable.

With the weight-average molecular weight of the di- or lower functional polymerizable compound being 1500 or less, an effect of improving excellent adhesiveness to a substrate is obtained.

In the present specification, the weight-average molecular weight is measured by gel permeation chromatography (GPC).

In the measurement by gel permeation chromatography (GPC), HLC (registered trademark)-8020 GPC (manufactured by Tosoh Corporation) may be used as a measurement device, three columns of TSKgel (registered trademark) Super Multipore HZ-H (4.6 mm ID×15 cm, manufactured by Tosoh Corporation) may be used as columns, and tetrahydrofuran (THF) may be used as an eluent. Furthermore, GPC can be performed using a differential refractive index (RI) detector under the measurement conditions of a sample concentration of 0.45% by mass, a flow rate of 0.35 ml/min, a sample injection amount of 10 μL, and a measurement temperature of 40° C.

A calibration curve can be prepared from 8 samples of "Standard Sample TSK standard, polystyrene" manufactured by Tosoh Corporation: "F-40", "F-20", "F-4", "F-1", "A-5000", "A-2500", "A-1000", and "n-propylbenzene".

A weight-average molecular weight of the tri- or higher functional polymerizable compound is not particularly limited, and for example, 200 to 4000 is preferable, 250 to 1500 is more preferable, 350 to 1200 is even more preferable.

With the weight-average molecular weight of the tri- or higher functional polymerizable compound being 4000 or less, hardness of the film becomes excellent.

In regard to the polymerizable compounds contained in the core, an aspect in which the weight-average molecular weight of the di- or lower functional polymerizable compound is 200 to 1000, and the weight-average molecular weight of the tri- or higher functional polymerizable compound is 250 to 1500, is preferable. With the weight-average molecular weight of the di- or lower functional polymerizable compound being in the above-described range, and the molecular weight of the tri- or higher functional polymerizable compound being in the above-described range, adhesiveness to a substrate and hardness of the film is further improved.

Furthermore, it is more preferable that the weight-average molecular weight of the di- or lower functional polymerizable compound is 250 to 500, and the weight-average molecular weight of the tri- or higher functional polymerizable compound is 350 to 1200.

—C═C Valence—

In the present specification, the term "C═C valence" means the millimolar number of the ethylenic double bond contained in 1 g of the polymerizable compound.

In all of the di- or lower functional polymerizable compound and the tri- or higher functional polymerizable compound, the "C═C valence" is preferably 0.5 mmol/g to 15 mmol/g.

With the C═C valence being 0.5 mol/g or more, adhesiveness of the film is further improved. Meanwhile, with the C═C valence being 15 mmol/g or less, the cure shrinkage of the film after formation is further suppressed.

The C═C valence can be measured by quantitative analysis by $^1$H-NMR (proton nuclear magnetic resonance spectroscopy). For example, in a case where the polymerizable compound having a (meth)acryloyl group is a measurement target compound, a mixture in which the measurement target compound is precisely mixed with a standard substance (internal standard substance) having known purity, is prepared, and $^1$H-NMR with respect to a solution in which the obtained mixture is dissolved in a deuterium solvent is measured, and therefore the C═C valence can be calculated by Formula (C) from a relationship between a peak surface area, the number of protons, a preparation mass, and a molecular weight, which are derived from the internal standard substance and the (meth)acryloyl group of the measurement target compound observed in the obtained spectrum.

$$C = C - \text{valent (mmol/g)} = \frac{S_{sample}}{S_{std}} \times \frac{N_{std}}{N_{sample}} \times \frac{m_{std}}{m_{sample}} \times \frac{1}{M_{std}} \times 1000 \quad \text{Formula (C)}$$

In Formula (C), $S_{sample}$ represents a peak surface area (integrated value) of a (meth)acryloyl group of the measurement target compound, $S_{std}$ represents a peak surface area (integrated value) of the internal standard substance, $N_{sample}$ represents the number of protons (the number hydrogen of a functional group) of a (meth)acryloyl group of the measurement target compound, $N_{std}$ represents the number of protons (the number hydrogen of a functional group) of the internal standard substance, $m_{sample}$ represents a preparation sample mass (g) of the measurement target compound, $m_{std}$ represents a preparation sample mass (g) of the internal standard substance, and $M_{std}$ represents a molecular weight of the internal standard substance.

The C═C valence of the di- or lower functional polymerizable compound is preferably 1.5 mmol/g to 10 mmol/g, more preferably 2.5 mmol/g to 9 mmol/g, and even more preferably 4 mmol/g to 8 mmol/g.

With the C═C valence of the di- or lower functional polymerizable compound being 1.5 mmol/g or more, film hardness becomes excellent by crosslinking. Meanwhile, with the C═C valence of the di- or lower functional polymerizable compound being 10 mmol/g or less, the cure shrinkage is suppressed, and adhesiveness becomes excellent.

The C═C valence of the tri- or higher functional polymerizable compound is preferably 0.5 mmol/g to 15 mmol/g, more preferably 4 mmol/g to 11 mmol/g, and even more preferably 5 mmol/g to 10 mmol/g.

The C═C valence of the tri- or higher functional polymerizable compound being 0.5 mmol/g or more, film hardness becomes excellent by crosslinking. Meanwhile, with the C═C valence of the tri- or higher functional polymerizable compound being 15 mmol/g or less, the cure shrinkage of the film after formation is further suppressed.

It is preferable that the C═C valence of the di- or lower functional polymerizable compound is 4 mmol/g to 8 mmol/g, and the C═C valence of the tri- or higher functional polymerizable compound is 5 mmol/g to 10 mmol/g.

With the C═C valence of the di- or lower functional polymerizable compound and the C═C valence of the tri- or higher functional polymerizable compound being in the above-described range, adhesiveness of the film and film hardness are further improved.

Furthermore, it is more preferable that the C═C valence of the di- or lower functional polymerizable compound is 4 mmol/g to 8 mmol/g, and the C═C valence of the tri- or higher functional polymerizable compound is 5 mmol/g to 10 mmol/g.

—Solubility Parameter—

It is preferable that compatibility between the di- or lower functional polymerizable compound and the tri- or higher functional polymerizable compound is high. Specifically, an absolute value of a difference between a solubility parameter (SP value) of the di- or lower functional polymerizable compound and a SP value of the tri- or higher functional polymerizable compound is preferably 2.0 $MPa^{1/2}$ or less and is more preferably 1.5 $MPa^{1/2}$ or less.

With the absolute value of the difference between the SP value of the di- or lower functional polymerizable compound and the SP value of the tri- or higher functional polymerizable compound being 2.0 MPa$^{1/2}$ or less, adhesiveness is improved.

In the present specification, the SP value (solubility parameter) can be obtained by a method of Hansen. The method of Hansen is one of the known methods of the field for calculating the SP value, and the SP value is expressed by a multidimensional vector consisting of dispersion element, polarity element, and hydrogen bond element. The SP value of Hansen can be predicted by the method disclosed in Int. J. Thermophys, 2008, 29, pages 568-585, and the SP value described in the present specification is a value predicted by the method of this document.

—Viscosity—

Viscosity of the di- or lower functional polymerizable compound and the tri- or higher functional polymerizable compound is not particularly limited.

The viscosity of the di- or lower functional polymerizable compound is preferably 0.001 Pa·s to 8 Pa·s, more preferably 0.001 Pa·s to 3 Pa·s, even more preferably 0.003 Pa·s to 1 Pa·s, and particularly preferably 0.003 Pa·s to 0.5 Pa·s.

The viscosity of the tri- or higher functional polymerizable compound is preferably 0.05 Pa·s to 20 Pa·s, more preferably 0.1 Pa·s to 20 Pa·s, and even more preferably 0.1 Pa·s to 15 Pa·s.

The viscosity can be measured at 25° C. by using HAAKE RS6000 manufactured by EKO Instruments.

—C log P—

C log P of the di- or lower functional polymerizable compound and the tri- or higher functional polymerizable compound is not particularly limited.

The "C log P" in the present specification is a parameter representing hydrophobicity of the polymerizable compound. As a value of the C log P becomes lower, the polymerizable compound exhibits a higher level of hydrophobicity.

The C log P of the di- or lower functional polymerizable compound is preferably 1 to 8, more preferably 2 to 6, and even more preferably 3 to 5.

The C log P of the tri- or higher functional polymerizable compound is preferably 0.5 to 6, and more preferably 1 to 4.

The C log P is a value obtained by calculating a common logarithm log P of a partition coefficient P to 1-octanol and water. The known methods and software can be used to calculate the C log P value, and unless otherwise specified, in the present specification, C log P program incorporated in a system of Daylight Chemical Information Systems, Inc.: PC Models is used.

—Content of Polymerizable Compound in Core—

The total mass of the di- or lower functional polymerizable compound and the tri- or higher functional polymerizable compound contained in the core of the microcapsule is preferably 30% by mass to 75% by mass, more preferably 35% by mass to 65% by mass, and even more preferably 35% by mass to 60% by mass with respect to the total solid content of the microcapsule, from the viewpoint of compatibility of adhesiveness and hardness of the film.

The proportion of the di- or lower functional polymerizable compound with respect to the total mass of the di- or lower functional polymerizable compound and the tri- or higher functional polymerizable compound is 20% by mass or more, preferably 50% by mass to 90% by mass, more preferably 50% by mass to 80% by mass, and even more preferably 55% by mass to 65% by mass.

With the proportion of the di- or lower functional polymerizable compound with respect to the total mass of the polymerizable compound being 50% by mass or more, adhesiveness becomes excellent. Meanwhile, with the proportion of the di- or lower functional polymerizable compound with respect to the total mass of the polymerizable compound being 90% by mass or less, film hardness becomes excellent.

It is preferable that the total mass of the di- or lower functional polymerizable compound and the tri- or higher functional polymerizable compound is 30% by mass to 70% by mass with respect to a total solid content of the microcapsule, and the proportion of the di- or lower functional polymerizable compound is 50% by mass to 90% by mass with respect to the total mass thereof.

With the total solid content being in the above-described range, and the proportion of the di- or lower functional polymerizable compound being in the above-described range, adhesiveness of the film and film hardness are further improved.

—Types of Polymerizable Compound—

The di- or lower functional polymerizable compound contained in the core is preferably a difunctional polymerizable compound from the viewpoint of film hardness.

The tri- or higher functional polymerizable compound contained in the core is preferably a trifunctional to octafunctional polymerizable compound and more preferably a trifunctional to hexafunctional polymerizable compound, from the viewpoint of suppressing the cure shrinkage after film curing.

The di- or lower functional polymerizable compound and the tri- or higher functional polymerizable compound contained in the core may any one of a polymerizable monomer, a polymerizable oligomer, and a polymerizable polymer, but is preferably a polymerizable monomer from the viewpoints of bleeding out by low viscosity.

Hereinafter, specific examples of a polymerizable monomer, a polymerizable oligomer, and a polymerizable polymer will be described.

—Polymerizable Monomer—

In a case where the polymerizable compound is a polymerizable monomer, the polymerizable monomer is favorable from the viewpoint of improving curing sensitivity of the film and film hardness.

The polymerizable monomer (hereinafter, will also be referred to as "internal polymerizable monomer") capable of being contained in the core of the microcapsule can be selected from a polymerizable monomer having a radically polymerizable ethylenically unsaturated bond (that is, a radically polymerizable monomer) and a polymerizable monomer having a cationic polymerizable group that can be cationically polymerized (that is, a cationic polymerizable monomer).

Examples of the radically polymerizable monomer include an acrylate compound, a methacrylate compound, a styrene compound, a vinylnaphthalene compound, an N-vinyl heterocyclic compound, unsaturated polyester, unsaturated polyether, unsaturated polyamide, and unsaturated urethane.

As the radically polymerizable monomer, a compound having an ethylenic unsaturated group and an ethylenically unsaturated group is preferable.

One kind of the radically polymerizable monomer may be used alone, or two or more kinds thereof may be used in combination.

Examples of the acrylate compound include monofunctional acrylate compounds such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate (PEA), bis(4-acryloxypolyethoxyphenyl)propane, oligoester acrylate, epoxy acrylate, isobornyl acrylate (IBOA), dicyclopentenyl acrylate, dicyclopentenyloxyethyl acrylate, dicyclopentanyl acrylate, cyclic trimethylolpropane formal acrylate, 2-(2-ethoxyethoxy)ethyl acrylate, 2-(2-vinyloxyethoxy)ethyl acrylate, octyl acrylate, decyl acrylate, isodecyl acrylate, lauryl acrylate, 3,3,5-trimethylcyclohexyl acrylate, 4-t-butylcyclohexyl acrylate, isoamyl acrylate, stearyl acrylate, isoamyl stearyl acrylate, isostearyl acrylate, 2-ethylhexyl diglycol acrylate, 2-hydroxybutyl acrylate, 2-acryloyloxy ethylhydrophthalic acid, ethoxy di ethylene glycol acrylate, methoxydiethyleneglycol acrylate, methoxypolyethylene glycol acrylate, methoxypropylene glycol acrylate, 2-hydroxy-3-phenoxypropyl acrylate, vinyl ether acrylate, 2-acryloyloxy ethyl succinic acid, 2-acryloyloxy phthalic acid, 2-acryloxyethyl-2-hydroxy ethyl phthalic acid, lactone modified acrylate, acryloyl morpholine, acrylamide, and substituted acrylamides such as N-methylol acrylamide and diacetone acrylamide;

difunctional acrylate compounds such as polyethylene glycol diacrylate, polypropylene glycol diacrylate, polytetramethylene glycol diacrylate, 1,3-butylene glycol diacrylate, 1,4-butanediol diacrylate, 1,6-hexanediol diacrylate (HDDA), 1,9-nonanediol diacrylate (NDDA), 1,10-decanediol diacrylate (DDDA), 3-methyl pentanediol diacrylate (3 MPDDA), neopentyl glycol diacrylate, tricyclodecanedimethanol diacrylate, bisphenol A ethylene oxide (EO) adduct diacrylate, bisphenol A propylene oxide (PO) adduct diacrylate, ethoxylated bisphenol A diacrylate, hydroxylated neopentyl glycol diacrylate, propoxylated neopentyl glycol diacrylate, alkoxylated dimethylol tricyclodecane diacrylate, polytetramethylene glycol diacrylate, alkoxylated cyclohexanone dimethanol diacrylate, alkoxylated hexanediol diacrylate, dioxane glycol diacrylate, cyclohexanone dimethanol diacrylate, diethylene glycol diacrylate, neopentyl glycol diacrylate, tetraethylene glycol diacrylate, dipropylene glycol diacrylate, tripropylene glycol diacrylate (TPGDA), and neopentyl glycol propylene oxide adduct diacrylate; and tri- or higher functional acrylate compounds such as trimethylolpropane triacrylate, pentaerythritol triacrylate, dipentaerythritol tetraacrylate, ethoxylated isocyanuric acid triacrylate, ε-caprolactone modified tris-(2-acryloxyethyl) isocyanurate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone modified trimethylolpropane triacrylate, pentaerythritol tetraacrylate, pentaerythritol ethoxy tetraacrylate, glycerin propoxy triacrylate, ethoxylated dipentaerythritol hexaacrylate, caprolactam modified dipentaerythritol hexaacrylate, propoxylated glycerin triacrylate, ethoxylated trimethylolpropane triacrylate, and propoxylated trimethylolpropane triacrylate.

Examples of the methacrylate compound include monofunctional methacrylate compounds such as methyl methacrylate, n-butyl methacrylate, allyl methacrylate, glycidyl methacrylate, benzyl methacrylate, dimethylaminomethyl methacrylate, methoxypolyethylene glycol methacrylate, methoxytriethylene glycol methacrylate, hydroxyethyl methacrylate, phenoxyethyl methacrylate, and cyclohexyl methacrylate;

difunctional methacrylate compounds such as polyethylene glycol dimethacrylate, polypropylene glycol dimethacrylate, 2,2-bis(4-methacryloxy polyethoxyphenyl)propane, and tetraethylene glycol dimethacrylate; and the like.

Examples of the styrene compound include styrene, p-methylstyrene, p-methoxy styrene, β-methyl styrene, p-methyl-β-methylstyrene, α-methyl styrene, and p-methoxy-β-methyl styrene.

Examples of the vinylnaphthalene compound include 1-vinylnaphthalene, methyl-1-vinylnaphthalene, β-methyl-1-vinylnaphthalene, 4-methyl-1-vinylnaphthalene, and 4-methoxy-1-vinylnaphthalene.

Examples of the N-vinyl heterocyclic compound include N-vinylcarbazole, N-vinylpyrrolidone, N-vinyl ethylacetamide, N-vinylpyrrole, N-vinylphenothiazine, N-vinylacetanilide, N-vinyl succinic acid imide, N-vinylphthalimide, N-vinylcaprolactam, and N-vinylimidazole.

Examples of other radically polymerizable monomers include N-vinyl amides such as allyl glycidyl ether, diallyl phthalate, triallyl trimellitate, and N-vinylformamide, and the like.

Among these radically polymerizable monomer, as the di- or lower functional polymerizable monomer, at least one kind selected from 1,6-hexanediol diacrylate (HDDA), 1,9-nonanediol diacrylate (NDDA), 1,10-decanediol diacrylate (DDDA), 3-methyl pentanediol diacrylate (3 MPDDA), neopentyl glycol diacrylate, tricyclodecanedimethanol diacrylate, diethylene glycol diacrylate, tetraethylene glycol diacrylate, dipropylene glycol diacrylate, tripropylene glycol diacrylate (TPGDA), cyclohexanone dimethanol diacrylate, alkoxylated hexanediol diacrylate, polyethylene glycol diacrylate, and polypropylene glycol diacrylate, is preferable.

In addition, as the tri- or higher functional polymerizable monomer, at least one kind selected from trimethylolpropane triacrylate, pentaerythritol triacrylate, dipentaerythritol tetraacrylate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone modified trimethylolpropane triacrylate, pentaerythritol tetraacrylate, pentaerythritol ethoxytetraacrylate, glycerin propoxy triacrylate, ethoxylated dipentaerythritol hexaacrylate, caprolactam modified dipentaerythritol hexaacrylate, propoxylated glycerin triacrylate, ethoxylated trimethylolpropane triacrylate, and propoxylated trimethylolpropane triacrylate, is preferable.

As a combination of the di- or lower functional radically polymerizable monomer and the tri- or higher functional radically polymerizable monomer, a combination of a di- or lower functional acrylate compound and a tri- or higher functional acrylate compound is preferable, a combination of a difunctional acrylate compound and a tri- or higher functional acrylate compound is even more preferable, a combination of a difunctional acrylate compound and a tri- to octa-acrylate compound is still more preferable, and a combination of a difunctional acrylate compound and a tri- to hexa-acrylate compound is yet more preferable.

Furthermore, the most preferable combination thereof is a combination of, as a difunctional acrylate compound, at least one kind selected from 1,6-hexanediol diacrylate (HDDA), 1,9-nonanediol diacrylate (NDDA), 1,10-decanediol diacrylate (DDDA), 3-methylpentadiol diacrylate (3 MPDDA), neopentyl glycol diacrylate, tricyclodecane dimethanol diacrylate, diethylene glycol diacrylate, tetraethylene glycol diacrylate, dipropylene glycol diacrylate, tripropylene glycol diacrylate (TPGDA), cyclohexanone dimethanol diacrylate, polyethylene glycol diacrylate, and polypropylene glycol diacrylate, and, as a tri- to hexa-acrylate compound, at least one kind selected from trimethylolpropane triacrylate, pentaerythritol triacrylate, dipentaerythritol tetraacrylate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, pentaerythritol tetraacrylate, pentaerythritol ethoxytetraacrylate, glycerin propoxy triacrylate, ethoxylated dipentaerythritol hexaacrylate, caprolactam modified dipentaerythritol hexaacrylate, propoxylated glycerin triacrylate, ethoxylated trimethylolpropane triacrylate, and propoxylated trimethylolpropane triacrylate.

Examples of the cationic polymerizable monomer include an epoxy compound, a vinyl ether compound, and an oxetane compound.

As the cationic polymerizable monomer, a compound having at least one olefin, thioether, acetal, thioxane, thietane, aziridine, N, O, S, or P-heterocyclic ring, aldehyde, lactam, or a cyclic ester group is preferable.

One kind of the cationically polymerizable monomer may be used alone, or two or more kinds thereof may be used in combination.

Examples of the epoxy compound include di- or lower functional epoxy compounds such as 1,4-butanediol diglycidyl ether, 3-(bis(glycidyloxymethyl)methoxy)-1,2-propanediol, limonene oxide, 2-biphenyl glycidyl ether, 3,4-epoxycyclohexylmethyl-3',4'-epoxycyclohexane carboxylate, epoxide derived from epichlorohydrin-bisphenol S, epoxidized styrene, epoxide derived from epichlorohydrin-bisphenol F, epoxide derived from epichlorohydrin-bisphenol A, epoxidized novolak, alicyclic polyepoxide, and the like.

Examples of the alicyclic diepoxide include a copolymer of an epoxide and a compound containing a hydroxyl group, such as glycol, polyol, and vinyl ether. Specific examples thereof include 3,4-epoxycyclohexylmethyl-3',4'-epoxycycloethylcarboxylate, bis(3,4-epoxyhexylmethyl)adipate, limonene diepoxide, and diglycidyl ester of hexahydrophthalic acid.

In addition, examples of other epoxy compounds include tri- or higher functional epoxy compounds such as polyglycidyl ester of polybasic acid, polyglycidyl ether of polyol, polyglycidyl ether of polyoxyalkylene glycol, polyglycidyl ester of aromatic polyol, a urethane polyepoxy compound, and polyepoxy polybutadiene, and the like.

Examples of the vinyl ether compound include di- or lower functional vinyl ether compounds such as ethyl vinyl ether, n-butyl vinyl ether, isobutyl vinyl ether, octadecyl vinyl ether, cyclohexyl vinyl ether, butanediol divinyl ether, hydroxybutyl vinyl ether, cyclohexane dimethanol monovinyl ether, phenyl vinyl ether, p-methylphenyl vinyl ether, p-methoxyphenyl vinyl ether, methyl vinyl ether, β-methyl vinyl ether, β-chloro iso vinyl ether, diethylene glycol divinyl ether, triethylene glycol divinyl ether, n-propyl vinyl ether, isopropyl vinyl ether, dodecyl vinyl ether, diethylene glycol monovinyl ether, cyclohexane dimethanol divinyl ether, 4-(vinyloxy)butyl benzoate, bis[4-(vinyloxy)butyl] adipate, bis[4-(vinyloxy)butyl] succinate, 4-(vinyloxymethyl)cyclohexylmethyl benzoate, bis[4-(vinyloxy)butyl] isophthalate, bis[4-(vinyloxymethyl)cyclohexylmethyl] glutarate, 4-(vinyloxy)butyl steatite, bis[4-(vinyloxy)butyl] hexadiyl dicarbamate, bis[4-(vinyloxy)methyl]cyclohexyl] methyl] terephthalate, bis[4-(vinyloxy)methyl]cyclohexyl] methyl] isophthalate, bis[4-(vinyloxy)butyl] (4-methyl-1,3-phenylene)-biscarbamate, bis[4-vinyloxy)butyl] (methylenedi-4,1-phenylene)biscarbamate, and 3-amino-1-propanol vinyl ether; and tri- or higher functional vinyl ether compounds such as tris[4-(vinyloxy)butyl] trimellitate.

Examples of the oxetane compound include 3-ethyl-3-hydroxymethyl-1-oxetane, 1,4-bis[3-ethyl-3-oxetanylmethoxy)methyl] benzene, 3-ethyl-3-phenoxymethyl-oxetane, bis([1-ethyl(3-oxetanyl)]methyl) ether, 3-ethyl-3-[(2-ethylhexyloxy)methyl] oxetane, 3-ethyl-[(triethoxysilylpropoxy)methyl] oxetane, and 3,3-dimethyl-2-(p-methoxyphenyl)-oxetane.

In addition to the radically polymerizable monomers exemplified above, it is possible to use the commercially available products described in "Cross-linking Agent Handbook" edited by Shinzo Yamashita (1981, TAISEI-SHUPPAN CO., LTD.); "UV•EB Curing Handbook (raw materials)" edited by Kiyomi Kato (1985, Kobunshi Kankokai); "Application and Market of UVEB Curing Technology" edited by RadTech Japan, p. 79, (1989, CMC); "Polyester Resin Handbook" written by Eichiro Takiyama, (1988, NIKKAN KOGYO SHIMBUN, LTD.) or to use radically polymerizable and cross-linkable monomers known in the technical field.

Furthermore, in addition to the cationic polymerizable monomers exemplified above, it is possible to use the compounds described in "Advances in Polymer Science" by J. V. Crivello et al., 62, pages 1 to 47 (1984), "Handbook of Epoxy Resins" by Lee et al., McGraw Hill Book Company, New York (1967), and "Epoxy Resin Technology" by P. F. Bruins et al. (1968).

In addition, as the polymerizable monomer, for example, the photocurable polymerizable monomers used in photopolymerizable compositions described in JP1995-159983A (JP-H07-159983A), JP1995-31399B (JP-H07-31399B), JP1996-224982A (JP-H08-224982A), JP1998-863A (JP-H10-863A), JP1997-134011A (JP-H09-134011A), JP2004-514014A, and the like are known. These monomers can also be suitably used in the microcapsule.

In addition, as the polymerizable monomer, a commercially available product on the market may be used, examples thereof include AH-600 (difunctional), AT-600 (difunctional), UA-306H (hexafunctional), UA-306T (hexafunctional), UA-3061 (hexafunctional), UA-510H (decafunctional), UF-8001G (difunctional), and DAUA-167 (difunctional) (manufactured by KYOEISHA CHEMICAL Co., Ltd.), SR339A (PEA, monofunctional), SR506 (IBOA, monofunctional), CD262 (difunctional), SR238 (HDDA, difunctional), SR341 (3MPDDA, difunctional), SR508 (difunctional), SR306H (difunctional), CD560 (difunctional), SR833S (difunctional), SR444 (trifunctional), SR454 (trifunctional), SR492 (trifunctional), SR499 (trifunctional), CD501 (trifunctional), SR502 (trifunctional), SR9020 (trifunctional), CD9021 (trifunctional), SR9035 (trifunctional), SR494 (tetrafunctional), and SR399E (pentafunctional) (manufactured by Sartomer Arkema Inc.), A-NOD-N (difunctional NDDA), A-DOD-N (difunctional DDDA), A-200 (difunctional), APG-400 (difunctional), A-BPE-10 (difunctional), A-BPE-20 (difunctional), A-9300 (trifunctional), A-9300-1CL (trifunctional), A-TMPT (trifunctional), A-TMM-3L (trifunctional), A-TMMT (tetrafunctional), and AD-TMP (tetrafunctional) (Shin-Nakamura Chemical Co., Ltd.), UV-7510B (trifunctional) (Nippon Synthetic Chemical Industry Co., Ltd.), KAYARAD DCPA-30 (hexafunctional) and KAYARAD DPEA-12 (hexafunctional) (Nippon Kayaku Co., Ltd.), and LIGHT ACRYLATE NPA (difunctional) and LIGHT ACRYLATE 3EG-A (difunctional) (KYOEISHA CHEMICAL Co., Ltd.).

In addition, as the polymerizable monomer, it is possible to suitably use the commercially available products such as neopentyl glycol propylene oxide adduct diacrylate (NPG-PODA), SR531, SR285, and SR256 (manufactured by Sartomer Arkema Inc.), A-DHP (dipentaerythritol hexaacrylate, SHIN-NAKAMURA CHEMICAL CO., LTD.), ARONIX (registered trademark) M-156 (manufactured by TOAGOSEI CO., LTD.), V-CAP (manufactured by BASF SE), VISCOAT #192 (manufactured by OSAKA ORGANIC CHEMICAL INDUSTRY LTD), and the like.

In a case of manufacturing the microcapsule, the polymerizable monomer is dissolved as an oil-phase component together with the components constituting the microcapsule, and a water-phase component is mixed with the oil-phase component, followed by emulsification and dispersion, and therefore the polymerizable monomer can be incorporated into the core of the microcapsule.

—Polymerizable Oligomer and Polymerizable Polymer—

A case in which the polymerizable compound is a polymerizable oligomer or a polymerizable polymer is advantageous from the viewpoints that cure shrinkage of the film is decreased and a deterioration in adhesiveness of the film to a substrate is suppressed.

Examples of the polymerizable oligomer and the polymerizable polymer include oligomers and polymers such as an acrylic resin, a urethane resin, polyester, polyether, polycarbonate, an epoxy resin, and polybutadiene.

In addition, examples thereof include resins such as epoxy acrylate, aliphatic urethane acrylate, aromatic urethane acrylate, and polyester acrylate may be used.

Among these, from the viewpoint of decreasing cure shrinkage, a resin which has a hard segment and a soft segment in combination and is capable of stress relaxation in a case of curing is preferable, and particularly, at least one oligomer or polymer selected from a urethane resin, a polyester resin, and an epoxy resin is more preferable.

As the polymerizable group, an ethylenically unsaturated group such as a (meth)acryloyl group, a vinyl group, an allyl group, and a styryl group, an epoxy group, and the like are preferable, and from the viewpoint of polymerization reactivity, at least one group selected from a (meth)acryloyl group, a vinyl group, and a styryl group is more preferable, and a (meth)acryloyl group is particularly preferable.

The polymerizable oligomer and the polymerizable polymer may have only one kind of polymerizable group or have two or more kinds thereof.

These polymerizable groups can be introduced into polymers or oligomers by polymer reaction and copolymerization.

For example, by using a reaction between a polymer or an oligomer having a carboxy group on a side chain, and glycidyl methacrylate, or a reaction between a polymer or an oligomer having an epoxy group, and an ethylenically unsaturated group-containing carboxylic acid such as a methacrylic acid, the polymerizable groups can be introduced into polymers or oligomers. These groups may be used in combination.

(Photopolymerization Initiator)

The core of the microcapsule contains at least one photopolymerization initiator. That is, the microcapsule contains at least one photopolymerization initiator in the interior thereof.

With the core containing the photopolymerization initiator, sensitivity with respect to active energy rays increases, and therefore an image having excellent film hardness is obtained.

Furthermore, in a case where the microcapsule contains a photopolymerization initiator in the interior thereof, it is possible to use a photopolymerization initiator which cannot be readily used in the related art because the photopolymerization initiator has high sensitivity but exhibits low dispersibility or solubility in water. Therefore, in a case where the microcapsule is adopted in the aqueous dispersion, a highly sensitive aqueous dispersion can be realized compared to the aqueous dispersion of the related art. In addition, the microcapsule contains the photopolymerization initiator in the interior thereof. As a result, a range of choice of the photopolymerization initiators to be used broadens, and hence a range of choice of the light source to be used also broadens. Consequently, the curing sensitivity can be further improved compared to the related art.

As the photopolymerization initiator capable of being contained in the interior of the core of the microcapsule (hereinafter, referred to as an internal photopolymerization initiator as well), known photopolymerization initiators can be appropriately selected.

The photopolymerization initiator is a compound generating a radical or a cation, which is a polymerization initiating species, by absorbing light (that is, active energy rays).

As the photopolymerization initiator, a known compound can be used. Preferable examples of the photopolymerization initiator include (a) carbonyl compound such as aromatic ketones, (b) acylphosphine oxide compound, (c) aromatic onium salt compound, (d) organic peroxide, (e) thio compound, (f) hexaarylbiimidazole compound, (g) ketoxime ester compound, (h) borate compound, (i) azinium compound, (j) metallocene compound, (k) active ester compound, (l) compound having carbon halogen bond, (m) alkylamine compound, and the like.

As the photopolymerization initiator, the core may contain one kind of the compounds (a) to (m), or two or more kinds thereof in combination.

Preferable examples of (a) carbonyl compound, (b) acylphosphine oxide compound, and (e) thio compound include the compounds having a benzophenone skeleton or a thioxanthone skeleton described in "RADIATION CURING IN POLYMER SCIENCE AND TECHNOLOGY", J. P. FOUASSIER, J. F. RABEK (1993), pp. 77~117, and the like.

More preferable examples of the compounds include the α-thiobenzophenone compound described in JP1972-6416B (JP-S47-6416B), the benzoin ether compound described in JP1972-3981B (JP-S47-3981B), the α-substituted benzoin compound described in JP1972-22326B (JP-S47-22326B), the benzoin derivative described in JP1972-23664B (JP-S47-23664B), the aryolphosphonic acid ester described in JP1982-30704A (JP-557-30704A), the dialkoxybenzophenone described in JP1985-26483B (JP-S60-26483B), the benzoin ethers described in JP1985-26403B (JP-S60-26403B) and JP1987-81345A (JP-562-81345A), the α-aminobenzophenones described in JP1989-34242B (JP-H01-34242B), US4318791A, and EP0284561A1, the p-di(dimethylaminobenzoyl)benzene described in JP1990-211452A (JP-H02-211452A), the thio-substituted aromatic ketone described in JP1986-194062A (JP-561-194062A), the acylphosphine sulfide described in JP1990-9597B (JP-H02-9597B), the acylphosphine described in JP1990-9596B (JP-H02-9596B), the thioxanthones described in JP1988-61950B (JP-563-61950B), the coumarins described in JP1984-42864B (JP-559-42864B), the compound described in WO2015/158745A, and the like.

Furthermore, the photopolymerization initiator described in JP2008-105379A or JP2009-114290A is also preferable.

Examples of the commercially available product of the photopolymerization initiator include IRGACURE (registered trademark) 184, 369, 500, 651, 819, 907, 1000, 1300, 1700, and 1870, DAROCUR (registered trademark) 1173, 2959, 4265, and ITX, LUCIRIN (registered trademark) TPO (all of which are manufactured by BASF SE), ESACURE (registered trademark) KTO37, KTO46, KIP150, and EDB (all of which are manufactured by Lamberti S.p.A.), H-Nu (registered trademark) 470 and 470X (all of which are manufactured by Spectra Group Limited, Inc.), Omnipol 9210 (manufactured by IGM Resins B. V), SpeedCure 7040 (manufactured by Lambson Limited), and the like.

Among these photopolymerization initiators, as the photopolymerization initiator, from the viewpoint of sensitivity to UV light, at least one compound selected from (a) carbonyl compound and (b) acylphosphine oxide compound is more preferable, and specific examples thereof include bis(2,4,6-trimethylbenzoyl)-phenylphosphine oxide (for example, IRGACURE (registered trademark) 819 manufactured by BASF SE), 2-(dimethylamine)-1-(4-morpholinophenyl)-2-benzyl-1-butanone (for example, IRGACURE (registered trademark) 369 manufactured by BASF SE), 2-methyl-1-(4-methylthiophenyl)-2-morpholinopropan-1-one (for example, IRGACURE (registered trademark) 907 manufactured by BASF SE), 1-hydroxy-cyclohexyl-phenyl-ketone (for example, IRGACURE (registered trademark) 184 manufactured by BASF SE), 2-hydroxy-2-methyl-1-phenyl-propan-1-one (for example, IRGACURE (registered trademark) 1173 manufactured by BASF SE), 2,4,6-trimethylbenzoyl-diphenyl-phosphine oxide (for example, DAROCUR (registered trademark) TPO, LUCIRIN (registered trademark) TPO (all of which are manufactured by BASF SE)), and the like.

Among these, from the viewpoint of suitability for LED light, as the photopolymerization initiator, (b) acylphosphine oxide compound is preferable, and a monoacylphosphine oxide compound (particularly preferably 2,4,6-trimethylbenzoyl-diphenyl-phosphine oxide) or a bisacylphosphine oxide compound (particularly preferably bis(2,4,6-trimethylbenzoyl)-phenylphosphine oxide) is more preferable.

In a case of manufacturing the microcapsule, the photopolymerization initiator is dissolved as an oil-phase component together with the components constituting the microcapsule, a water-phase component is added to and mixed with the oil-phase component, followed by emulsification, and therefore the internal photopolymerization initiator can be incorporated into the core of the microcapsule.

The content of the photopolymerization initiator with respect to the total solid content of the microcapsule is preferably 0.1% by mass to 25% by mass, more preferably 0.5% by mass to 20% by mass, and even more preferably 1% by mass to 15% by mass.

(Sensitizer)

The core of the microcapsule may contain at least one sensitizer.

In a case where the core of the microcapsule contains the sensitizer, the decomposition of the photopolymerization initiator by the irradiation with active energy rays can be further accelerated.

The sensitizer is a substance which becomes in an electron-excited state by absorbing specific active energy rays. By coming into contact with the photopolymerization initiator, the sensitizer in the electron-excited state performs an action such as electron transfer, energy transfer, or heating. As a result, the chemical change of the photopolymerization initiator, that is, the decomposition, the generation of a radical, an acid, or a base, or the like is accelerated.

Examples of the sensitizer include benzophenone, thioxanthone, isopropylthioxanthone, anthraquinone, a 3-acylcoumarin derivative, terphenyl, styryl ketone, 3-(aroylmethylene)thiazolyl, camphorquinone, eosin, rhodamine, erythrosine, and the like.

Furthermore, as the sensitizer, the compound represented by General Formula (i) described in JP2010-24276A and the compound represented by General Formula (I) described in JP1994-107718A (JP-H06-107718A) can also be suitably used.

Furthermore, the compounds described in WO2015/158745A, specifically tertiary aliphatic amines (for example, methyldiethanolamine, dimethylethanolamine, triethanolamine, triethylamine, and N-methylmorpholine); aromatic amines (for example, amyl para dimethylaminobenzoate, 2-butoxyethyl 4-(dimethylamino)benzoate, 2-(dimethylamino)ethyl benzoate, ethyl 4-(dimethylamino)benzoate, and 2-ethylhexyl 4-(dimethylamino)benzoate); (meth)acrylated amines [for example, dialkylaminoalkyl (meth)acrylate (such as diethylaminoethyl acrylate) and N-alkylmorpholine (meth)acrylate (such as N-alkylmorpholine acrylate)], and the like can be suitably used.

Among the above compounds, as the sensitizer, from the viewpoints of the suitability for LED light and the reactivity with the photopolymerization initiator, at least one selected from thioxanthone, isopropylthioxanthone, and benzophenone is preferable, at least one selected from thioxanthone and isopropylthioxanthone is more preferable, and isopropylthioxanthone is even more preferable.

In a case where the core of the microcapsule contains the sensitizer, a content of the sensitizer is preferably 0.1% by mass to 20% by mass, more preferably 0.2% by mass to 15% by mass, and even more preferably 0.3% by mass to 10% by mass, with respect to the total solid content of the microcapsule.

[Shell of Microcapsule]

The microcapsule includes the shell (hereinafter will also be simply referred to as "shell") having the three-dimensional cross-linked structure containing at least one bond selected from a urethane bond or a urea bond. It is preferable that the shell has the three-dimensional cross-linked structure containing both the urethane bond and the urea bond.

In the present specification, the term "three-dimensional cross-linked structure" refers to a three-dimensional network structure formed by cross-linking.

The shell of the microcapsule having the three-dimensional cross-linked structure contributes to improvement of dispersion stability and redispersibility in a case where the microcapsule is adopted in the aqueous dispersion.

The term "redispersibility" means the properties in which in a case where an aqueous liquid (for example, water, an aqueous solution, an aqueous dispersion, or the like) is supplied to a solidified product formed by the evaporation of water from the aqueous dispersion, the particles (in this case, microcapsules) in the solidified product are dispersed again in the aqueous liquid. Examples of the solidified product include a solidified product of the aqueous dispersion formed by a coating head or an ink jet head.

Whether the shell of the microcapsule has the three-dimensional cross-linked structure is checked as below. The operation described below is performed under the condition of a liquid temperature of 25° C.

In addition, the following operation is performed on the aqueous dispersion in which the microcapsule is dispersed in water. In a case where the aqueous dispersion does not contain a pigment, the operation described below is performed using the aqueous dispersion as it is. In a case where the aqueous dispersion contains a pigment, first, the pigment is removed from the aqueous dispersion by centrifugation, and then the operation described below is performed on the aqueous dispersion from which the pigment has been removed.

A sample is collected from the aqueous dispersion. Tetrahydrofuran (THF) having a mass 100 times the mass of the total solid content in the sample is added to and mixed with the collected sample, thereby preparing a diluted solution. The obtained diluted solution is subjected to centrifugation under the condition of 80,000 rounds per minute (rpm; the same shall apply hereinafter) and 40 minutes. After the centrifugation, whether there are residues is checked by visual observation. In a case where there are residues, a redispersion is prepared by redispersing the residues in water. For the obtained redispersion, by using a wet-type particle size distribution measurement apparatus (LA-960, manufactured by HORIBA, Ltd.), the particle size distribution is measured by a light scattering method.

In a case where the particle size distribution can be checked by the operation described above, it is determined that the shell of the microcapsule has the three-dimensional cross-linked structure.

The three-dimensional cross-linked structure in the shell of the microcapsule can be formed by allowing, for example, a reaction between a tri- or higher functional isocyanate compound or a difunctional isocyanate compound and water or a compound having two or more active hydrogen groups.

Particularly, in a case where a raw material used at the time of manufacturing the microcapsule includes at least one kind of compound having three or more reactive groups (isocyanate groups or active hydrogen groups), a cross-linking reaction is three-dimensional and thus more effectively proceeds, and therefore a three-dimensional network structure is more effectively formed.

The three-dimensional cross-linked structure in the microcapsule is preferably a product formed by allowing a reaction between a tri- or higher functional isocyanate compound and water.

A total amount of the urethane bond and the urea bond contained in 1 g of the shell having the three-dimensional cross-linked structure is preferably 1 mmol/g to 10 mmol/g, more preferably 1.5 mmol/g to 9 mmol/g, and even more preferably 2 mmol/g to 8 mmol/g.

The three-dimensional cross-linked structure of the shell preferably contains Structure (1).

The three-dimensional cross-linked structure may include a plurality of structures (1), and the plurality of structures (1) may be the same as or different from each other.

Structure (1)

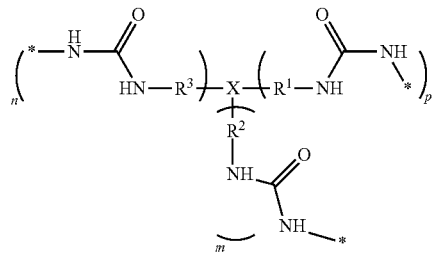

In Structure (1), X represents a (p+m+n)-valent organic group formed by linking at least two groups selected from the group consisting of a hydrocarbon group which may have a ring structure, —NH—, >N—, —C(=O)—, —O—, and —S—.

In Structure (1), $R^1$, $R^2$, and $R^3$ each independently represent a hydrocarbon group having 5 to 15 carbon atoms which may have a ring structure.

In Structure (1), * represents a binding position, each of p, m, and n is equal to or greater than 0, and p+m+n equals 3 or greater.

The total molecular weight of X, $R^1$, $R^2$, and $R^3$ is preferably less than 2,000, more preferably less than 1,500, and still more preferably less than 1,000. In a case where the total molecular weight of X, $R^1$, $R^2$, and $R^3$ is less than 2,000, the internal content rate of the compound contained in the interior of the core can be increased.

The hydrocarbon group in the organic group represented by X is preferably a linear or branched hydrocarbon group having 1 to 15 carbon atoms, and more preferably a linear or branched hydrocarbon group having 1 to 10 carbon atoms.

Examples of the ring structure that the hydrocarbon group in the organic group represented by X and the hydrocarbon group represented by $R^1$, $R^2$, and $R^3$ may have, include an alicyclic structure, an aromatic ring structure, and the like.

Examples of the alicyclic structure include a cyclohexane ring structure, a bicyclohexane ring structure, a bicyclodecane ring structure, an isobornene ring structure, a dicyclopentane ring structure, an adamantane ring structure, a tricyclodecane ring structure, and the like.

Examples of the aromatic ring structure include a benzene ring structure, a naphthalene ring structure, a biphenyl ring structure, and the like.

In Structure (1), p is equal to or greater than 0. p is preferably 1 to 10, more preferably 1 to 8, even more preferably 1 to 6, and particularly preferably 1 to 3.

In Structure (1), m is equal to or greater than 0. m is preferably 1 to 10, more preferably 1 to 8, even more preferably 1 to 6, and particularly preferably 1 to 3.

In Structure (1), n is equal to or greater than 0. n is preferably 1 to 10, more preferably 1 to 8, even more preferably 1 to 6, and particularly preferably 1 to 3.

In Structure (1), p+m+n is preferably an integer of 3 to 10, more preferably an integer of 3 to 8, and even more preferably an integer of 3 to 6.

The (p+m+n)-valent organic group represented by X is preferably a group represented by any one of Formulas (X-1) to (X-12).

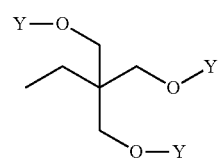
(X-1)

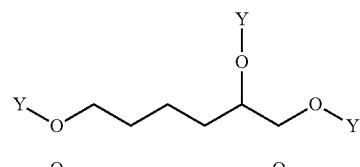
(X-2)

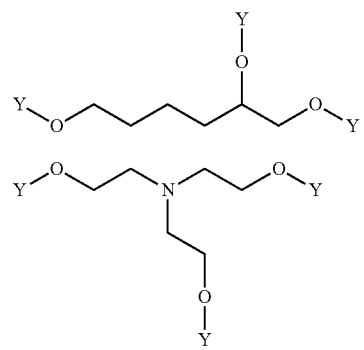
(X-3)

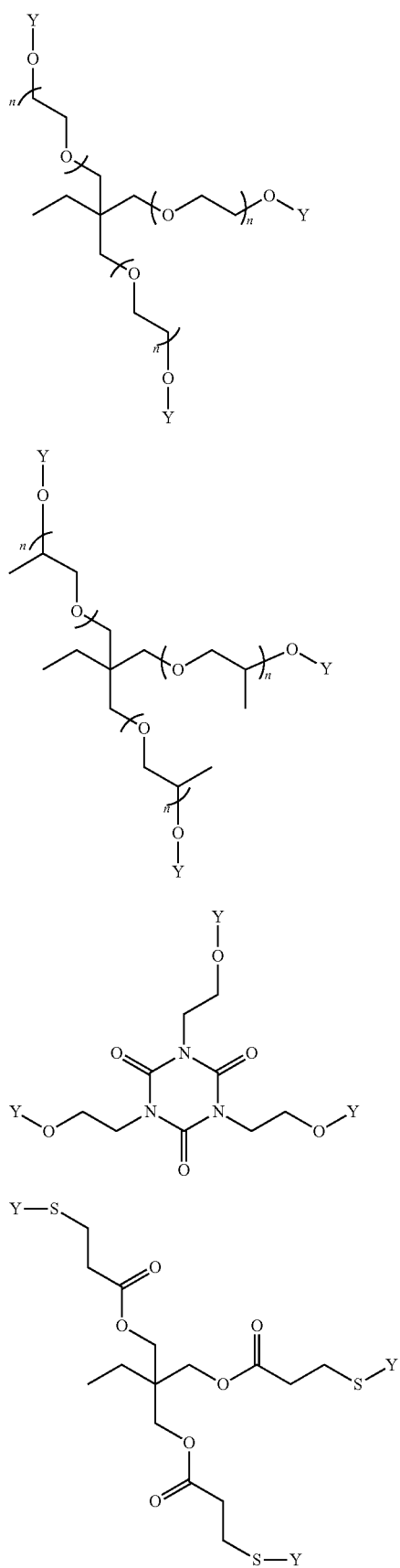
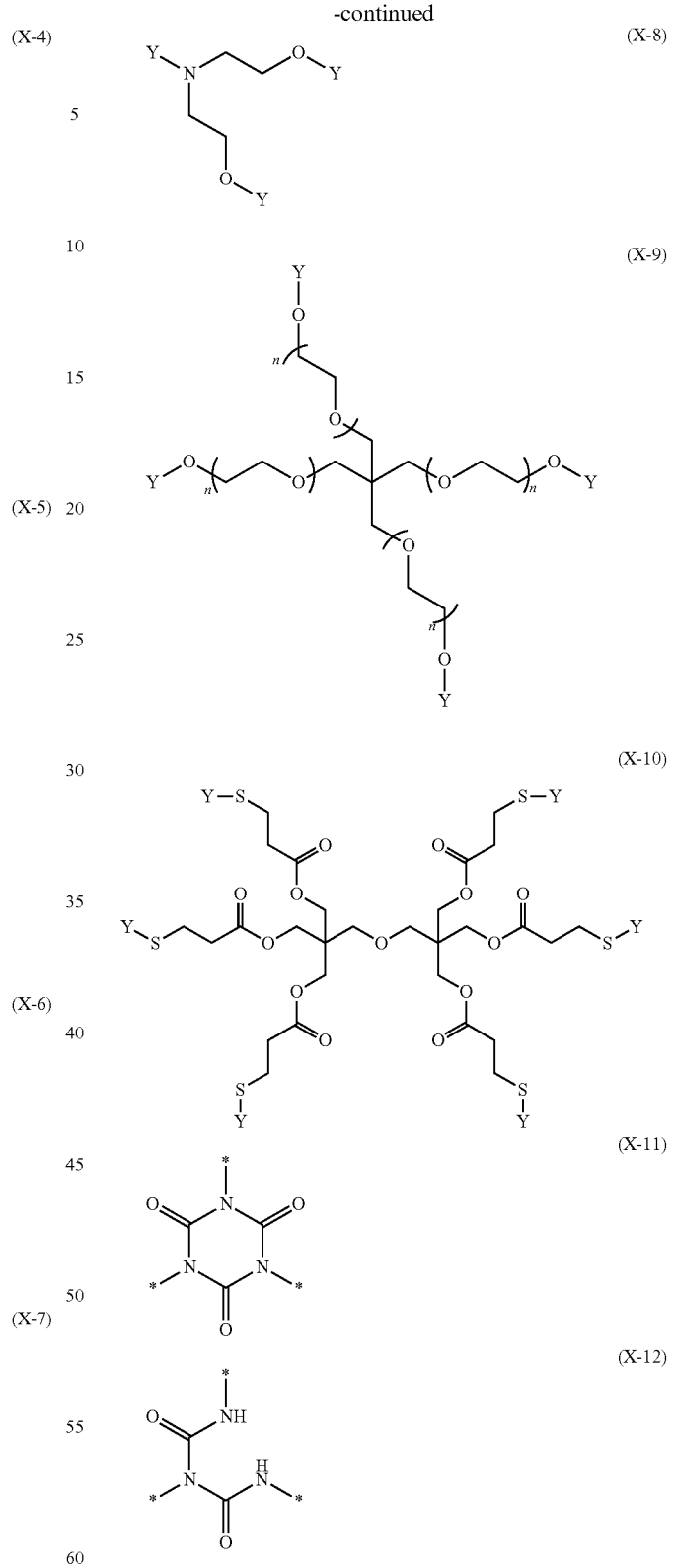
In Formulas (X-1) to (X-12), n represents an integer of 1 to 200, preferably represents an integer of 1 to 50, more preferably represents an integer of 1 to 15, and particularly preferably represents an integer of 1 to 8.
In Formulas (X-11) and (X-12), * represents a binding position.

In Formulas (X-1) to (X-10), Y represents (Y-1).

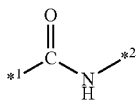
(Y-1)

In (Y-1), *¹ represents a binding position in which (Y-1) is bonded to S or O in (X-1) to (X-10), and *² represents a binding position in which (Y-1) is bonded to R¹, R², or R³ in Structure (1).

In Structure (1), R¹, R², and R³ each independently represent a hydrocarbon group having 5 to 15 carbon atoms which may have a ring structure.

The hydrocarbon group represented by R¹, R², and R³ may have a substituent, and examples of the substituent include a hydrophilic group capable of being contained in the shell, which is described below.

R¹, R², and R³ preferably each independently represent a group represented by any one of (R-1) to (R-20). In (R-1) to (R-20), * represents a binding position.

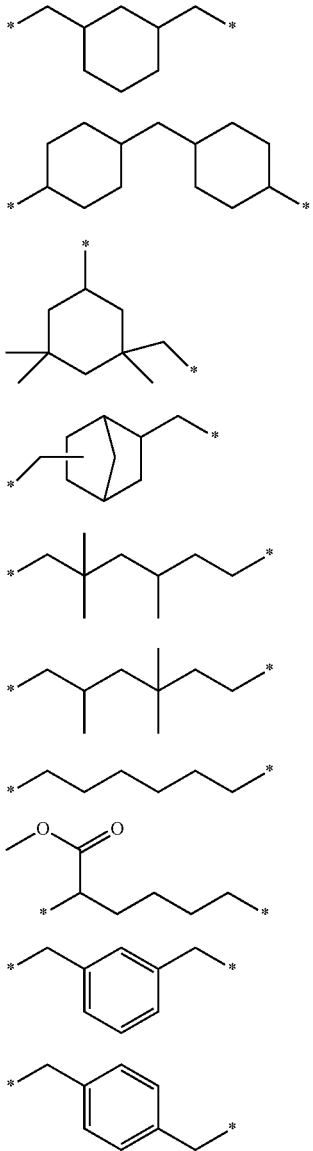

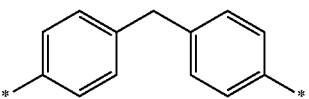
(R-11)

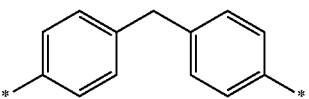
(R-12)

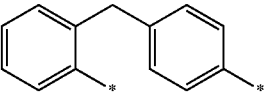
(R-13)

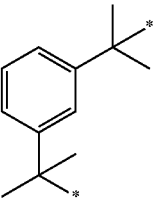
(R-14)

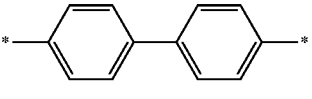
(R-15)

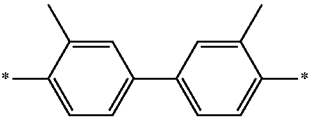
(R-16)

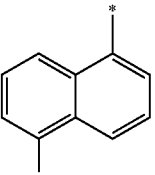
(R-17)

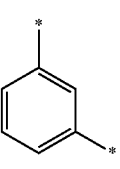
(R-18)

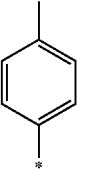
(R-19)

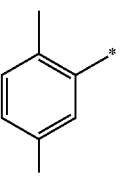
(R-20)

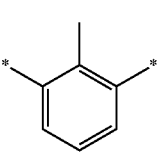

The content rate of Structure (1) in the shell with respect to the total mass of the shell is preferably 8% by mass to 100% by mass, more preferably 25% by mass to 100% by mass, and even more preferably 50% by mass to 100% by mass.

It is preferable that the shell includes, as Structure (1), at least one structure among Structure (2), Structure (3), and Structure (4) shown below.

Structure (2)

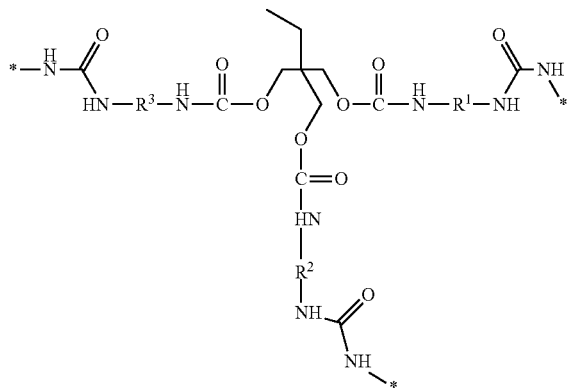

In Structure (2), $R^1$, $R^2$, and $R^3$ each independently represent a hydrocarbon group having 5 to 15 carbon atoms which may have a ring structure.

Each of the hydrocarbon groups represented by $R^1$, $R^2$, and $R^3$ in Structure (2) has the same definition as each of the hydrocarbon groups represented by $R^1$, $R^2$, and $R^3$ in Structure (1), and the preferable range thereof is also the same.

In Structure (2), * represents a binding position.

Structure (3)

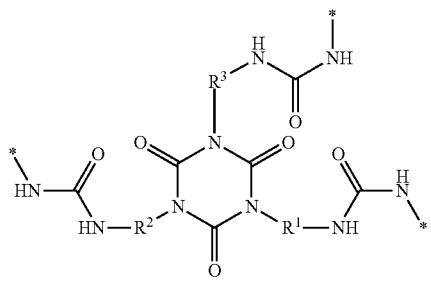

In Structure (3), $R^1$, $R^2$, and $R^3$ each independently represent a hydrocarbon group having 5 to 15 carbon atoms which may have a ring structure.

Each of the hydrocarbon groups represented by $R^1$, $R^2$, and $R^3$ in Structure (3) has the same definition as each of the hydrocarbon groups represented by $R^1$, $R^2$, and $R^3$ in Structure (1), and the preferable range thereof is also the same.

In Structure (3), * represents a binding position.

Structure (4)

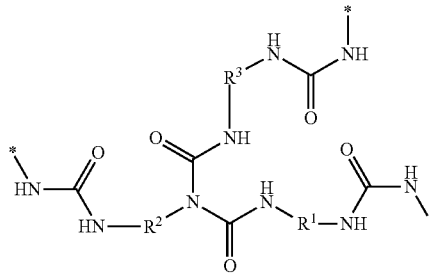

In Structure (4), $R^1$, $R^2$, and $R^3$ each independently represent a hydrocarbon group having 5 to 15 carbon atoms which may have a ring structure.

Each of the hydrocarbon groups represented by $R^1$, $R^2$, and $R^3$ in Structure (4) has the same definition as each of the hydrocarbon groups represented by $R^1$, $R^2$, and $R^3$ in Structure (1), and the preferable range thereof is also the same.

In Structure (4), * represents a binding position.

Specific examples of Structure (1) to Structure (4) include structures shown in the following Table 1.

TABLE 1

| | Structure (1) | | | | | | |
|---|---|---|---|---|---|---|---|
| X | $R^1$ | $R^2$ | $R^3$ | p | n | m | Corresponding structure |
| X-1 | R-1 | R-1 | R-1 | 1 | 1 | 1 | Structure (2) |
| X-1 | R-7 | R-7 | R-7 | 1 | 1 | 1 | Structure (2) |
| X-11 | R-1 | R-1 | R-1 | 1 | 1 | 1 | Structure (3) |
| X-11 | R-7 | R-7 | R-7 | 1 | 1 | 1 | Structure (3) |
| X-12 | R-7 | R-7 | R-7 | 1 | 1 | 1 | Structure (4) |

The three-dimensional cross-linked structure in the shell of the microcapsule can be formed by allowing, for example, a reaction between a tri- or higher functional isocyanate compound or a difunctional isocyanate compound and water or a compound having two or more active hydrogen groups.

Particularly, in a case where a raw material used at the time of manufacturing the microcapsule includes at least one kind of compound having three or more reactive groups (isocyanate groups or active hydrogen groups), a cross-linking reaction is three-dimensional and thus more effectively proceeds, and therefore a three-dimensional network structure is more effectively formed.

The three-dimensional cross-linked structure in the shell of the microcapsule is preferably a product formed by allowing a reaction between a tri- or higher functional isocyanate compound and water.

(Tri- or Higher Functional Isocyanate Compound)

The tri- or higher functional isocyanate compound is a compound having three or more isocyanate groups in a molecule.

Examples of the tri- or higher functional isocyanate compound include a tri- or higher functional aromatic isocyanate compound, a tri- or higher functional aliphatic isocyanate compound, and the like.

In the present disclosure, as a tri- or higher functional isocyanate compound, any one of a known compound and a compound synthesized by the following method can be used.

Examples of the known compound include the compounds described in "Polyurethane Resin Handbook" (edited by Keiji Iwata, published from NIKKAN KOGYO SHIMBUN, LTD. (1987)).

As the tri- or higher functional isocyanate compound, a compound having three or more isocyanate groups in a molecule, specifically, a compound represented by Formula (X) is preferable.

$$X^1\text{-(NCO)}_n \qquad \text{Formula (X)}$$

In Formula (X), $X^1$ represents an n-valent organic group.

In Formula (X), n is equal to or greater than 3. n is preferably 3 to 10, more preferably 3 to 8, and even more preferably 3 to 6.

As the compound represented by Formula (X), a compound represented by Formula (11) is preferable.

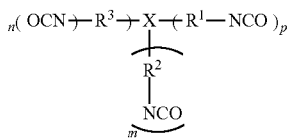

Formula (11)

$X$, $R^1$, $R^2$, $R^3$, p, m, and n in Formula (11) have the same definition as X, R', $R^2$, $R^3$, p, m, and n in Structure (1) described above, and the preferable aspect thereof is also the same.

The tri- or higher functional isocyanate compound is preferably a compound derived from a difunctional isocyanate compound (a compound having two isocyanate groups in a molecule).

The tri- or higher functional isocyanate compound is preferably an isocyanate compound derived from at least one kind of compound selected from isophorone diisocyanate, hexamethylene diisocyanate, trimethylhexamethylene diisocyanate, 1,3-bis(isocyanatomethyl)cyclohexane, m-xylylene diisocyanate, and dicyclohexylmethane 4,4'-diisocyanate.

The phrase "derived from" means that a structure derived from the difunctional isocyanate compound is contained using the above difunctional compound as a raw material.

In addition, as the tri- or higher functional isocyanate compound, for example, an isocyanate compound (adduct type) caused to have three or more functional groups as an adduct product (an adduct type) of a di- or higher functional isocyanate compound (a compound having two or more isocyanate groups in a molecule) and a tri- or higher functional compound having three or more active hydrogen groups in a molecule such as polyol, polyamine, or polythiol, a trimer of a di- or higher functional isocyanate compound (a biuret type or an isocyanurate type), and a compound having three or more isocyanate groups in a molecule such as a formalin condensate of benzene isocyanate are also preferable.

These tri- or higher functional isocyanate compounds are preferably a mixture containing a plurality of compounds. It is preferable that a compound represented by Formula (11A) or Formula (11B) shown below is a main component of this mixture, and other components may also be contained in the mixture.

—Adduct Type—

The tri- or higher functional isocyanate compound of the adduct-type is preferably a compound represented by Formula (11A) or Formula (11B).

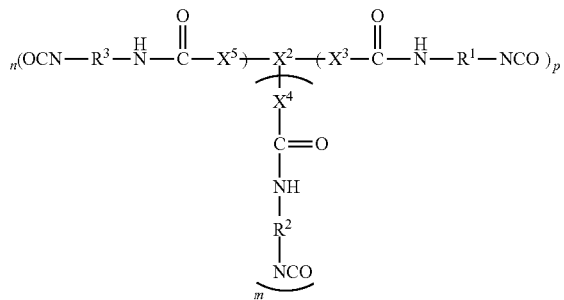

Formula (11A)

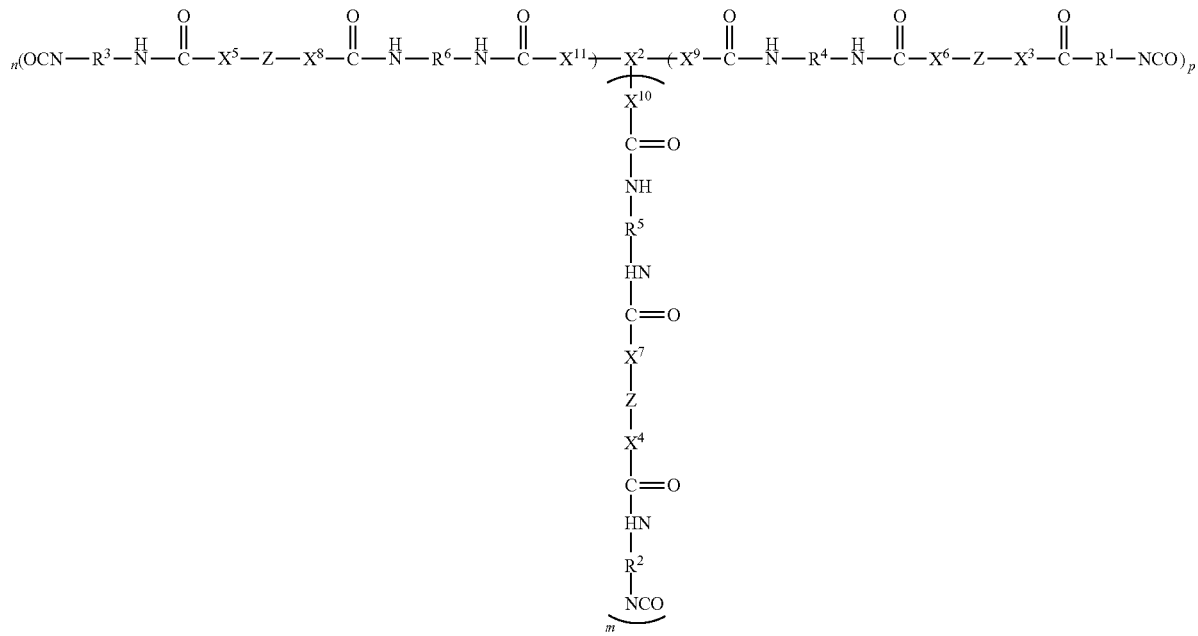

Formula (11B)

In Formula (11A) and Formula (11B), $X^2$ represents a (p+m+n)-valent organic group, each of p, m, and n is 0 or greater, and p+m+n equals 3 or greater.

In Formula (11A) and Formula (11B), $X^3$ to each independently represent O, S, or NH.

In Formula (11A) and Formula (11B), $R^1$ to $R^6$ each independently represent a divalent organic group.

In Formula (11A) and Formula (11B), Z represents a divalent organic group.

In Formula (11A) and Formula (11B), $X^2$ is preferably a (p+m+n)-valent organic group formed by linking at least two groups selected from the group consisting of a hydrocarbon group which may have a ring structure, —NH—, >N—, —C(=O)—, —O—, and S.

In Formula (11A) and Formula (11B), p+m+n preferably equals 3 to 10, more preferably equals 3 to 8, and even more preferably equals 3 to 6.

In Formula (11A) and Formula (11B), $X^3$ to $X''$ each independently preferably represent O or S, and more preferably represent O.

In Formula (11A) and Formula (11B), $R^1$ to $R^6$ each independently preferably represent a hydrocarbon group having 5 to 15 carbon atoms which may have a ring structure.

In Formula (11A) and Formula (11B), the preferable aspect of each of $R^1$ to $R^6$ is the same as the preferable aspect of $R^1$ in Structure (1).

In a case where $X^2$ in Formula (11A) and Formula (11B) is a hydrocarbon group that may have a ring structure, examples of the ring structure include an alicyclic structure, an aromatic ring structure, and the like.

Examples of the alicyclic structure include a cyclohexane ring structure, a bicyclohexane ring structure, a bicyclodecane ring structure, an isobornene ring structure, a dicyclopentane ring structure, an adamantane ring structure, a tricyclodecane ring structure, and the like.

Examples of the aromatic ring structure include a benzene ring structure, a naphthalene ring structure, a biphenyl ring structure, and the like.

In a case where each of $R^1$ to $R^6$ in Formula (11A) and Formula (11B) is a hydrocarbon group having 5 to 15 carbon atoms which may have a ring structure, examples of the ring structure include an alicyclic structure, an aromatic ring structure, and the like.

Examples of the alicyclic structure include a cyclohexane ring structure, a bicyclohexane ring structure, a bicyclodecane ring structure, an isobornene ring structure, a dicyclopentane ring structure, an adamantane ring structure, a tricyclodecane ring structure, and the like.

Examples of the aromatic ring structure include a benzene ring structure, a naphthalene ring structure, a biphenyl ring structure, and the like.

In Formula (11A) and Formula (11B), the (p+m+n)-valent organic group represented by $X^2$ is preferably a group represented by any one of (X2-1) to (X2-10).

(X2-1)

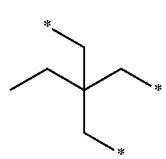

(X2-2)

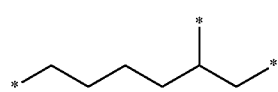

-continued (X2-3)

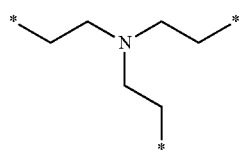

(X2-4)

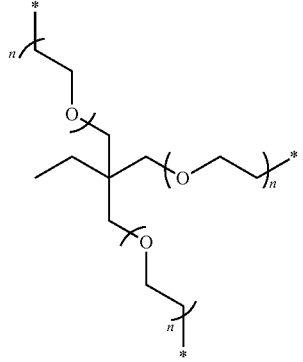

(X2-5)

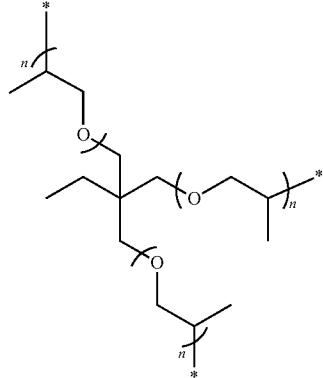

(X2-6)

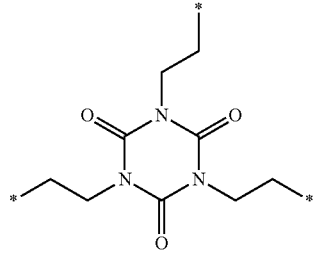

(X2-7)

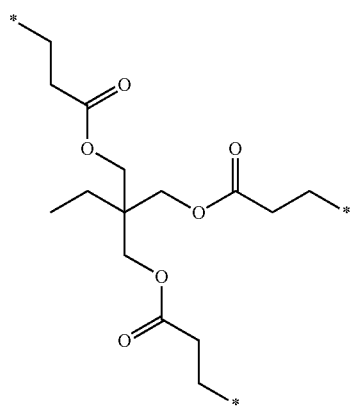

(isocyanatomethyl)cyclohexane, and a group (R-2) derived from dicyclohexylmethane 4,4'-diisocyanate.

As the compound represented by General Formula (11A), a compound represented by Formula (11A-1) is preferable.

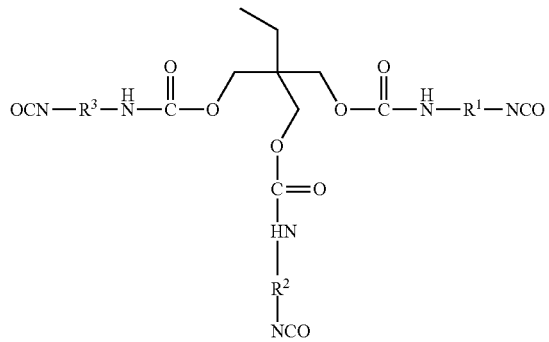

Formula (11A-1)

In Formula (11A-1), $R^1$, $R^2$, and $R^3$ have the same definition as $R^1$, $R^2$, and $R^3$ in Formula (11A), and the preferable aspect thereof is also the same.

The adduct-type tri- or higher functional isocyanate compound can be synthesized by reacting with a compound, which will be described later, having three or more active hydrogen groups in a molecule with a difunctional isocyanate compound which will be described later.

In the present specification, the active hydrogen group means a hydroxyl group, a primary amino group, a secondary amino group, or a mercapto group.

The adduct-type tri- or higher functional isocyanate compound can be obtained by, for example, heating (50° C. to 100° C.) a compound having three or more active hydrogen groups in a molecule and a di- or higher functional isocyanate compound in an organic solvent while stirring, or by stirring the above compounds at a low temperature (0° C. to 70° C.) while adding a catalyst such as stannous octanoate thereto (Synthesis Scheme 1 shown below).

Generally, in regard to the number of moles (number of molecules) of the di- or higher functional isocyanate compound reacted with the compound having three or more active hydrogen groups in a molecule, a di- or higher functional isocyanate compound is used of which the number of moles (number of molecules) is equal to or higher than 60% of the number of moles (the equivalent number of active hydrogen groups) of the active hydrogen groups in the compound having three or more active hydrogen groups in a molecule. The number of moles of the di- or higher functional isocyanate compound is preferably 60% to 500%, more preferably 60% to 300%, and even more preferably 80% to 200% of the number of moles of the active hydrogen groups.

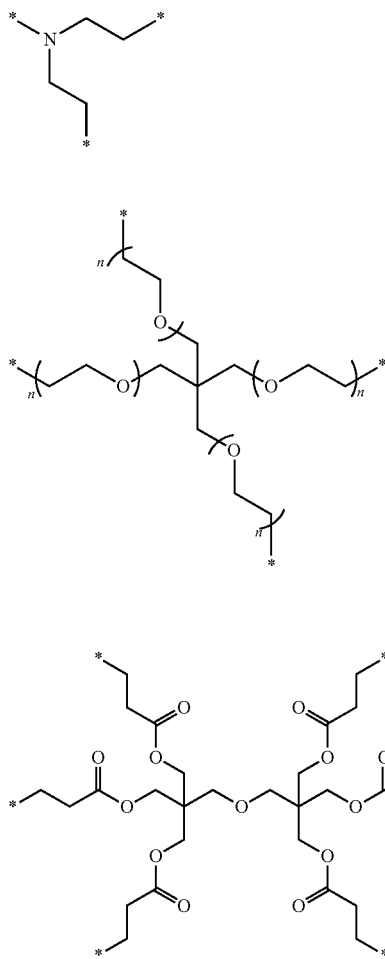

In Formula (X2-1) to Formula (X2-10), n represents an integer of 1 to 200. n preferably represents an integer of 1 to 50, more preferably represents an integer of 1 to 15, and particularly preferably represents an integer of 1 to 8.

In Formula (X2-1) to Formula (X2-10), * represents a binding position.

In Formula (11B), the divalent organic group represented by Z is preferably a hydrocarbon group, a group having a polyoxyalkylene structure, a group having a polycaprolactone structure, a group having a polycarbonate structure, or a group having a polyester structure.

The hydrocarbon group represented by Z may be a linear hydrocarbon group, a branched hydrocarbon group, or a cyclic hydrocarbon group.

The number of carbon atoms in the hydrocarbon group represented by Z is preferably 2 to 30.

In Formula (11A) and Formula (11B), $R^1$ to $R^6$ each independently preferably represent a group (R-1) to a group (R-20).

In Formula (11A) and Formula (11B), $R^1$ to $R^6$ each independently more preferably represent any one of a group (R-3) derived from isophorone diisocyanate (IPDI), a group (R-7) derived from hexamethylene diisocyanate (HDI), a group (R-5) derived from trimethylhexamethylene diisocyanate (TMHDI), a group (R-9) derived from m-xylylene diisocyanate (XDI), a group (R-1) derived from 1,3-bis -Synthesize Scheme 1-

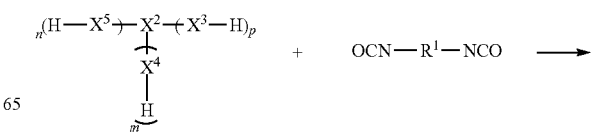

-continued

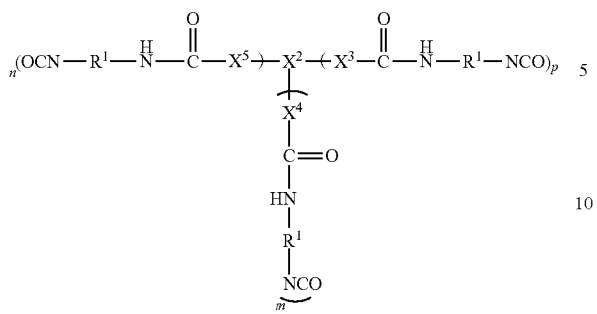

Furthermore, the adduct-type tri- or higher functional isocyanate compound can also be obtained by synthesizing an adduct (a prepolymer; "(PP)" shown in the synthesize scheme below) of a compound having two active hydrogen groups in a molecule and a di- or higher functional isocyanate compound and then allowing the prepolymer to react with a compound having three or more active hydrogen groups in a molecule (Synthesis Scheme 2 shown below).

Examples of the di- or higher functional isocyanate compound include a di- or higher functional aromatic isocyanate compound, a di- or higher functional aliphatic isocyanate compound, and the like.

Specific examples of the di- or higher functional isocyanate compound include isophorone diisocyanate (IPDI), m-phenylene diisocyanate, p-phenylene diisocyanate, 2,6-tolylene diisocyanate, 2,4-tolylene diisocyanate (TDI), naphthalene-1,4-diisocyanate, diphenylmethane-4,4'-diisocyanate (MDI), 3,3'-dimethoxy-biphenyl diisocyanate, 3,3'-dimethyldiphenylmethane-4,4'-diisocyanate, m-xylylene diisocyanate (XDI), p-xylylene diisocyanate, 4-chloroxylylene-1,3-diisocyanate, 2-methylxylylene-1,3-diisocyanate, 4,4'-diphenylpropane diisocyanate, 4,4'-diphenylhexafluoropropane diisocyanate, trimethylene diisocyanate, hexamethylene diisocyanate (HDI), propylene-1,2-diisocyanate, butylene-1,2-diisocyanate, cyclohexylene-1,2-diisocyanate, cyclohexylene-1,3-diisocyanate, cyclohexylene-1,4-diisocyanate, dicyclohexylmethane-4,4'-diisocyanate, 1,4-bis(isocyanatomethyl)cyclohexane, 1,3-bis(isocyanatomethyl)cyclohexane (HXDI), norbornene diisocyanate (NBDI), trimethylhexamethylene diisocyanate (TMHDI), lysine diisocyanate, 1,3-bis(2-isocyanato-2-propyl)benzene, and the like.

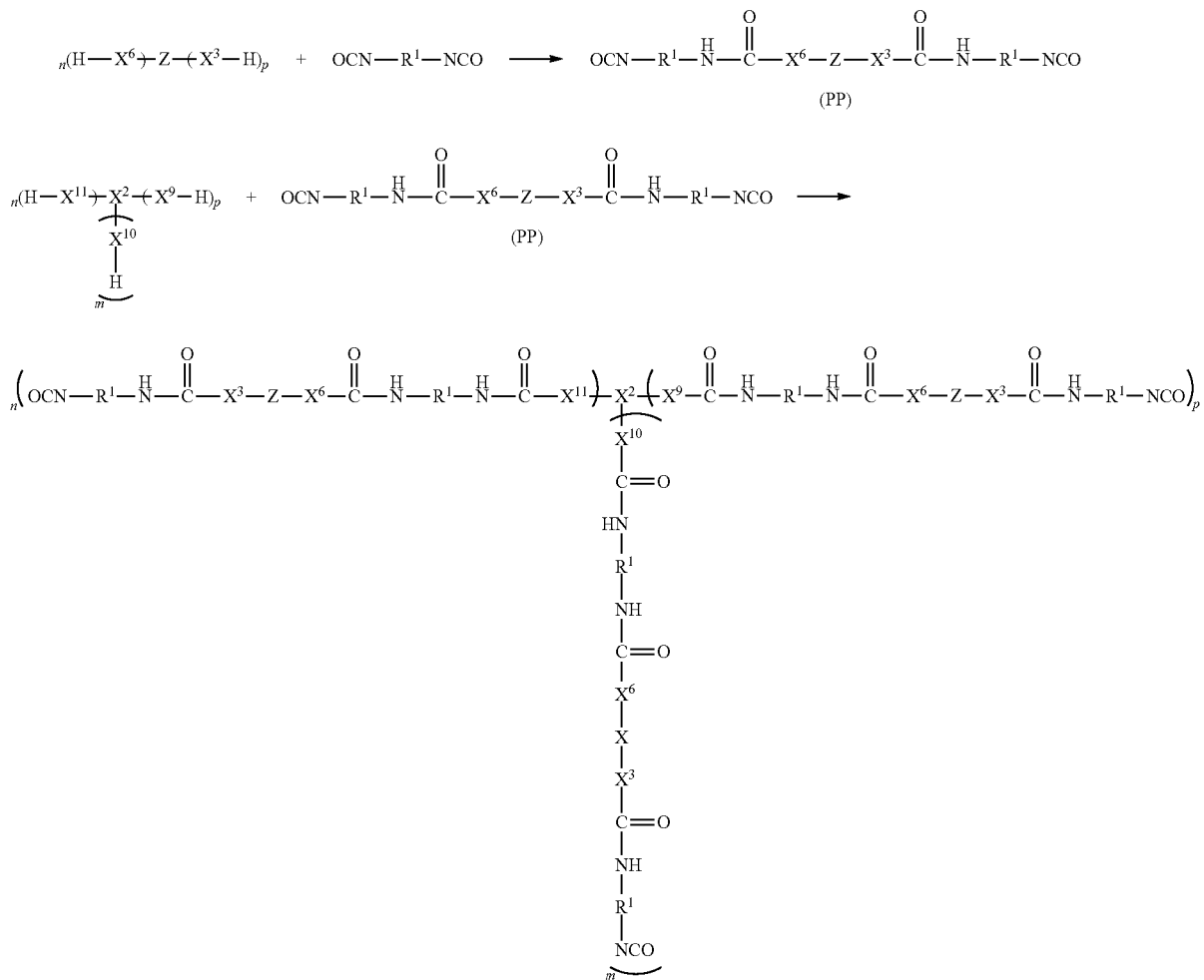

Among these di- or higher functional isocyanate compounds, compounds having structures represented by (I-1) to (1-24) shown below are preferable.
(I-1)
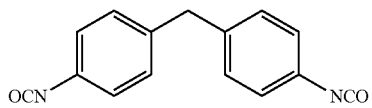
MDI
(I-2)
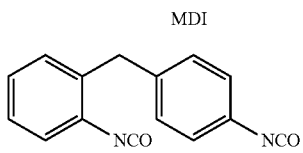
(I-3)
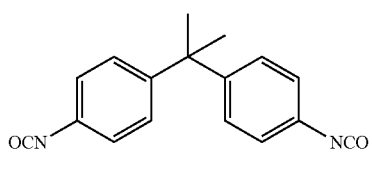
(I-4)
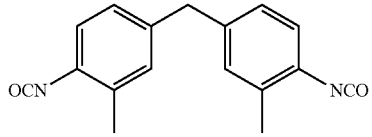
(I-5)
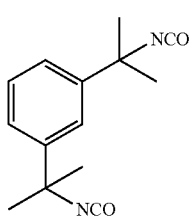
(I-6)
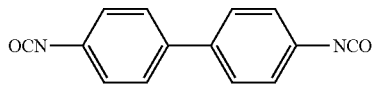
(I-7)
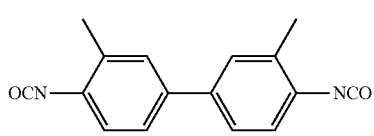
(I-8)
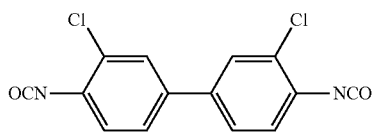
(I-9)
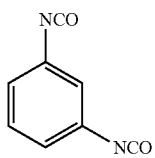
(I-10)
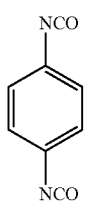
-continued
(I-11)
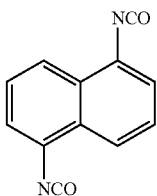
(I-12)
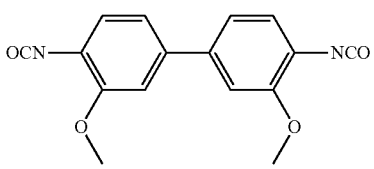
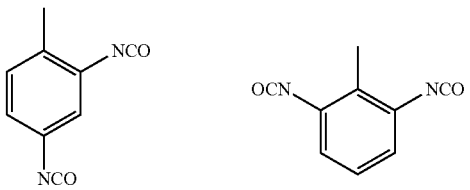
TDI (I-13)　　TDI (I-14)
One or a mixture of these structures
(I-15)
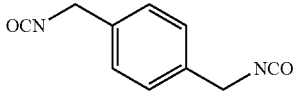
(I-16)
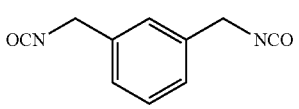
XDI
(I-17)
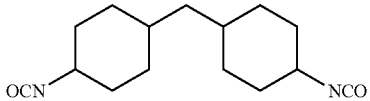
HMDI
(I-18)
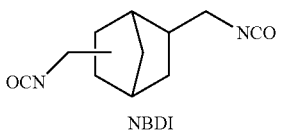
NBDI
(I-19)
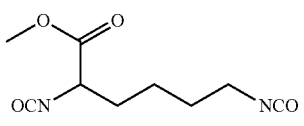
(I-20)
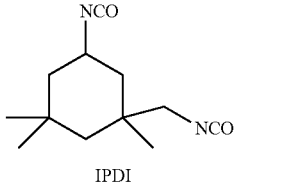
IPDI

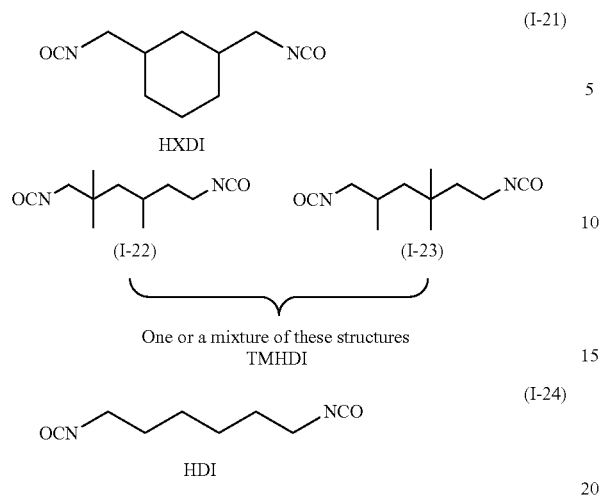

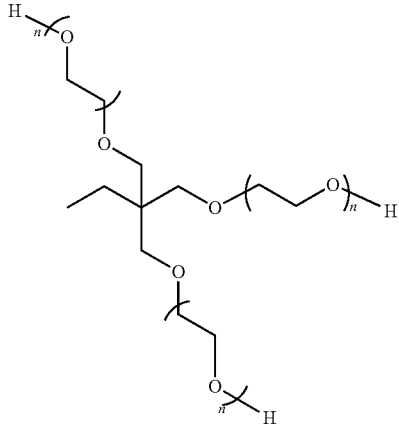

Among the di- or higher functional isocyanate compounds, at least one compound selected from isophorone diisocyanate (IPDI), hexamethylene diisocyanate (HDI), trimethylhexamethylene diisocyanate (TMHDI), 1,3-bis(isocyanatomethyl)cyclohexane (HXDI), m-xylylene diisocyanate (XDI), and dicyclohexylmethane-4,4'-diisocyanate (HMDI) is preferable.

In addition, as the di- or higher functional isocyanate compound, a difunctional isocyanate compound derived from the above compounds can also be used. Examples thereof include DURANATE (registered trademark) D101, D201, A101 (manufactured by Asahi Kasei Corporation) and the like.

The compound having three or more active hydrogen groups in a molecule is a compound having three or more groups, each of which is at least one kind of group selected from a hydroxyl group, a primary amino group, a secondary amino group, and a mercapto group, in a molecule. Examples of the compound include compounds having structures represented by (H-1) to (H-13) shown below. n in the compounds (H-4), (H-5), and (H-11) represents an integer selected from 1 to 100, for example.

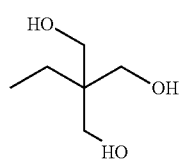

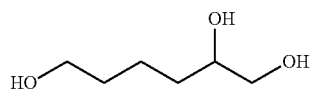

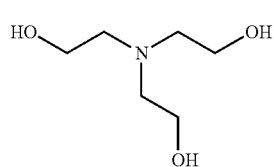

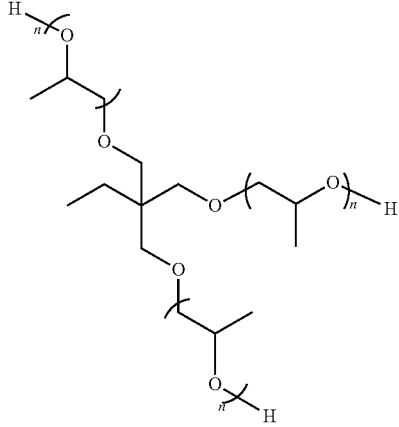

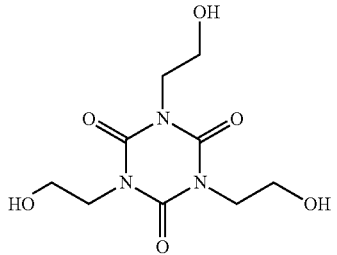

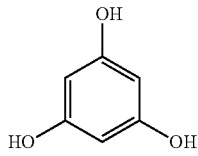

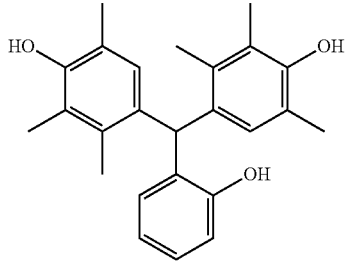

(H-9) 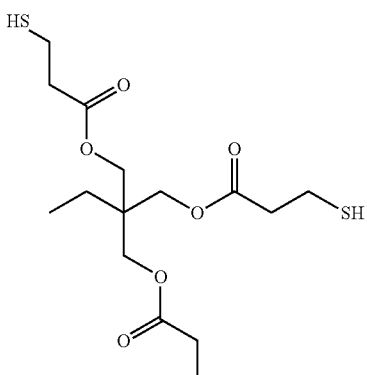

(H-10) 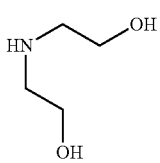

(H-11) 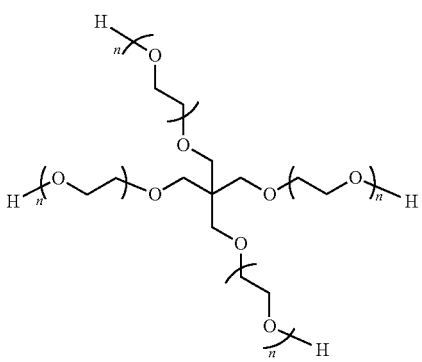

(H-12) 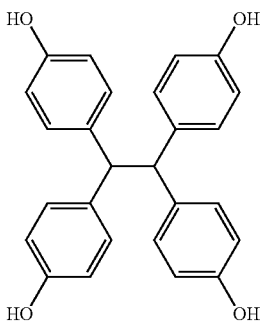

(H-13) 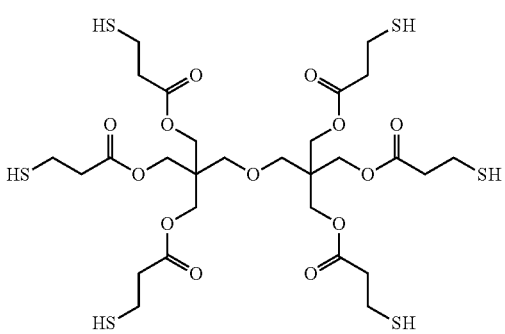

As the adduct-type tri- or higher functional isocyanate compound, a commercially available product on the market may be used.

Examples of the commercially available product include TAKENATE (registered trademark) D-102, D-103, D-103H, D-103M2, P49-75S, D-110, D-120N, D-140N, and D-160N (manufactured by Mitsui Chemicals, Inc.), DESMODUR (registered trademark) L75 and UL57SP (manufactured by Sumika Bayer Urethane Co., Ltd.), CORONATE (registered trademark) HL, HX, and L (manufactured by Nippon Polyurethane Industry Co., Ltd.), P301-75E (manufactured by Asahi Kasei Corporation.), and the like.

Among these adduct-type tri- or higher functional isocyanate compounds, at least one kind selected from D-110, D-120N, D-140N, and D-160N (manufactured by Mitsui Chemicals, Inc.) is more preferable.

—Biuret Type or Isocyanurate Type—

As the isocyanurate-type tri- or higher functional isocyanate compound, a compound represented by Formula (11C) is preferable.

As the biuret-type tri- or higher functional isocyanate compound, a compound represented by Formula (11D) is preferable.

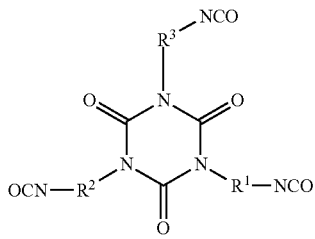

Formula (11C)

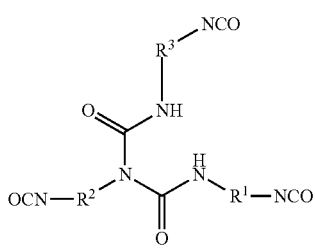

Formula (11D)

In Formula (11C) and Formula (11D), $R^1$, $R^2$, and $R^3$ each independently represent a divalent organic group.

In Formula (11C) and Formula (11D), R', $R^2$, and $R^3$ each independently preferably represent an alkylene group having 1 to 20 carbon atoms which may have a substituent, a cycloalkylene group having 1 to 20 carbon atoms which may have a substituent, or an arylene group having 1 to 20 carbon atoms which may have a substituent.

In Formula (11C) and Formula (11D), R', $R^2$, and $R^3$ each independently particularly preferably represent a group selected from the groups represented by (R-1) to (R-20) described above.

In Formula (11C) and Formula (11D), $R^1$ to $R^3$ each independently more preferably represent any one of the group (R-3) derived from isophorone diisocyanate (IPDI), the group (R-7) derived from hexamethylene diisocyanate (HDI), the group (R-5) derived from trimethylhexamethylene diisocyanate (TMHDI), the group (R-9) derived from m-xylylene diisocyanate (XDI), the group (R-1) derived from 1,3-bis(isocyanatomethyl)cyclohexane, and the group (R-2) derived from dicyclohexylmethane 4,4'-diisocyanate.

As the biuret-type tri- or higher functional isocyanate compound, a commercially available product on the market may be used. Examples of the commercially available product include TAKENATE (registered trademark) D-165N and NP 1100 (manufactured by Mitsui Chemicals, Inc.), DESMODUR (registered trademark) N3200 (Sumika Bayer Urethane Co., Ltd.), DURANATE (registered trademark) 24A-100 (manufactured by Asahi Kasei Corporation.), and the like.

In addition, as the isocyanurate-type tri- or higher functional isocyanate compound, a commercially available product on the market may be used. Examples of the commercially available product include TAKENATE (registered trademark) D-127N, D-170N, D-170HN, D-172N, and D-177N (manufactured by Mitsui Chemicals, Inc.), SUMIDUR N3300, DESMODUR (registered trademark) N3600, N3900, and Z4470BA (manufactured by Sumika Bayer Urethane Co., Ltd.), CORONATE (registered trademark) HX and HK (manufactured by Nippon Polyurethane Industry Co., Ltd.), DURANATE (registered trademark) TPA-100, TKA-100, TSA-100, TSS-100, TLA-100, and TSE-100 (manufactured by Asahi Kasei Corporation.), and the like.

Among these tri- or higher functional isocyanate compounds of the biuret-type and the isocyanurate-type, Duranate (registered trademark) 24A-100 (manufactured by Asahi Kasei Corporation.), D-120N and D-127N (manufactured by Mitsui Chemicals, Inc.), TKA-100, TSS-100, and TSE-100 (manufactured by Asahi Kasei Corporation.) are more preferable.

The content (unit: mmol/g) of the isocyanate group per 1 g of the tri- or higher functional isocyanate compound is preferably 1 mmol/g to 10 mmol/g, more preferably 1.5 mmol/g to 8 mmol/g, and even more preferably 2 mmol/g to 6 mmol/g.

For obtaining the content of the isocyanate group, the isocyanate compound of interest is dissolved in dehydrated toluene, an excess of di-n-butylamine solution is then added thereto so as to cause a reaction, and the rest of the di-n-butylamine solution is subjected to back titration by using hydrochloric acid. From the titration amount at an inflection point on the titration curve, the content of the isocyanate group can be calculated.

More specifically, the content of the isocyanate group can be calculated by the method described below.

By using a potentiometric titrator (AT-510, manufactured by KYOTO ELECTRONICS MANUFACTURING CO., LTD.) and a 1 mol/L aqueous hydrochloric acid solution, neutralization titration is performed at 25° C. by the blank measurement and the sample measurement described below. From the obtained titration amounts Z1 and Z2, the content of the isocyanate group can be calculated from Equation (N).

Content of isocyanate group (mmol/g)=($Z1-Z2$)/($W \times Y$)    Equation (N)

In Equation (N), Z1 represents the titration amount of a blank, Z2 represents the titration amount of a sample, W represents the solid content of the sample, and Y represents the mass of the sample.

—Blank Measurement—

10 mL of dehydrated toluene, 10.0 mL of a 2 mol/L di-n-butylamine solution, and 50 mL of isopropyl alcohol are put into a 100 mL beaker and mixed together, thereby preparing a mixed liquid. For the mixed liquid, neutralization titration is performed using a 1 mol/L hydrochloric acid solution. The inflection point on the titration curve is taken as the end point, and the titration amount Z1 (mL) to the end point is determined.

—Sample Measurement—

A sample (an isocyanate compound) Yg with W % by mass of solid content is collected and put into a 100 mL beaker, 20 mL of dehydrated toluene is added to the beaker, and the sample is dissolved, thereby preparing a solution. 10.0 mL of a 2 mol/L di-n-butylamine solution is added to and mixed with the solution, and then the solution is left to stand for 20 minutes or longer. 50 mL of isopropyl alcohol is added to the solution having been left to stand, and then neutralization titration is performed using a 1 mol/L hydrochloric acid solution. The inflection point on the titration curve is taken as an end point, and the titration amount Z2 (mL) to the end point is determined.

(Water or Compound Having Two or More Active Hydrogen Groups)

The shell of the microcapsule is formed by allowing a reaction between the aforementioned tri- or higher functional isocyanate compound with water or a compound having two or more active hydrogen groups.

As a compound to be reacted with the tri- or higher functional isocyanate compound, generally, water can be used. By allowing the tri- or higher functional isocyanate compound to react with water, a three-dimensional cross-linked structure having a urea bond is formed.

In addition, examples of the compound to be reacted with the tri- or higher functional isocyanate compound includes, other than water, a compound having two or more active hydrogen group. Examples of the compound having two or more active hydrogen groups include a compound having a hydroxyl group (—OH), an amino group (—NH), and a thiol group (—SH) in the molecule, and the like. Specific examples thereof include a polyfunctional alcohol, a polyfunctional phenol, a polyfunctional amine having a hydrogen atom on a nitrogen atom, a polyfunctional thiol, and the like.

By allowing the tri- or higher functional isocyanate compound to react with a polyfunctional alcohol or a polyfunctional phenol, a three-dimensional cross-linked structure having a urethane bond is formed.

By allowing the tri- or higher functional isocyanate compound to react with a polyfunctional amine having a hydrogen atom on a nitrogen atom, a three-dimensional cross-linked structure having a urea bond is formed.

Specific examples of the polyfunctional alcohol include propylene glycol, glycerin, trimethylolpropane, 4,4',4"-trihydroxytriphenylmethane, and the like.

Specific examples of the polyfunctional amine include diethylene triamine, tetraethylene pentamine, lysine, and the like.

Specific examples of the polyfunctional thiol include 1,3-propanedithiol, 1,2-ethanedithiol, and the like.

Specific examples of the polyfunctional phenol include bisphenol A and the like.

One kind of these compounds may be used singly, or two or more kinds thereof may be used in combination.

The compound having two or more active hydrogen groups also includes the aforementioned compound having three or more active hydrogen groups in a molecule.

(Hydrophilic Group Capable of Being Contained in Shell)

The shell of the microcapsule preferably has at least one hydrophilic group.

In a case where the shell has the hydrophilic group, dispersibility in an aqueous medium is further improved. Therefore, in a case where the microcapsule is used for ink, jetting properties and dispersion stability of an ink composition can be further improved.

In addition, in a case where the microcapsule has the hydrophilic group in the shell, hydrophilicity of the microcapsule is improved, and therefore redispersibility becomes excellent.

The hydrophilic group is present in the shell as a part of the three-dimensional cross-linked structure.

Herein, "hydrophilic group is present as a part of the three-dimensional cross-linked structure" means that a covalent bond is formed between the hydrophilic group and a portion of the three-dimensional cross-linked structure other than the hydrophilic group.

A covalent bond between the hydrophilic group and a portion other than the hydrophilic group of the three-dimensional cross-linked structure is preferably a urethane bond or a urea bond.

Examples of the hydrophilic group capable of being present in the shell include an anionic group, a nonionic group, and the like. More specific examples thereof include a carboxy group, a salt of a carboxy group, a phosphonic acid group, a salt of a phosphonic acid group, a phosphate ester group, a salt of a phosphate group, a phosphoric acid group, a salt of a phosphoric acid group, a sulfo group, a salt of a sulfo group, a sulfate group, a salt of a sulfate group, a group having a polyether structure (for example, polyethylene oxide, polypropylene oxide, and the like), a group having a betaine structure, an ammonium group, a sulfonium group, a phosphonium group, and the like. In the present specification, "hydrophilic group" is distinguished from the above-described active hydrogen group (a hydroxyl group, a primary amino group, a secondary amino group, and a mercapto group). The salt of a carboxy group, the salt of a sulfo group, the salt of a sulfate group, the salt of a phosphonic acid group, and the salt of phosphoric acid group described above may be the salts formed by neutralization in the process of manufacturing the microcapsule. The shell of the microcapsule may have only one kind of the hydrophilic group or may have two or more kinds thereof.

The hydrophilic group capable of being introduced into the shell is preferably at least one kind selected from a group having a polyether structure, a carboxy group, and a salt of a carboxy group.

In a case where the hydrophilic group has an acid group and a salt of an acid group, a degree of neutralization in the three-dimensional cross-linked structure of the shell is preferably 50% to 100%. In a case where the degree of neutralization is 50% or more, the dispersion stability of the microcapsule becomes excellent. In addition, in a case where the degree of neutralization is 50% or more, a level of charge repulsion between microcapsules which occurs in water increases, and thus the microcapsules become unlikely to aggregate, thereby realizing excellent dispersion stability.

From the viewpoint of increasing the dispersion stability of the microcapsule, particularly the dispersion stability for a long period of time (that is, storage stability), the degree of neutralization is preferably 50% to 95%, more preferably 80% to 95%, and even more preferably 90% to 95%.

In a case where the degree of neutralization is 95% or less, a urethane bond and a urea bond are less susceptible to hydrolysis, and therefore the neutralized acid group contributing to the dispersibility is present in a state of being more firmly bonded to the three-dimensional cross-linked structure of the shell by which excellent dispersion stability is maintained for a long period of time.

In the present specification, the term "degree of neutralization" means a ratio of the number of moles of neutralized acid group with respect to a total of the number of moles of neutralized acid group and the number of moles of unneutralized acid group [the number of moles of neutralized acid group/(the number of moles of neutralized acid group+the number of moles of unneutralized acid group)], in the whole hydrophilic group contained in the three-dimensional cross-linked structure of the shell of the microcapsule.

—Measurement Method of Degree of Neutralization—

In the present specification, the degree of neutralization (%) is measured by a potentiometric method described below. A measurement device is not particularly limited, and for example, an automatic potentiometric titrator (model number: AT-510) of KYOTO ELECTRONICS MANUFACTURING CO., LTD. can be suitably used.

Hereinafter, a case where the acid group is a carboxy group (—COOH) will be described with reference to an example. In the following description, in a case where the acid group is a group other than a carboxy group (sulfo group, phosphoric acid group, and the like), the degree of neutralization can be measured by replacing the carboxy group with groups other than the carboxy group.

First, the aqueous dispersion having the microcapsule containing the shell in which at least some of the carboxy groups are neutralized carboxy groups and containing the core, which is a measurement target of the degree of neutralization, is prepared.

50 g of the prepared aqueous dispersion is subjected to centrifugation under the conditions of 80,000 rpm and 40 minutes. The supernatant generated by the centrifugation is removed, and the precipitate (microcapsule) is collected.

Approximately 0.5 g of the microcapsule collected in a container 1 is weighed, and a weighed value W1 (g) is recorded. Subsequently, a mix solution of 54 mL of tetrahydrofuran (THF) and 6 mL of distilled water is added thereto, and the weighed microcapsule is diluted so as to obtain a sample 1 for measurement of degree of neutralization.

Titration is performed on the obtained sample 1 for measurement of degree of neutralization by using 0.1 N (=0.1 mol/L) aqueous solution of sodium hydroxide as a titrant, and a titrant volume required up to the equivalent point is recorded as F1 (mL). In a case where a plurality of equivalent points are obtained in the titration, a value of the equivalent points at a maximum titration amount is used. A "maximum titration amount F1 (mL)" corresponds to an amount of acid group which is not neutralized (that is, —COOH) among the acid groups introduced into the shell of the microcapsule.

In addition, approximately 0.5 g of the microcapsule collected in a container 2 is weighed, and a weighed value W2 (g) is recorded. Subsequently, 60 mL of acetate is added thereto, and the weighed microcapsule is diluted so as to obtain a sample 2 for measurement of degree of neutralization.

Titration is performed on the obtained sample 2 for measurement of degree of neutralization by using 0.1 N (=0.1 mol/L) perchloric acid-acetic acid solution as a titrant, and a titrant volume required up to the equivalent point is recorded as F2 (mL). In a case where a plurality of equivalent points are obtained in the titration, a value of the equivalent points at a maximum titration amount is used. A "maximum titration amount F2 (mL)" corresponds to an amount of acid group which is neutralized (that is, —COONa) among the acid groups introduced into the shell of the microcapsule.

Based on the measurement values of "F1 (mL)" and "F2 (mL)", the degree of neutralization (%) of a carboxy group which is the acid group is calculated according to the following equations.

$F1$ (mL)×normality of aqueous solution of sodium hydroxide (0.1 mol/L)/$W1$ (g)+$F2$ (mL)×normality of perchloric acid-acetic acid solution (0.1 mol/L)/$W2$ (g)=amount of carboxy group introduced into shell per 1 g of microcapsule (mmol/g)    (1)

$F2$ (mL)×normality of perchloric acid-acetic acid solution (0.1 mol/L)/$W2$ (g)=amount of neutralized carboxy group among carboxy group introduced into shell per 1 g of microcapsule (mmol/g)    (2)

Degree of neutralization (%)=(2)/(1)×100

A method for introducing the hydrophilic group into the shell of the microcapsule will be described.

The introduction of a hydrophilic group into the shell can be performed by allowing a reaction between the aforementioned tri- or higher functional isocyanate compound, water or a compound having two or more active hydrogen groups, and a compound having a hydrophilic group.

In addition, the introduction of the hydrophilic group into the shell of the microcapsule can be carried out as follows. First, a di- or higher functional isocyanate compound is allowed to react with a compound having a hydrophilic group so as to manufacture an isocyanate compound into which the hydrophilic group is introduced, next, "the isocyanate compound into which the hydrophilic group is introduced" is allowed to react with a compound having two or more active hydrogen groups so as to manufacture a tri- or higher functional isocyanate compound into which the hydrophilic group is introduced, and next, "the tri- or higher functional isocyanate compound into which the hydrophilic group is introduced" is allowed to react with water or a compound having two or more active hydrogen groups.

—Compound Having Hydrophilic Group—

Examples of the compound having the hydrophilic group include amino acids such as α-amino acids (specifically, lysine, alanine, arginine, asparagine, aspartic acid, cysteine, glutamine, glutamic acid, glycine, histidine, isoleucine, leucine, methionine, phenylalanine, proline, serine, threonine, tryptophan, tyrosine, and valine). Specific examples of the compound having the hydrophilic group, other than α-amino acid are as below.

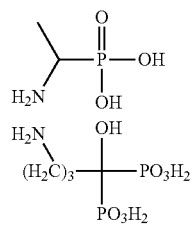
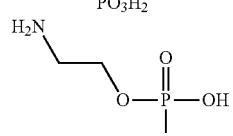
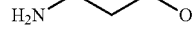
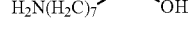

In a case where the compound having the anionic group is used as the compound having the hydrophilic group, the compound having the anionic group may be used by neutralizing at least some of the anionic group by using an inorganic base such as sodium hydroxide or potassium hydroxide; an organic base such as triethylamine, or the like.

Among the compound having the hydrophilic group, as a compound having a nonionic group, a compound having a polyether structure is preferable, and a compound having a polyoxyalkylene chain is more preferable.

Specific examples of the compound having a polyoxyalkylene chain include polyethylene oxide, polypropylene oxide, polytetramethylene oxide, polystyrene oxide, polycyclohexylene oxide, a polyethylene oxide-polypropylene oxide block copolymer, a polyethylene oxide-polypropylene oxide random copolymer, and the like.

Among these compounds having a polyoxyalkylene chain, polyethylene oxide, polypropylene oxide, and a polyethylene oxide-polypropylene oxide block copolymer are preferable, and polyethylene oxide is more preferable.

Furthermore, as the compound having a polyether structure, a polyethylene oxide monoether compound (examples of the monoether include monomethyl ether, monoethyl ether, and the like) and a polyethylene oxide monoester compound (examples of the monoester include a monoacetic acid ester, a mono(meth)acrylic acid ester, and the like) are also preferable.

—Isocyanate Compound into which Hydrophilic Group is Introduced—

In addition, as described above, for introducing a hydrophilic group into the shell, an isocyanate compound into which a hydrophilic group is introduced can also be used.

The isocyanate compound into which a hydrophilic group is introduced is preferably a reaction product between a compound having a hydrophilic group, isophorone diisocyanate (IPDI), hexamethylene diisocyanate (HDI), trimethylhexamethylene diisocyanate (TMHDI), 1,3-bis(isocyanatomethyl)cyclohexane (HXDI), m-xylylene diisocyanate (XDI), or dicyclohexylmethane-4,4'-diisocyanate (HMDI).

In a case where the group having a polyether structure is introduced into the shell, as the isocyanate compound into which the hydrophilic group is introduced, an adduct (such as TAKENATE D-116N manufactured by Mitsui Chemicals, Inc.) of trimethylolpropane (TMP), m-xylylene diisocyanate (XDI), and polyethylene glycol monomethyl ether is preferable.

In a case of introducing a carboxy group or a salt thereof into the shell, as the isocyanate compound into which the hydrophilic group is introduced, it is preferable to use a reaction product (that is, isocyanate compound containing a carboxy group or a salt thereof) between 2,2-bis(hydroxymethyl)propionic acid (DMPA) or a salt of thereof and isophorone diisocyanate (IPDI).

As the salt of a carboxy group, a sodium salt, a potassium salt, a triethylamine salt, or a dimethylethanolamine salt is preferable, and a sodium salt or a triethylamine salt is more preferable.

In a case of using the compound having a hydrophilic group for introducing a hydrophilic group into the shell, an added amount of the compound having a hydrophilic group is preferably 0.1% by mass to 50% by mass, more preferably 0.1% by mass to 45% by mass, even more preferably 0.1% by mass to 40% by mass, even more preferably 1% by mass to 35% by mass, and even more preferably 3% by mass to 30% by mass, with respect to the total solid content of the microcapsule.

(Polymerizable Group Capable of being Contained in Shell)

The microcapsule contains the polymerizable compound (that is, the compound having the polymerizable group) in the core, which means that the microcapsule has the polymerizable group, but in addition to the polymerizable group of the polymerizable compound contained in the core, the shell of the microcapsule may have the polymerizable group bound by a covalent bond.

In a case where the shell of the microcapsule has the polymerizable group, the microcapsules adjacent to each other are bonded to each other by irradiation with active energy rays, and therefore an image having excellent film hardness can be formed.

Whether the shell has the polymerizable group bound by a covalent bond can be checked by the following method.

Tetrahydrofuran (THF) having a mass 100 times the mass of the microcapsule is added to and mixed with the microcapsule, thereby preparing a solution. The solution was subjected to centrifugation under the condition of 80,000 rpm and 40 minutes, and a supernatant liquid is separated from a residue. It is considered that the polymerizable compound contained in the core of the microcapsule is extracted into the supernatant, and therefore it is considered that the residue does not contain the polymerizable group contained in the polymerizable compound of the core.

A case where Fourier transform infrared spectroscopy (FT-IR) for example is performed on the residue generated by centrifugation, and a peak derived from the polymerizable group is observed, means that the shell has the polymerizable group bound by a covalent bond.

A method for introducing the polymerizable group into the shell of the microcapsule will be described.

Examples of a method for introducing the polymerizable group into the shell of the microcapsule include a method in which in a case of forming the three-dimensional cross-linked structure containing at least one bond selected from a urethane bond or a urea bond, the above-described tri- or higher functional isocyanate compound, water or the above-described compound having two or more active hydrogen groups, and the monomer for introducing the polymerizable group, are allowed to react with each other;

a method in which in a case of manufacturing the above-described tri- or higher functional isocyanate compound, first, the above-described di- or higher functional isocyanate compound and the monomer for introducing the polymerizable group are allowed to react with each other so as to manufacture an isocyanate compound into which the polymerizable group is introduced, and subsequently, the isocyanate compound into which the polymerizable group is introduced is allowed to react with water or the above-described compound having two or more active hydrogen groups;

a method in which in a case of manufacturing the microcapsule, the monomer for introducing the polymerizable group is dissolved in an oil-phase component together with the components constituting the microcapsule, and a water-phase component is mixed with the oil-phase component, followed by emulsification and dispersion; and the like.

Examples of the polymerizable compound used for introducing a polymerizable group into the microcapsule include a compound which has at least one active hydrogen group and has an ethylenically unsaturated bond on at least one terminal thereof.

The compound which has at least one active hydrogen group and has an ethylenically unsaturated bond on at least one terminal thereof can be represented by Structural Formula (a).

$$L^1 L c_m Z_n \tag{a}$$

In Structural Formula (a), $L^1$ represents an (m+n)-valent linking group, m and n each independently represent an integer selected from 1 to 100, Lc represents a monovalent ethylenically unsaturated group, and Z represents an active hydrogen group.

$L^1$ is preferably an aliphatic group having a valency of 2 or higher, an aromatic group having a valency of 2 or higher, a heterocyclic group having a valency of 2 or higher, —O—, —S—, —NH—, —N<, —CO—, —SO—, —SO$_2$—, or a combination of these.

m and n each independently preferably represent 1 to 50, more preferably represent 2 to 20, even more preferably represent 3 to 10, and particularly preferably represent 3 to 5.

Examples of the monovalent ethylenically unsaturated group represented by Lc include an allyl group, a vinyl group, an acryloyl group, a methacryloyl group, and the like.

Z is preferably OH, SH, NH, or NH$_2$, more preferably OH or NH$_2$, and even more preferably OH.

Examples of the compound which has at least one active hydrogen group and has an ethylenically unsaturated bond on at least one terminal thereof will be shown below, but the present invention is not limited to the structures thereof. n in the compounds (a-3) and (a-14) represents an integer selected from 1 to 90, for example.

(a-1)
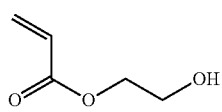

(a-2)
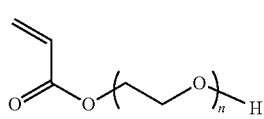

(a-3)
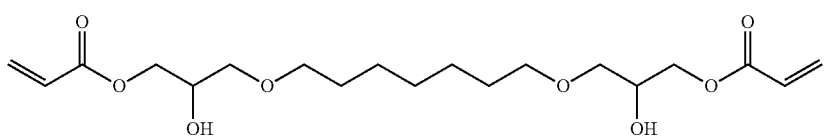

(a-4)

(a-5)
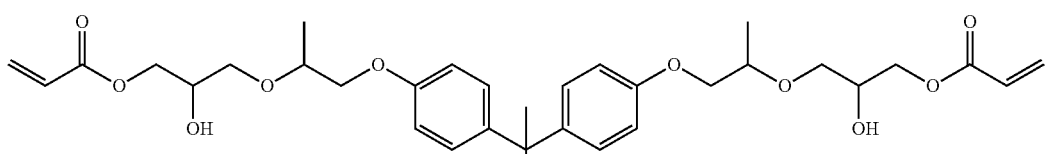

(a-6)

DA-250

(a-7)
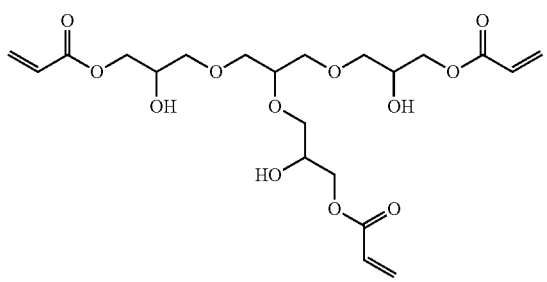

DA-314

(a-8)
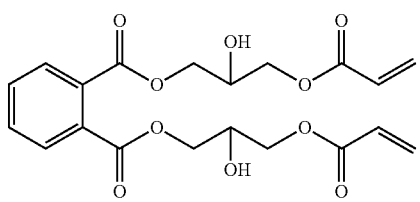

DA-721

(a-9)
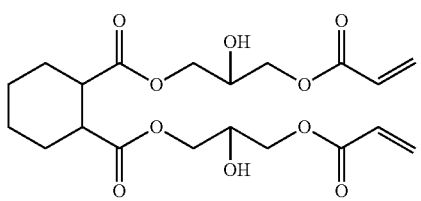

DA-722

(a-10)
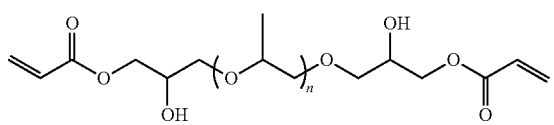

n = 1
DA-911M

-continued

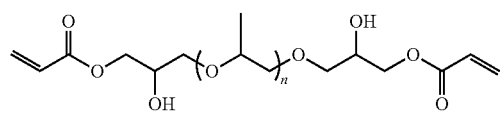
n = 3
DA-920
(a-11)

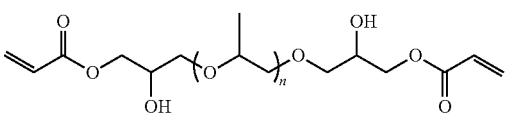
n = 11
DA-931
(a-12)

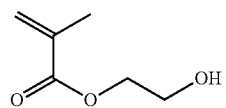
(a-13)

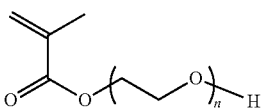
(a-14)

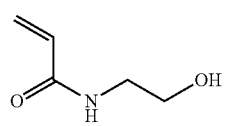
(a-15)

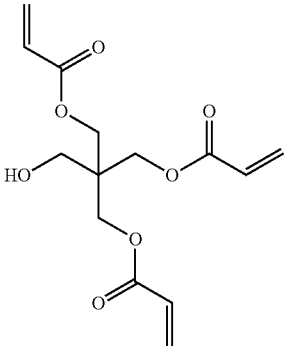
A-TMM-3L
(a-16)

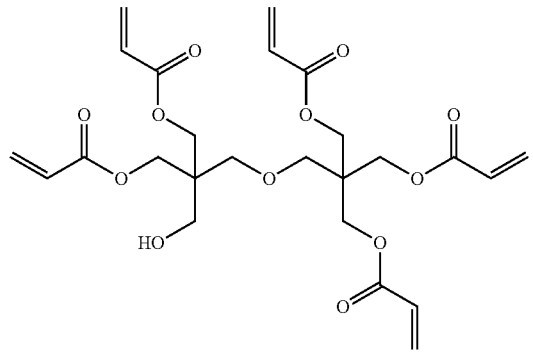
SR399E
(a-17)

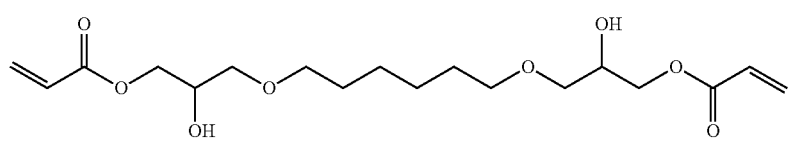
(a-18)

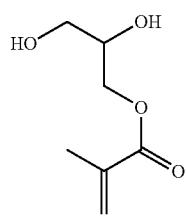
(a-19)

As the compound which has at least one active hydrogen group and has an ethylenically unsaturated bond on at least one terminal thereof, commercially available products may also be used. Examples thereof include acrylates such as hydroxyethyl acrylate (manufactured by OSAKA ORGANIC CHEMICAL INDUSTRY LTD), 4-hydroxybutyl acrylate, 1,4-cyclohexanedimethanol monoacrylate (manufactured by Nippon Kasei Chemical Co., Ltd), BLEMMER (registered trademark) AE-90U (n=2), AE-200 (n=4.5), AE-400 (n=10), AP-150 (n=3), AP-400 (n=6), AP-550 (n=9), AP-800 (n=13) (manufactured by NOF CORPORATION), and DENACOL (registered trademark) ACRYLATE DA-212, DA-250, DA-314, DA-721, DA-722, DA-911M, DA-920, DA-931 (manufactured by Nagase ChemteX Corporation), 2-hydroxyethyl methacrylate (manufactured by KYOEISHA CHEMICAL Co., LTD), methacrylates such as BLEMMER (registered trademark) PE-90 (n=2), PE-200 (n=4.5), PE-350 (n=8), PP-1000 (N=4 to 6), PP-500 (n=9), and PP-800 (n=13) (manufactured by NOF CORPORATION), A-TMM-3L (manufactured by SHIN-NAKAMURA CHEMICAL CO., LTD.), and SR-399E (manufactured by Sartomer Arkema Inc.), acrylamide (manufactured by KJ Chemicals Corporation), and the like.

Among these compounds which have at least one active hydrogen group and have an ethylenically unsaturated bond on at least one terminal thereof, hydroxyethyl acrylate (manufactured by OSAKA ORGANIC CHEMICAL INDUSTRY LTD), AE-400 (n=10), AP-400 (n=6) (manufactured by NOF CORPORATION), DENACOL (registered trademark) ACRYLATE DA-212 (manufactured by Nagase ChemteX Corporation), PP-500 (n=9) (manufactured by NOF CORPORATION), A-TMM-3L (manufactured by SHIN-NAKAMURA CHEMICAL CO., LTD.), and SR-399E (manufactured by Sartomer Arkema Inc.) are preferable.

The introduction of a polymerizable group into the microcapsule can be performed, for example, in a manner shown in a synthesis scheme 3 described below in which an isocyanate compound into which a polymerizable group is introduced is prepared by allowing the isocyanate group of the tri- or higher functional isocyanate compound to react with the active hydrogen group of the compound which has at least one active hydrogen group and has an ethylenically unsaturated bond on at least one terminal thereof, and the prepared isocyanate compound into which a polymerizable group is introduced is reacted with the aforementioned compound having two or more active hydrogen groups.

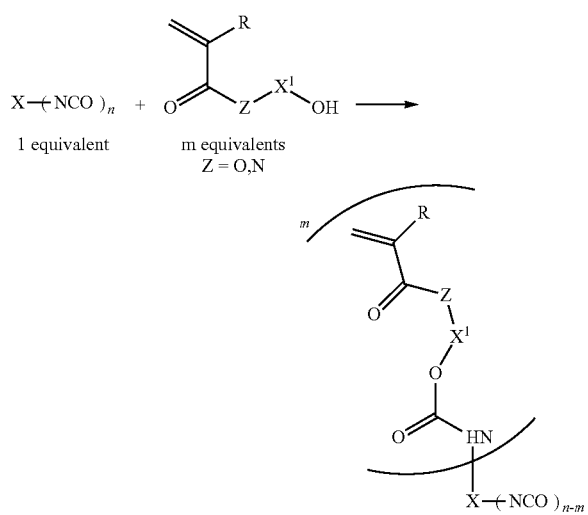

One kind of monomer for introducing a polymerizable group may be used alone, or two or more kinds thereof may be used in combination.

At the time of manufacturing the isocyanate compound into which a polymerizable group is introduced, the polyisocyanate (that is, the tri- or higher functional isocyanate compound) and the monomer for introducing the polymerizable group are reacted with each other, such that the number of moles of the active hydrogen group of the monomer for introducing the polymerizable group preferably becomes 1% to 30% (more preferably becomes 2% to 25% and even more preferably becomes 3% to 20%) of the number of moles of the isocyanate group of the polyisocyanate.

In the isocyanate compound into which a polymerizable group is introduced, the average number of functional groups of the isocyanate group is equal to or smaller than 3 in some cases. However, even in these cases, as long as the raw materials for forming the shell contain at least one tri- or higher functional isocyanate compound, the shell having the three-dimensional cross-linked structure can be formed.

~Physical Properties of Microcapsule~

A volume average particle diameter of the microcapsule is preferably 0.01 µm to 10.0 µm, more preferably 0.01 µm to 5 µm, and even more preferably 0.05 µm to 1 µm, from the viewpoint of the dispersibility of the microcapsule in a case where the aqueous dispersion is adopted.

The volume average particle diameter of the microcapsule can be measured by a light scattering method. In the present specification, as the volume average particle diameter, a value measured using a wet-type particle size distribution measurement apparatus, LA-960 (manufactured by HORIBA, Ltd.) is used.

~Usage of Microcapsule~

The usage of the microcapsule is not particularly limited, and for example, ink (particularly, ink jet ink), a coating agent, an adhesive, a paint, and the like can be used.

<Aqueous Dispersion>

The aqueous dispersion of the present disclosure contains the above-described microcapsule of the present disclosure and water. The aqueous dispersion may further contain a colorant.

The aqueous dispersion containing the microcapsule makes the formation of the film having excellent adhesiveness to a substrate and hardness possible.

The usage of the aqueous dispersion is not particularly limited, and for example, ink (particularly, ink jet ink), a coating agent, an adhesive, a paint, and the like can be used. The aqueous dispersion is preferably used as an ink and is more preferably used as an ink jet ink.

[Microcapsule]

As the microcapsule, the above-described microcapsule of the present disclosure is used.

With the core of the microcapsule containing the di- or lower functional polymerizable compound and the tri- or higher functional polymerizable compound, the adjacent microcapsules can be bonded to each other, and therefore a film can be formed.

In the microcapsule, the shell has the hydrophilic group and has the three-dimensional cross-linked structure containing at least one bond selected from a urethane bond or a urea bond. With the three-dimensional cross-linked structure containing the hydrophilic group, the dispersibility of the microcapsule in water becomes excellent, and the jetting properties become excellent in a case of the form of the ink jet ink. The three-dimensional cross-linked structure containing at least one bond selected from a urethane bond or a urea bond, means that the shell having the three-dimensional cross-linked structure containing the urethane bond and the like is contained, and therefore a firm structure is contained. It is considered that a structure of each microcapsule is firm, leading to the suppression of aggregation or linking between microcapsules, and therefore dispersion stability of the microcapsule is improved.

The solid content of the microcapsule is preferably contained by 1% by mass to 50% by mass, more preferably contained by 3% by mass to 40% by mass, and even more preferably contained by 5% by mass to 30% by mass with respect to the total mass of the aqueous dispersion, from the viewpoints of dispersibility and polymerizable properties.

The content of the microcapsule is a value including solid components such as the di- or lower functional polymerizable compound, the tri- or higher functional polymerizable compound, and the photopolymerization initiator, which are to be contained in the core of the microcapsule.

The total solid content of the microcapsule is preferably 50% by mass or more, more preferably 60% by mass or more, even more preferably 70% by mass or more, still more preferably 80% by mass or more, and particularly preferably 85% by mass or more, with respect to the total solid content of the aqueous dispersion. An upper value of the total solid content of the microcapsule may be, with respect to the total solid content of the aqueous dispersion, 100% by mass, and preferably 99% by mass or less and more preferably 95% by mass or less in a case where the aqueous dispersion contains solid components other than the microcapsule.

—Internal Content Rate—

The internal content rate (% by mass) of the polymerizable compound means the amount of the polymerizable compound contained in the core of the microcapsule (that is, the polymerizable compound contained in the interior of the microcapsule) with respect to the total amount of the polymerizable compounds in the aqueous dispersion in a case where the aqueous dispersion is prepared, and refers to a value obtained as below. Hereinafter, the polymerizable compound will be described with reference to an example.

—Method for Measuring Internal Content Rate (% by mass) of Polymerizable Compound—

The operation described below is performed under the condition of a liquid temperature of 25° C.

In a case where the aqueous dispersion does not contain a colorant, the operation described below is performed using the aqueous dispersion as it is. In a case where the aqueous dispersion contains the colorant, first, the colorant is removed from the aqueous dispersion by centrifugation, and then the operation described below is performed on the aqueous dispersion from which the colorant has been removed.

First, an aqueous dispersion which is a measurement target of the internal content rate (% by mass) of the polymerizable compound is prepared, and from the aqueous dispersion, two samples (hereinafter, referred to as "sample 1" and "sample 2") of the same mass are collected.

Tetrahydrofuran (THF) having a mass 100 times the mass of the total solid content in the sample 1 is added to and mixed with the sample 1, thereby preparing a diluted solution. The obtained diluted solution is subjected to centrifugation under the conditions of 80,000 rpm and 40 minutes. The supernatant (hereinafter, referred to as "supernatant 1") generated by the centrifugation is collected. It is considered that by this operation, all of the polymerizable compound contained in the sample 1 is extracted into the supernatant 1. The mass of the polymerizable compound contained in the collected supernatant 1 is measured by liquid chromatography (for example, a liquid chromatography device manufactured by Waters Corporation). The obtained mass of the polymerizable compound is taken as "total amount of polymerizable compound".

Furthermore, the sample 2 is subjected to centrifugation under the same conditions as in the centrifugation performed on the aforementioned diluted solution. The supernatant (hereinafter, referred to as "supernatant 2") generated by the centrifugation is collected. It is considered that by this operation, the polymerizable compound that was not contained in the interior of the microcapsule in the sample 2 (that is, the free polymerizable compound) is extracted into the supernatant 2. The mass of the polymerizable compound contained in the collected supernatant 2 is measured by liquid chromatography (for example, a liquid chromatography device manufactured by Waters Corporation). The obtained mass of the polymerizable compound is taken as "amount of the free polymerizable compound".

Based on the "total amount of polymerizable compound" and the "amount of free polymerizable compound" described above, the internal content rate (% by mass) of the polymerizable compound is calculated according to the equation shown below.

Internal content rate (% by mass) of polymerizable compound=((total amount of polymerizable compound−amount of free polymerizable compound)/total amount of polymerizable compound)×100

The aqueous dispersion contains at least one di- or lower functional polymerizable compound and at least one tri- or higher functional polymerizable compound, and therefore internal content rates of all of the two or more polymerizable compounds may be obtained with a total amount of these two or more polymerizable compounds taken as "total amount of polymerizable compound" and a total free amount of the two or more polymerizable compounds taken as "amount of free polymerizable compound", and an internal content rate of any one of the polymerizable compound may be obtained with an amount of any one of the polymerizable compound taken as "total amount of polymerizable compound" and a free amount of any one of the polymerizable compound taken as "amount of free polymerizable compound".

Whether or not the components other than the polymerizable compound are contained in the interior of the microcapsule can be checked by the same method as the method for investigating whether or not the polymerizable compound is contained in the interior of the gel particles.

For a compound having a molecular weight equal to or greater than 1,000, by measuring the masses of the compounds contained in the supernatant 1 and the supernatant 2 described above by gel permeation chromatography (GPC) and taking the masses as "total amount of compound" and "amount of free compound" respectively, the internal content rate (% by mass) of the compound is determined.

An internal content rate of the photopolymerization initiator can be measured by the method same as that of the internal content rate of the polymerizable compound.

The internal content rate (% by mass) of the photopolymerization initiator in the aqueous dispersion is preferably equal to or higher than 10% by mass, more preferably equal to or higher than 50% by mass, even more preferably equal to or higher than 70% by mass, still more preferably equal to or higher than 80% by mass, yet more preferably equal to or higher than 90% by mass, much more preferably equal to or higher than 95% by mass, far more preferably equal to or higher than 97% by mass, and particularly preferably equal to or higher than 99% by mass, from the viewpoint of curing sensitivity of the film.

In a case where the aqueous dispersion contains two or more kinds of photopolymerization initiators, it is preferable that the internal content rate of at least one kind of photopolymerization initiator is within the above-described range.

[Water]

The aqueous dispersion contains water.

An amount of water is not particularly limited. Among these, a content of water is preferably 10% by mass to 99% by mass, more preferably 20% by mass to 95% by mass, even more preferably 30% by mass to 90% by mass, and still more preferably 50% by mass to 90% by mass.

[Colorant]

The aqueous dispersion may contain at least one kind of colorant.

In a case where the aqueous dispersion contains a colorant, it is preferable that the aqueous dispersion contains the colorant in the exterior of the microcapsule.

The colorant is not particularly limited and can be used by being arbitrarily selected from known coloring materials such as a pigment, a water-soluble dye, and a dispersed dye. It is more preferable that the aqueous dispersion contains a pigment among the above colorants, because the pigment has high weather fastness and excellent color reproducibility.

The pigment is not particularly limited and can be appropriately selected according to the purpose. Examples thereof include known organic pigments and inorganic pigments, resin particles stained with a dye, commercially available pigment dispersions, and surface-treated pigments (for example, those obtained by dispersing a pigment in water, a liquid compound, an insoluble resin, or the like as a dispersion medium and pigments of which the surface is treated with a resin, a pigment derivative, or the like).

Examples of the organic pigments and inorganic pigments include a yellow pigment, a red pigment, a magenta pigment, a blue pigment, a cyan pigment, a green pigment, an orange pigment, a purple pigment, a brown pigment, a black pigment, a white pigment, and the like.

In a case where a pigment is used as a colorant, if necessary, a pigment dispersant may be used at the time of preparing the pigment particles.

In addition, examples of the pigment include commercially available pigment dispersions, and surface-treated pigments (those obtained by treating pigment surfaces with a dispersant such as a resin, a pigment derivative, and the like, and a self-dispersing pigment having a hydrophilic group on a particle surface, and the like). Furthermore, as the pigment, pigment dispersions on the market may be used.

Among these, as the pigment, a pigment of which a pigment surface is treated with a resin having a hydrophilic group, and a self-dispersing pigment having a hydrophilic group on a particle surface are preferably used. As the hydrophilic group, an anionic group (a carboxy group, a phosphoric acid group, a sulfo group, and the like) is preferable.

In the present specification, the term "self-dispersing pigment" refers to a pigment and the like which is obtained by, to a pigment surface, directly linking or indirectly bonding a plurality of hydrophilic functional groups and/or a salt thereof (hereinafter will also be referred to as "dispersibility imparting group") via an alkyl group, an alkyl ether group, an aryl group, and the like, and which exhibits at least one of water dispersibility or water solubility under absence of a dispersant for dispersing the pigment and the like so as to be able to maintain a dispersion state in the aqueous dispersion (for example, an ink).

For example, generally, an ink containing the self-dispersing pigment as a colorant does not necessarily contain a dispersant that is to be contained to disperse the pigment, and therefore is advantageous in that foaming caused by deterioration of an anti-foaming property due to the dispersant occurs less, leading to easy preparation of an ink having excellent jetting stability.

Examples of the dispersibility imparting group bonded to the surface of the self-dispersing pigment include —COOH, —CO, —OH, —$SO_3H$, —$PO_3H_2$, and quaternary ammonium, and salts thereof. In regard to the bonding of the dispersibility imparting group, the pigment subjected to a physical treatment or a chemical treatment so as to bond (that is, graft) an active species having the dispersibility imparting group or the dispersibility imparting group to the pigment surface. Examples of the physical treatment include a vacuum plasma treatment and the like. Examples of the chemical treatment include a wet oxidation method in which the pigment surface is oxidized with an oxidizing agent in water, a method in which a carboxy group is bonded via a phenyl group by bonding p-aminobenzoic acid to the pigment surface, and the like.

Preferable examples of the self-dispersing pigment include a self-dispersing pigment which is surface-treated by oxidation treatment using a hypohalous acid and/or a salt of a hypohalous acid as an oxidizing agent or oxidation treatment using ozone as an oxidizing agent.

As the self-dispersing pigment, a commercially available product may be used.

Examples of the commercially available product of the self-dispersing pigment include MICROJET CW-1 (trade name; Orient Chemical Industries Co., Ltd.), CAB-O-JET (registered trademark) 200, CAB-O-JET (registered trademark) 300, and CAB-O-JET (registered trademark) 450C (trade name; Cabot Corporation), and the like.

In a case where a pigment is used as a colorant, if necessary, a pigment dispersant may be used at the time of preparing the pigment particles.

Regarding the coloring material such as a pigment and the pigment dispersant, paragraphs "0180" to "0200" in JP2014-040529A can be referred to as appropriate.

A content of the colorant in the aqueous dispersion can be appropriately selected and is preferably 0.1% by mass to 30% by mass and more preferably 0.5% by mass to 20% by mass with respect to the total mass of the aqueous dispersion.

[Surfactant]

The aqueous dispersion may contain a surfactant. The surfactant used in the aqueous dispersion is distinguished from a surfactant used in a case of manufacturing the microcapsule.

In a case where the aqueous dispersion of the present disclosure contains the surfactant, wettability of the aqueous dispersion to a substrate is improved.

Examples of the surfactant include a nonionic surfactant, a cationic surfactant, an anionic surfactant, and the like, all of which may be used as the surfactant. From the viewpoint of suppressing water-dispersible foam, a content of anionic surfactant is preferably 1% by mass or less with respect to the total mass of the aqueous dispersion.

In addition, in a case where the aqueous dispersion contains the colorant, the content of anionic surfactant is preferably 1% by mass or less with respect to a total mass of the aqueous dispersion. In the above case, a case where the content of anionic surfactant is 1% by mass or less is particularly advantageous in that in a case where an aqueous dispersion liquid is combined with a pigment dispersion having an anionic dispersing group, it is possible to suppress a phenomenon in which an ion concentration in a system increases due to the anionic surfactant, leading to a decrease in a degree of ionization in the anionic pigment dispersant and thus a decrease in the dispersibility of the pigment. From the same viewpoint thereof, the content of anionic surfactant is preferably 0.5% by mass or less, more preferably 0.1% by mass or less, and even more preferably 0% by mass (that is, not containing anionic surfactant).

Examples of the surfactant include a higher fatty acid salt, alkyl sulfate, alkyl ester sulfate, alkyl sulfonate, alkylbenzene sulfonate, sulfosuccinate, naphthalene sulfonate, alkyl phosphate, polyoxyalkylene alkyl ether phosphate, polyoxyalkylene alkyl phenyl ether, polyoxyethylene polyoxypropylene glycol, glycerin ester, sorbitan ester, polyoxyethylene fatty acid amide, amine oxide, and the like.

From the viewpoint of the dispersibility of the microcapsule, the surfactant is preferably alkyl sulfate having an alkyl chain length of 8 to 18, more preferably at least one kind of surfactant selected from sodium dodecyl sulfate (SDS, alkyl chain length: 12) and sodium cetyl sulfate (SCS, alkyl chain length: 16), and even more preferably sodium cetyl sulfate (SCS).

Examples of surfactants other than the above-described surfactant include those described in JP1987-173463A (JP-S62-173463A) and JP1987-183457A (JP-S62-183457A). Examples of other surfactants include nonionic surfactants such as polyoxyethylene alkyl ethers, polyoxyethylene alkyl allyl ethers, acetylene glycols, polyoxyethylene/polyoxypropylene block copolymers, and siloxanes.

In addition, examples of the surfactant include an organic fluoro compound.

The organic fluoro compound is preferably hydrophobic. Examples of the organic fluoro compound include a fluorine-based surfactant, an oil-like fluorine-based compound (for example, fluorine oil), a solid-like fluorine compound resin (for example tetrafluoroethylene resin), and those described in JP1982-9053B (JP-S57-9053B) (the eighth column to the seventeenth column) and JP1987-135826A (JP-S62-135826A).

[Other Additives]

If necessary, the aqueous dispersion may contain other components in addition to the components described above. Hereinafter, the other components will be described below.

(Polymerization Inhibitor)

From the viewpoint of increasing storage stability, a polymerization inhibitor may be added. Examples of the polymerization inhibitor include p-methoxyphenol, quinones such as hydroquinone and methoxybenzoquinone, phenothiazine, catechols, alkyl phenols, alkyl bisphenols, zinc dimethyldithiocarbamate, copper dimethyldithiocarbamate, copper dibutyldithiocarbamate, copper salicylate, thiodipropionic acid esters, mercaptobenzimidazole, phosphites, and the like, and p-methoxyphenol, catechols, and quinones are preferable, and hydroquinone, benzoquinone, p-methoxyphenol, TEMPO, TEMPOL, cupferron Al, tris(N-nitroso-N-phenylhydroxylamine)aluminum salt, and the like are particularly preferable.

(Ultraviolet Absorber)

An ultraviolet absorber may be used in the aqueous dispersion from the viewpoints of improving weather fastness of the obtained image and preventing fading.

Examples of the ultraviolet absorber include known ultraviolet absorbers such as a benzotriazole-based compound, a benzophenone-based compound, a triazine-based compound, a benzoxazole-based compound, and the like.

(Organic Solvent)

The organic solvents may be added to the aqueous dispersion in order to improve adhesiveness to a substrate.

Alcohols (for example, methanol, ethanol, propanol, isopropanol, butanol, isobutanol, sec-butanol, tert-butanol, pentanol, hexanol, cyclohexanol, benzyl alcohol, and the like)

Polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol, 2-methylpropanediol, and the like)

Polyhydric alcohol ethers (for example, ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, propylene glycol monophenyl ether, and the like)

Amines (for example, ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, tetramethylpropylenediamine, and the like)

Amides (for example, formamide, N,N-dimethylformamide, N,N-dimethylacetamide, and the like)

Heterocyclic rings (for example, 2-pyrrolidone, N-methyl-2-pyrrolidone, cyclohexyl pyrrolidone, 2-oxazolidone, 1,3-dimethyl-2-imidazolidinone, γ-butyrolactone, and the like)

Sulfoxides (for example, dimethyl sulfoxide and the like)

Sulfones (for example, sulfolane and the like)

Others (urea, acetonitrile, acetone, and the like)

It is preferable that 0.1% by mass to 5% by mass of the organic solvent is added with respect to the whole aqueous dispersion.

(Photopolymerization Initiator Capable of Being Contained in the Exterior of Microcapsule)

The aqueous dispersion may contain the photopolymerization initiator in the exterior of the microcapsule.

The aqueous dispersion containing the photopolymerization initiator in the exterior of the microcapsule makes effective improvement of a polymerization reaction between the microcapsules possible, and therefore the film having further strong film hardness can be formed. Furthermore, the polymerization reaction proceeds with high efficiency even with respect to active energy rays (light) having low exposure illuminance (for example, 40 mJ/cm$^2$ to 70 mJ/cm$^2$).

Examples of the photopolymerization initiator include the same photopolymerization initiator as described above (that is, photopolymerization initiator contained in the interior of the microcapsule).

As the photopolymerization initiator capable of being contained in the exterior of the microcapsule, a water-soluble or water-dispersible photopolymerization initiator is preferable. From this viewpoint, examples thereof include DAROCUR (registered trademark) 1173, IRGACURE (registered trademark) 2959, IRGACURE (registered trademark) 754, DAROCUR (registered trademark) MBF, IRGACURE (registered trademark) 819DW, and IRGACURE (registered trademark) 500 (all of which are manufactured by BASF SE), the acylphosphine oxide compound described in WO2014/095724A, the photopolymerization initiator described in WO86/05778A, and the like.

The term "water-soluble" refers to a property in which in a case where the resin is dried for 2 hours at 105° C., the amount of the resin dissolving in 100 g of distilled water having a temperature of 25° C. exceeds 1 g.

Furthermore, the term "water-dispersible" refers to a property in which the resin is water-insoluble but is dispersed in water. The term "water-insoluble" herein refers to a property in which in a case where the resin is dried for 2 hours at 105° C., the amount of the resin dissolving in 100 g of distilled water having a temperature of 25° C. is equal to or smaller than 1 g.

(Polymerizable Compound Capable of Being Contained in the Exterior of Microcapsule)

The aqueous dispersion may contain the polymerizable compound in the exterior of the microcapsule.

The aqueous dispersion containing the polymerizable compound in the exterior of the microcapsule makes effective improvement of a polymerization reaction between the microcapsules possible, and therefore the film having further strong film hardness can be formed. Furthermore, the polymerization reaction proceeds with high efficiency even with respect to active energy rays (light) having low exposure illuminance (for example, 40 mJ/cm² to 70 mJ/cm²).

In a case where the aqueous dispersion contains the polymerizable compound in the exterior of the microcapsule, it is preferable that the above-described photopolymerization initiator is further contained in the exterior of the microcapsule, and therefore the film having further strong film hardness can be formed.

Examples of the polymerizable compound capable of being contained in the exterior of the microcapsule include radically polymerizable compounds such as a compound having an ethylenically unsaturated group, acrylonitrile, styrene, unsaturated polyester, unsaturated polyether, unsaturated polyamide, and unsaturated urethane.

Among these, as the polymerizable compound capable of being contained in the exterior of the microcapsule, a compound having an ethylenically unsaturated group is preferable, and a compound having a (meth)acryloyl group is particularly preferable. Furthermore, as the polymerizable compound capable of being contained in the exterior of the microcapsule, a water-soluble or a water-dispersible polymerizable compound is preferable.

Examples of the polymerizable compound capable of being contained in the exterior of the microcapsule include radically polymerizable compounds such as a compound having an ethylenically unsaturated group, acrylonitrile, styrene, unsaturated polyester, unsaturated polyether, unsaturated polyamide, and unsaturated urethane.

Among these, as the polymerizable compound capable of being contained in the exterior of the microcapsule, a compound having an ethylenically unsaturated group is preferable, and a compound having a (meth)acryloyl group is particularly preferable.

Furthermore, as the polymerizable compound capable of being contained in the exterior of the microcapsule, a water-soluble or a water-dispersible polymerizable compound is preferable.

The term "water-soluble" used for the polymerizable compound capable of being contained in the exterior of the microcapsule has the same meaning as the term "water-soluble" used for the "photopolymerization initiator capable of being contained in the exterior of the microcapsule" described above, and the term "water-dispersible" used for the polymerizable compound capable of being contained in the exterior of the microcapsule has the same meaning as the term "water-dispersible" used for the "photopolymerization initiator capable of being contained in the exterior of the microcapsule" described above.

From the viewpoint of the water solubility or the water dispersibility, as the aforementioned polymerizable compound, a compound having at least one kind of structure selected from an amide structure, a polyethylene glycol structure, a polypropylene glycol structure, a carboxy group, and a salt of a carboxy group is preferable.

From the viewpoint of the water solubility or the water dispersibility, as the polymerizable compound capable of being contained in the exterior of the microcapsule, for example, at least one kind of compound selected from (meth)acrylic acid, sodium (meth)acrylate, potassium (meth)acrylate, N,N-dimethylacrylamide, N,N-diethylacrylamide, morpholine acrylamide, N-2-hydroxyethyl (meth) acrylamide, N-vinylpyrrolidone, N-vinylcaprolactam, 2-hydroxyethyl (meth)acrylate, 3-hydroxypropyl (meth)acrylate, 2-hydroxypropyl (meth)acrylate, glycerin monomethacrylate, N-[tris(3-acryloylaminopropyloxymethyl ene)methyl] acrylamide, diethylene glycol bis(3-acryloylaminopropyl) ether, polyethylene glycol di(meth)acrylate, polypropylene glycol di(meth)acrylate, compounds represented by General Formulas (a) to (d), and ethoxylated trimethylolpropane triacrylate (for example, SR9035 manufactured by Sartomer Arkema Inc.) is preferable, and at least one kind of compound selected from (meth)acrylic acid, N,N-dimethylacrylamide, N-2-hydroxyethyl (meth)acrylamide, 2-hydroxyethyl (meth)acrylate, glycerin monomethacrylate, N-[tris(3-acryloylaminopropyloxymethylene)methyl]acrylamide, diethylene glycol bis(3-acryloylaminopropyl)ether, polyethylene glycol di(meth)acrylate, polypropylene glycol di(meth)acrylate, compounds represented by General Formulas (a) to (d), and ethoxylated trimethylolpropane triacrylate (for example, SR9035 manufactured by Sartomer Arkema Inc.) is more preferable.

General Formula (a)

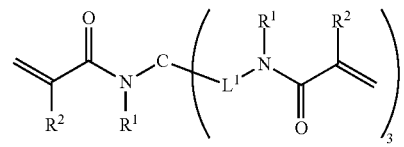

General Formula (b)

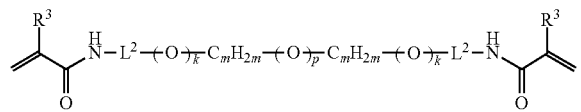

General Formula (c)

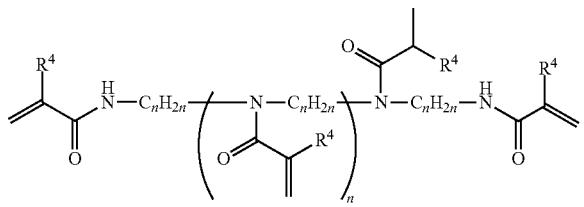

General Formula (d)

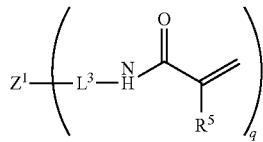

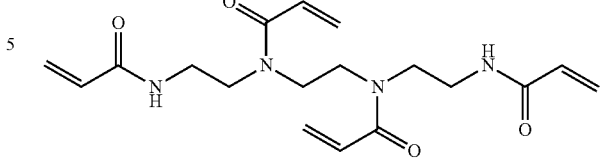

AM-4

In General Formula (a), a plurality of $R^1$'s each independently represent a hydrogen atom, an alkyl group, an aryl group or a heterocyclic group, a plurality of $R^2$'s each independently represent a hydrogen atom or a methyl group, and a plurality of $L^1$'s each independently represent a single bond or a divalent linking group.

In General Formula (b), a plurality of $R^3$'s each independently represent a hydrogen atom or a methyl group, a plurality of $L^2$'s each independently represent an alkylene group having 1 to 8 carbon atoms, a plurality of k's and p each independently represent 0 or 1, and a plurality of m's each independently represent an integer of 0 to 8, provided that at least one of k's or p is 1.

In General Formula (c), a plurality of $R^4$'s each independently represent a hydrogen atom or a methyl group, a plurality of n's each independently represent an integer of 1 to 8, 1 represents an integer of 0 or 1.

In General Formula (d), $Z^1$ represents a residue obtained by removing q hydrogen atoms from the hydroxyl group of the polyol, q represents an integer of 3 to 6, a plurality of $R^5$'s each independently represent a hydrogen atom or a methyl group, and a plurality of $L^3$'s each independently represent an alkylene group having 1 to 8 carbon atoms.

Specific examples of the compounds represented by General Formula (a) to General Formula (d) include compounds represented by the following AM-1 to AM-4.

AM-1

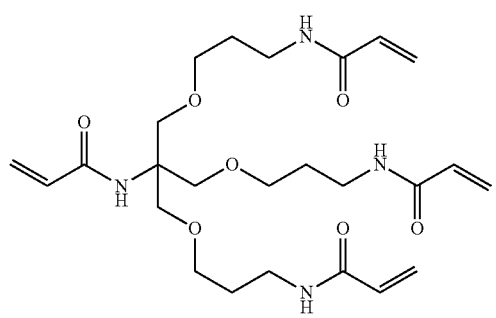

AM-2

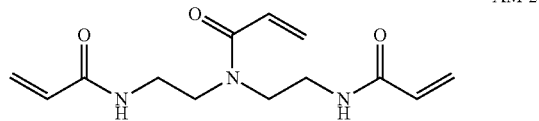

AM-3

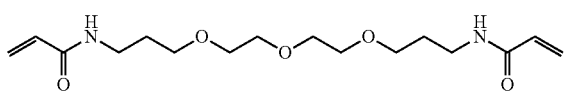

The above AM-1 to AM-4 can be synthesized by a method described in JP5591858B.

(Water-Soluble Resin or Water-Dispersible Resin Capable of Being Contained in the Exterior of Microcapsule)

A structure of the water-soluble resin or the water-dispersible resin capable of being contained in the exterior of the microcapsule is not particularly limited and may be an arbitrary structure. Examples of the structure of the water-soluble resin or the water-dispersible resin capable of being contained in the exterior of the microcapsule include structures such as a chain structure, a branched structure, a star structure, a cross-linked structure, and a network structure.

The term "water-soluble" used for the water-soluble resin capable of being contained in the exterior of the microcapsule has the same meaning as the term "water-soluble" used for the "photopolymerization initiator capable of being contained in the exterior of the microcapsule" described above, and the term "water-dispersible" used for the water-dispersible resin capable of being contained in the exterior of the microcapsule has the same meaning as the term "water-dispersible" used for the "photopolymerization initiator capable of being contained in the exterior of the microcapsule" described above.

In addition, the water-soluble resin or the water-dispersible resin is preferably a resin having a functional group selected from a carboxy group, a salt of a carboxy group, a sulfo group, a salt of a sulfo group, a sulfate group, a salt of a sulfate group, a phosphonic acid group, a salt of a phosphonic acid group, a phosphoric acid group, a salt of a phosphoric acid group, an ammonium base, a hydroxyl group, a carboxylic acid amide group, and an alkyleneoxy group.

As a countercation of the aforementioned salt, an alkali metal cation such as sodium or potassium, an alkali earth metal cation such as calcium or magnesium, an ammonium cation, or a phosphonium cation is preferable, and an alkali metal cation is particularly preferable.

As an alkyl group contained in the ammonium group of the ammonium base, a methyl group or an ethyl group is preferable.

As a counteranion of the ammonium base, a halogen anion such as chlorine or bromine, a sulfate anion, a nitrate anion, a phosphate anion, a sulfonate anion, a carboxylate anion, or a carbonate anion is preferable, and a halogen anion, a sulfonate anion, or a carboxylate anion is particularly preferable.

As a substituent on a nitrogen atom of the carboxylic acid amide group, an alkyl group having 8 or less carbon atoms is preferable, and an alkyl group having 6 or less carbon atoms is particularly preferable.

The resin having an alkyleneoxy group preferably has an alkyleneoxy chain formed of repeating alkyleneoxy groups. The number of alkyleneoxy groups contained in the alkyleneoxy chain is preferably 2 or greater, and particularly preferably 4 or greater.

~Preferable Physical Properties of Aqueous Dispersion~

In a case where the temperature of the aqueous dispersion is set at a range of 25° C. to 50° C., the viscosity of the aqueous dispersion is preferably 3 mPa·s to 15 mPa·s, and more preferably 3 mPa·s to 13 mPa·s. Particularly, as the aqueous dispersion, it is preferable that the viscosity of the aqueous dispersion at 25° C. is 50 mPa·s or less. In a case where the viscosity of the aqueous dispersion is within the above range, in a case of adopting the aqueous dispersion for ink jet recording, a high level of jetting stability can be realized.

As the viscosity of the aqueous dispersion, a value measured using a viscometer (VISCOMETER TV-22, manufactured by TOKI SANGYO CO., LTD) is used.

[Method for Manufacturing Aqueous Dispersion]

The method for manufacturing an aqueous dispersion of the present disclosure is not particularly limited, as long as the above-described aqueous dispersion can be manufactured.

As the method for manufacturing an aqueous dispersion of the present disclosure, from the viewpoint of easily obtaining the above-described aqueous dispersion, a method for manufacturing an aqueous dispersion of the present embodiment which will be described below is preferable.

A method for manufacturing the aqueous dispersion of the present embodiment (hereinafter, will also be referred to as "manufacturing method of the present embodiment"), includes: a preparation step of mixing the oil-phase component containing the tri- or higher functional isocyanate compound, the di- or lower functional polymerizable compound, the tri- or higher functional polymerizable compound, the photopolymerization initiator, and the organic solvent, with the water-phase component containing water, and emulsifying and dispersing the mixture so as to prepare an aqueous dispersion, in which the proportion of the di- or lower functional polymerizable compound is 20% by mass or more with respect to the total mass of the di- or lower functional polymerizable compound and the tri- or higher functional polymerizable compound.

In the preparation step, at least one of the oil-phase component or the water-phase component preferably contains the compound having the hydrophilic group.

<Preparation Step>

The preparation step is a step of mixing the oil-phase component containing the tri- or higher functional isocyanate compound, the di- or lower functional polymerizable compound, the tri- or higher functional polymerizable compound, the photopolymerization initiator, and the organic solvent, with the water-phase component containing water, and emulsifying and dispersing the mixture so as to prepare an aqueous dispersion, in which the proportion of the di- or lower functional polymerizable compound is 20% by mass or more with respect to the total mass of the di- or lower functional polymerizable compound and the tri- or higher functional polymerizable compound.

In the preparation step, at least one of the oil-phase component or the water-phase component preferably contains the compound having the hydrophilic group.

As described above, the oil-phase component and the water-phase component are mixed so as to be emulsified and dispersed, and therefore the above-described microcapsule of the present disclosure can be formed.

The oil-phase component used in the preparation step contains the tri- or higher functional isocyanate compound, the di- or lower functional polymerizable compound, the tri- or higher functional polymerizable compound, the photopolymerization initiator, and the organic solvent.

The water-phase component used in the preparation step contains water.

In the preparation step, at least one of the oil-phase component or the water-phase component contains the compound having the hydrophilic group.

In the preparation step, the microcapsule including: the shell that has the hydrophilic group and the three-dimensional cross-linked structure containing at least one bond selected from a urethane bond or a urea bond; and the core that is in the interior of the shell and contains the di- or lower functional polymerizable compound, the tri- or higher functional polymerizable compound, and the photopolymerization initiator, is formed. The formed microcapsule is a dispersoid in the manufactured aqueous dispersion.

Meanwhile, water in the water-phase component is a dispersion medium in produced the aqueous dispersion.

In more detail regarding the formation of the shell, the shell having the three-dimensional cross-linked structure containing a urea bond is formed by a reaction between a tri- or higher functional isocyanate compound and water. In addition, a case where the tri- or higher functional isocyanate compound contains a urethane bond (for example, a case of the tri- or higher functional isocyanate compound obtained by using a polyfunctional alcohol as raw material), means that the three-dimensional cross-linked structure of the shell contains a urethane bond.

In addition, a neutralizer is added to oil phase or water phase, and a hydrophilic group of the compound having the hydrophilic group may be neutralized by the neutralizer. The compound having the hydrophilic group also relates to the reaction for forming the shell, and therefore a case in which the hydrophilic group is neutralized means that the neutralized hydrophilic group (for example, a salt of an acid group in a case where the hydrophilic group is the acid group) is introduced into the three-dimensional cross-linked structure of the shell. A salt of the neutralized hydrophilic group is excellent for the effect of dispersing the microcapsule in water. A degree of neutralization of the hydrophilic group can be adjusted according to an amount of neutralizer, and the like.

Examples of the neutralizer include sodium hydroxide, potassium hydroxide, triethanolamine, and the like.

In a case where the oil-phase component contains the isocyanate compound having the polymerizable group, the isocyanate compound having the polymerizable group also relates to the reaction for forming the shell, and therefore the polymerizable group is introduced into the shell (that is, the shell having the polymerizable group is formed).

Examples of the organic solvent contained in the oil-phase component include ethyl acetate, methyl ethyl ketone, and the like.

It is preferable that at least some of the organic solvent is removed during the formation process of the microcapsule or after the formation of the microcapsule.

The detailed description of the tri- or higher functional isocyanate compound contained in the oil-phase component is as described above.

The detailed description of the isocyanate compound having the polymerizable group, which is contained in the oil-phase component, and the polymerizable compound is as described above.

The detailed description of the photopolymerization initiator contained in the oil-phase component is as described above.

If necessary, the oil-phase component may contain other components in addition to the aforementioned components.

Examples of the other components include the above-described sensitizer, and the like.

The sensitizer can be contained in the core of the microcapsule by being incorporated into the oil-phase component.

The detailed description of the compound having the hydrophilic group, which is contained in the water-phase component is as described above.

If necessary, the water-phase component may contain other components in addition to the aforementioned components.

Examples of the other components include the surfactants described above.

In the manufacture method of the present embodiment, a total amount obtained by subtracting an amount of the organic solvent and the water from an amount of the oil-phase component and the water-phase component, corresponds to a total solid content of the manufactured microcapsule.

The total mass of the di- or lower functional polymerizable compound and the tri- or higher functional polymerizable compound contained in the oil-phase component is preferably 30% by mass to 75% by mass, more preferably 35% by mass to 65% by mass, and even more preferably 35% by mass to 60% by mass with respect to the above solid content.

The proportion of the di- or lower functional polymerizable compound with respect to the total mass of the di- or lower functional polymerizable compound and the tri- or higher functional polymerizable compound in the oil-phase component is 20% by mass or more, preferably 50% by mass to 90% by mass, more preferably 50% by mass to 80% by mass, and even more preferably 55% by mass to 65% by mass.

The amount of the tri- or higher functional isocyanate compound in the oil-phase component is not particularly limited, and for example, is preferably 5% by mass to 50% by mass, more preferably 10% by mass to 40% by mass, and even more preferably 15% by mass to 30% by mass with respect to the above total solid content.

The amount of the photopolymerization initiator in the oil-phase component is not particularly limited and is preferably 0.1% by mass to 25% by mass with respect to the amount of the total solid content, for example.

In a case where the oil-phase component contains a polymerizable isocyanate compound, the amount of the polymerizable compound in the oil-phase component is not particularly limited and is preferably 0.1% by mass to 50% by mass with respect to the amount of the total solid content, for example.

The amount of the organic solvent is not particularly limited and is appropriately set according to the type and amount of the components contained in the oil-phase component and the like.

The amount of the compound having the hydrophilic group in the oil-phase component or the water-phase component is not particularly limited and is preferably 0.01% by mass to 1% by mass with respect to the above total solid content, for example.

An amount of the neutralizer in the oil-phase component or the water-phase component is not particularly limited as long as the degree of neutralization of the hydrophilic group can be set to a desired value, and is appropriately set according to the types of the compound having the hydrophilic group, which is contained in the oil-phase component or the water-phase component, an amount, and the like.

The amount of water is not particularly limited and is appropriately selected according to the type and amount of the components contained in the oil-phase component and the like.

The components contained in the oil-phase component need to be simply mixed together. All of the components may be mixed together at the same time, or the components may be mixed together by being divided into several groups.

A case of each component contained in the water-phase component is similar to the case of the oil-phase component, and as long as each component is mixed, all components may be mixed at once, or each component may be divided so as to be mixed separately.

The method for mixing the oil-phase component with the water-phase component is not particularly limited, and examples thereof include mixing by stirring.

A method for emulsifying the mixture obtained by mixing is not particularly limited and examples thereof include emulsification by an emulsification device (for example, a disperser and the like) such as a homogenizer.

The rotation speed of the disperser used for the emulsification is 5,000 rpm to 20,000 rpm for example, and preferably 10,000 rpm to 15,000 rpm.

The rotation time during the emulsification is 1 minute to 120 minutes for example, preferably 3 minutes to 60 minutes, more preferably 3 minutes to 30 minutes, and even more preferably 5 minutes to 15 minutes.

The emulsification during the preparation step may be carried out while heating.

By carrying out the emulsification while heating, the reaction for forming the microcapsule by the emulsification can further effectively proceed. In addition, by carrying out the emulsification while heating, at least some of the organic solvent contained as the oil-phase component can be easily removed from the mixture.

The heating temperature in the case of carrying out the emulsification while heating (that is, reaction temperature) is preferably 35° C. to 70° C. and more preferably 40° C. to 60° C.

In addition, the preparation step may have an emulsification stage of emulsifying a mixture (at a temperature of lower than 35° C., for example), and a heating stage of heating the emulsion obtained in the emulsification stage (at a temperature of 35° C. or higher, for example).

According to the aspect in which the preparation step has the emulsification stage and the heating stage, the shell having firmer three-dimensional cross-linked structure is formed, and therefore it is possible to manufacture the aqueous dispersion by which a film having excellent hardness can be formed.

In the aspect in which the preparation step has the emulsification stage and the heating stage, preferable ranges of a heating temperature and a heating time in the heating stage are respectively the same as preferable ranges of a heating temperature and a heating time in a case of carrying out the emulsification while heating.

In regard to more specific descriptions of the above-described manufacturing method of the present embodiment (hereinafter, will also be referred to as "the manufacturing method of the first embodiment"), the aqueous dispersion can be manufactured by methods (1) to (5), for example.

Examples thereof include (1) A manufacturing method including a preparation step of mixing the oil-phase component containing the tri- or higher functional isocyanate compound, the di- or lower functional polymerizable compound, the tri- or higher functional polymerizable compound, the photopolymerization initiator, the compound having the hydrophilic group, and the organic solvent, with the water-phase component containing water, and emulsifying and dispersing the mixture so as to prepare an aqueous dispersion (hereinafter, will also be referred to as "the manufacturing method of the second embodiment"), (2) A manufacturing method including a preparation step of mixing the oil-phase component containing the tri- or higher functional isocyanate compound, the di- or lower functional polymerizable compound, the tri- or higher functional polymerizable compound, the photopolymerization initiator, and the organic solvent, with the water-phase component containing water, the compound having the hydrophilic group, and the neutralizer, and emulsifying and dispersing the mixture so as to prepare an aqueous dispersion (hereinafter, will also be referred to as "the manufacturing method of the third embodiment"), (3) A manufacturing method including a preparation step of mixing the oil-phase component containing the tri- or higher functional isocyanate compound, the di- or lower functional polymerizable compound, the tri- or higher functional polymerizable compound, the photopolymerization initiator, the compound having the hydrophilic group, the neutralizer, and the organic solvent, with the water-phase component containing water, and emulsifying and dispersing the mixture so as to prepare an aqueous dispersion (hereinafter, will also be referred to as "the manufacturing method of the fourth embodiment"), (4) A manufacturing method including a preparation step of mixing the oil-phase component containing the tri- or higher functional isocyanate compound, the di- or lower functional polymerizable compound, the tri- or higher functional polymerizable compound, the photopolymerization initiator, the compound having the hydrophilic group, and the organic solvent, with the water-phase component containing water and the neutralizer, and emulsifying and dispersing the mixture so as to prepare an aqueous dispersion (hereinafter, will also be referred to as "the manufacturing method of the fifth embodiment"), and (5) A manufacturing method including a preparation step of mixing the oil-phase component containing the tri- or higher functional isocyanate compound, the di- or lower functional polymerizable compound, the tri- or higher functional polymerizable compound, the photopolymerization initiator, the neutralizer, and the organic solvent, with the water-phase component containing water and the compound having the hydrophilic group, and emulsifying and dispersing the mixture so as to prepare an aqueous dispersion (hereinafter, will also be referred to as "the manufacturing method of the sixth embodiment").

In any one of the manufacturing methods of the second to six embodiments, in the preparation step, as same as the case of the manufacturing method of the first embodiment, the oil-phase component is mixed with the water-phase component, the obtained mixture is emulsified and dispersed, and thereby forming the microcapsule including the shell having the three-dimensional cross-linked structure containing the hydrophilic group and at least one bond selected from a urethane bond or a urea bond, and including the core that is in the interior of the shell and contains the di- or lower functional polymerizable compound, the tri- or higher functional polymerizable compound, and the photopolymerization initiator, in which the proportion of the di- or lower functional polymerizable compound is 20% by mass or more with respect to the total mass of the di- or lower functional polymerizable compound and the tri- or higher functional polymerizable compound. The formed microcapsule is a dispersoid in the manufactured aqueous dispersion, and water in the water-phase component is a dispersion medium in the manufactured aqueous dispersion.

In the manufacture methods of the second, fourth, and fifth embodiments, the amount of the compound having the hydrophilic group in the oil-phase component is not particularly limited, and for example, is preferably 0.01% by mass to 1% by mass with respect to the above total solid content.

In the manufacture methods of the third and sixth embodiments, the amount of the compound having the hydrophilic group in the water-phase component is not particularly limited, and for example, is preferably 0.01% by mass to 1% by mass with respect to the above total solid content.

In the manufacture methods of the fourth and sixth embodiments, an amount of the neutralizer in the oil-phase component or the water-phase component is not particularly limited as long as the degree of neutralization of the hydrophilic group can be set to a desired value, and is appropriately set according to the types of the compound having the hydrophilic group, which is contained in the oil-phase component or the water-phase component, an amount, and the like. The same applies to an amount of the neutralizer in the water-phase component in the manufacture method of the third and fifth embodiments.

<Other Steps>

The manufacture method of the present embodiment may include steps other than the preparation step as necessary.

Examples of those other steps include a step of adding other components described above.

Those other components to be added are as described above as other components that can be contained in the aqueous dispersion.

<Image Forming Method>

The image forming method of the present disclosure includes an application step of applying the aqueous dispersion of the present disclosure described above onto a substrate, and an irradiation step of irradiating the aqueous dispersion applied onto the substrate with active energy rays.

According to the image forming method of the present disclosure, an image formed on the substrate has excellent adhesiveness to the substrate and storing hardness.

[Application Step]

Hereinafter, an application step in the image forming method will be described.

The application step is not limited as long as the application step is a step of applying the aqueous dispersion onto the substrate.

As an aspect in which the aqueous dispersion is applied onto the substrate, an aspect in which the aqueous dispersion is applied onto the substrate by an ink jet method is particularly preferable.

In the image forming method, an ink jet recording device used in a case of adopting the application step of the ink jet method is not particularly limited, and a known ink jet recording device by which an intended resolution is achieved can be arbitrary selected and used. That is, any of known ink jet recording devices including commercially available products can jet the aqueous dispersion onto the substrate in the image forming method.

Examples of the ink jet recording device include a device including an ink supply system, a temperature sensor, and heating means.

The ink supply system includes, for example, a base tank containing the aqueous dispersion, supply piping, an ink supply tank disposed immediately before an ink jet head, a filter, and a piezo-type ink jet head. The piezo-type ink jet head can be driven such that it can jet multi-sized dots preferably having a size of 1 pl to 100 pl and more preferably having a size of 8 pl to 30 pl, preferably at a resolution of 320 dots per inch (dpi)×320 dpi to 4,000 dpi x 4,000 dots per inch (dpi), more preferably at a resolution of 400 dpi×400 dpi to 1,600 dpi x 1,600 dpi, and even more preferably at a resolution of 720 dpi×720 dpi. dpi represents the number of dots per 2.54 cm (1 inch).

In the application step, it is desirable that the jetted aqueous dispersion has a constant temperature, and therefore the ink jet recording device preferably includes a means for stabilizing a temperature of the aqueous dispersion. As parts required to have a constant temperature, piping from an ink tank (intermediate tank in a case where there is the intermediate tank) to an injection surface of a nozzle, and all members are the targets thereof. That is, heat insulation and warming can be performed on parts from an ink supplying tank to an ink jet head.

A method for controlling the temperature is not particularly limited, and for example, it is preferable that a plurality of temperature sensors are provided on each of piping parts so as to control heating according to a flow rate of the aqueous dispersion and environment temperature. The temperature sensor can be provided in the vicinity of the nozzle of the ink supplying tank and the ink jet head. In addition, it is preferable that a head unit to be heated is thermally shielded or insulated so that the main device is not affected by temperature from the outside air. In order to shorten a startup time of a printer which is required for heating or to reduce the loss of thermal energy, it is preferable to perform thermal insulation from other parts and to reduce the heat capacity of the entire heating unit.

The substrate is not particularly limited, and a substrate known as a support or a recording material can be used. Examples of the substrate include paper, paper on which plastic (for example, polyethylene, polypropylene, polystyrene, and the like) is laminated, a metal plate (for example, aluminum, zinc, copper, and the like), a plastic film (for example, films of a polyvinyl chloride resin, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal, and the like), a plastic film or paper on which the aforementioned metal is laminated or vapor-deposited, and the like.

Among these, for excellent adhesiveness of the aqueous dispersion of the present invention, a plastic substrate such as polyvinyl chloride, polyethylene terephthalate, and polyethylene is preferable, a polyvinyl chloride resin substrate is more preferable, and a polyvinyl chloride resin sheet or film is even more preferable, because these can be suitably used for a nonabsorbent substrate as a substrate.

As the substrate, a substrate other than the plastic substrate may be used.

Examples of the substrate other than the plastic substrates include a textile substrate.

Examples of a material of the textile substrate include natural fibers such as cotton, silk, hemp, and wool; chemical fibers such as viscose rayon and reocell; synthetic fibers such as polyester, polyamide, and acryl; a mixture of at least two types selected from the group consisting of the natural fibers, the chemical fibers, and the synthetic fibers; and the like.

As the textile substrate, a textile substrate disclosed in paragraphs 0039 to 0042 of WO2015/158592A may be used.

[Irradiation Step]

Hereinafter, an irradiation step in the image forming method will be described.

The irradiation step is not limited as long as the irradiation step is a step of irradiating the aqueous dispersion applied onto the substrate with active energy rays.

By irradiating the aqueous dispersion with active energy rays, the cross-linking reaction between the microcapsules in the aqueous dispersion proceeds, the image is fixed, and hence the film hardness of the image and the like can be improved.

Examples of the active energy rays that can be used in the irradiation step include ultraviolet rays (UV light), visible rays, electron beams, and the like. Among these, ultraviolet rays (UV light) is preferable.

The peak wavelength of the active energy rays (light) depends on an absorption property of a sensitizer that is used as necessary, but is preferably 200 nm to 405 nm, more preferably 220 nm to 390 nm, and even more preferably 220 nm to 385 nm, for example.

In a case where the photopolymerization initiator and the sensitizer are not used in combination, the peak wavelength is preferably 200 nm to 310 nm and more preferably 200 nm to 280 nm, for example.

At the time of the irradiation with the active energy rays (light), it is suitable to perform the irradiation with the illuminance of the exposure surface of 10 mW/cm$^2$ to 2,000 mW/cm$^2$ for example, and preferably 20 mW/cm$^2$ to 1,000 mW/cm$^2$.

As the source for generating the active energy rays (light), a mercury lamp, a metal halide lamp, a UV fluorescent lamp, a gas laser, a solid-state laser, and the like are widely known.

Furthermore, industrially and environmentally, it is extremely useful to substitute the aforementioned light sources with a semiconductor ultraviolet light-emitting device.

Among the semiconductor ultraviolet light-emitting devices, a light emitting diode (LED) (preferably UV-LED) and a laser diode (LD) (preferably UV-LD) are compact, have long service life and high efficiency, and incur low costs, and thus are expected as a light source.

As the light source, a metal halide lamp, an ultra-high pressure mercury lamp, a high-pressure mercury lamp, a medium-pressure mercury lamp, a low-pressure mercury lamp, LED, or a blue-violet laser is preferable.

In a case where a sensitizer and a photopolymerization initiator are used in combination, among the above light sources, an ultra-high pressure mercury lamp that can radiate light having a wavelength of 365 nm, 405 nm, or 436 nm, a high-pressure mercury lamp that can radiate light having a wavelength of 365 nm, 405 nm, or 436 nm, or LED that can radiate light having a wavelength of 355 nm, 365 nm, 385 nm, 395 nm, or 405 nm is more preferable, and LED that can radiate light having wavelength of 355 nm, 365 nm, 385 nm, 395 nm, or 405 nm is most preferable.

In the irradiation step, it is suitable that the aqueous dispersion applied onto the substrate is irradiated with such UV light for 0.01 seconds to 120 seconds, preferably 0.1 seconds to 90 seconds, for example.

As the irradiation conditions and the basic irradiation method, the irradiation conditions and the irradiation method disclosed in JP1985-132767A (JP-S60-132767A) can also be applied. Specifically, a method in which a light source is provided on both sides of a head unit including an ink jet device and the head unit as well as the light source are scanned by a so-called shuttle method, or a method in which the irradiation is performed by a separate light source that is not associated with driving, is preferable. The irradiation with the active energy rays is performed at a certain time interval (for example, 0.01 seconds to 120 seconds and preferably 0.01 seconds to 60 seconds) after an ink lands and is dried by heating.

[Heating and Drying Step]

If necessary, the image forming method may additionally include a heating and drying step between the application step and the irradiation step.

In the heating and drying step, it is preferable that water and an organic solvent which is used in combination if necessary, are evaporated from the aqueous dispersion jetted onto the substrate by using heating means, such that the image is fixed.

A step of drying of the jetted aqueous dispersion by heating for fixing (that is, a heating and drying step) will be described.

A heating means is not limited as long as the heating means can dry water and a water-soluble organic solvent to be used in combination if necessary, but a heating drum, hot air, an infrared lamp, a heat oven, heat plate heating, and the like can be used.

The heating temperature is preferably equal to or higher than 40° C., more preferably about 40° C. to 150° C., and even more preferably about 40° C. to 80° C. The drying and heating time can be appropriately set in consideration of compositions of the aqueous dispersion to be used and a printing rate.

If necessary, the aqueous dispersion fixed by heating is further optically fixed by being irradiated with the active energy rays in the irradiation step. As described above, in the irradiation step, it is preferable that the aqueous dispersion is fixed by UV light.

EXAMPLES

Hereinafter, the embodiment of the present invention will be more specifically described based on examples, but the embodiment of the present invention is not limited to the examples as long as the gist of the present invention is maintained. Unless otherwise specified, "part" is on a mass basis.

In addition, a microcapsule manufactured in the following examples will be referred to as "MC", and a microcapsule manufactured in the following comparative examples will be referred to as "comparative MC".

The C=C valence of the polymerizable compound can be measured by the above-described quantitative analysis by $^1$H-NMR (proton nuclear magnetic resonance spectroscopy).

[Manufacturing of Aqueous Dispersion]

Example 1

44 g of an oil-phase component having a concentration of solid contents of 36% by mass was prepared by using a total solid content shown in the following "Composition of Total Solid Content of Oil-Phase Component" and ethyl acetate as an organic solvent.

The composition of the total solid content (a total of 100% by mass) of the oil-phase component is as follows.

—Composition of Total Solid Content of Oil-Phase Component (Total of 100% by Mass)—

| | |
|---|---|
| Solid content of TAKENATE D-116N (isocyanate compound having an ethylene oxide group as a hydrophilic group, Mitsui Chemicals, Inc.) | 20.1% by mass |
| Solid content of the following isocyanate compound having a carboxy group (isocyanate compound having a carboxy group as a hydrophilic group) | 11.3% by mass |
| Solid content of TAKENATE D-120N (tri- or higher functional isocyanate compound, Mitsui Chemicals, Inc.) | 21.6% by mass |
| Isobornyl acrylate (IBOA, monofunctional polymerizable compound, Tokyo Chemical Industry Co., Ltd.) | 26.4% by mass |
| SR399E (dipentaerythritol pentaacrylate, pentafunctional polymerizable compound, Sartomer Arkema Inc.) | 17.6% by mass |
| IRGACURE (registered trademark) 819 (photopolymerization initiator, BASF SE) | 3% by mass |

—Synthesis of Isocyanate Compound Having Carboxy Group—

45 g of 2,2-bis(hydroxymethyl)propionic acid (DMPA), 223.72 g of isophorone diisocyanate (IPDI), and 499.05 g of ethyl acetate (AcOEt) were put into a three-neck flask and heated to 50° C. Then, 0.7677 g of NEOSTANN U-600 was added thereto and reacted for 3 hours, thereby obtaining an ethyl acetate solution of 35% by mass of a solid content of an isocyanate compound having a carboxy group (isocyanate compound having a hydrophilic group).

(Preparation of Water-Phase Component)

Sodium hydroxide was added to 45 g of distilled water by an 0.5% by mass with respect to the solid content of an oil phase thereof so that a degree of neutralization of the isocyanate compound having a carboxy group became 90%, and therefore a water-phase component was prepared.

(Formation of Microcapsule)

The oil-phase component was mixed with the water-phase component, the obtained mixture was emulsified and dispersed using a homogenizer for 12 minutes at 12,000 rpm, thereby obtaining an emulsion.

The obtained emulsion was added to 25 g of distilled water and stirred for 4 hours at 45° C., such that the ethyl acetate was distilled off.

Thereafter, the mixture was further stirred at 50° C. for 24 hours and diluted with distilled water so that the concentration of solid contents of the aqueous dispersion of the obtained microcapsule 1 (MC1) became 20% by mass, and therefore an aqueous dispersion was obtained.

The microcapsule 1 includes: the shell that has the hydrophilic group and the three-dimensional cross-linked structure containing at least one bond selected from a urethane bond or a urea bond; and the core that contains the monofunctional polymerizable compound, the pentafunctional polymerizable compound, and the photopolymerization initiator.

Examples 2 to 11

An aqueous dispersion was prepared in the same manner as in Example 1 except that IBOA was changed to a di- or lower functional polymerizable compound shown in Table 2.

Examples 12 to 17

An aqueous dispersion was prepared in the same manner as in Example 8 except that SR399E was changed to a tri- or higher functional polymerizable compound shown in Table 2.

Examples 18 to 23

An aqueous dispersion was prepared in the same manner as in Example 8 except that a mass ratio of the di- or lower functional polymerizable compound and the tri- or higher functional polymerizable compound was changed to a mass ratio shown in Table 2. A total mass of the di- or lower functional polymerizable compound and the tri- or higher functional polymerizable compound is same as that of Example 8.

(Examples 24 and 25)

An aqueous dispersion was prepared in the same manner as in Example 1 except that IRGACURE819 was changed to a photopolymerization initiator shown in Table 3.

Example 26

44 g of an oil-phase component having a concentration of solid contents of 36% by mass was prepared by using a total solid content shown in the following "Composition of Total Solid Content of Oil-Phase Component" and ethyl acetate as an organic solvent.

The composition of the total solid content (a total of 100% by mass) of the oil-phase component is as follows.

—Composition of Total Solid Content of Oil-Phase Component—

| | |
|---|---|
| Solid content of TAKENATE D-116N (isocyanate compound having an ethylene oxide group as a hydrophilic group, Mitsui Chemicals, Inc.) | 20% by mass |
| Solid content of the above-described isocyanate compound having a carboxy group (isocyanate compound having a carboxy group as a hydrophilic group) | 11.3% by mass |
| Solid content of D-120N (tri- or higher functional isocyanate compound, Mitsui Chemicals, Inc.) | 21.5% by mass |
| SR833S (tricyclodecanedimethanol diacrylate, a difunctional polymerizable compound, Sartomer Arkema Inc.) | 26.3% by mass |
| SR399E (dipentaerythritol pentaacrylate, pentafunctional polymerizable compound, Sartomer Arkema Inc.) | 17.5% by mass |
| IRGACURE (registered trademark) 819 (photopolymerization initiator, BASF SE) | 3% by mass |
| ITX (2-isopropylthioxanthone, a sensitizer) | 0.3% by mass |

(Preparation of Water-Phase Component)

Sodium hydroxide was added to 45 g of distilled water by an 0.5% by mass with respect to the solid content of an oil phase thereof so that a degree of neutralization of the isocyanate compound having a carboxy group became 90%, and therefore a water-phase component was prepared.

(Formation of Microcapsule)

The oil-phase component was mixed with the water-phase component, the obtained mixture was emulsified and dispersed using a homogenizer for 12 minutes at 12,000 rpm, thereby obtaining an emulsion.

The obtained emulsion was added to 25 g of distilled water and stirred for 4 hours at 45° C., such that the ethyl acetate was distilled off.

Thereafter, the mixture was further stirred at 50° C. for 24 hours and diluted with distilled water so that the concentration of solid contents of the aqueous dispersion of the obtained microcapsule 26 (MC26) became 20% by mass, and therefore an aqueous dispersion was obtained.

The microcapsule 26 includes: the shell that has the hydrophilic group and the three-dimensional cross-linked structure containing at least one bond selected from a urethane bond or a urea bond; and the core that contains the difunctional polymerizable compound, the pentafunctional polymerizable compound, the photopolymerization initiator, and the sensitizer.

Example 27

44 g of an oil-phase component having a concentration of solid contents of 36% by mass was prepared by using a total solid content shown in the following "Composition of Total Solid Content of Oil-Phase Component" and ethyl acetate as an organic solvent.

The composition of the total solid content (a total of 100% by mass) of the oil-phase component is as follows.

—Composition of Total Solid Content of Oil-Phase Component—

| | |
|---|---|
| Solid content of TAKENATE D-116N (isocyanate compound having an ethylene oxide group as a hydrophilic group, Mitsui Chemicals, Inc.) | 19.8% by mass |
| Solid content of the above-described isocyanate compound having a carboxy group (isocyanate compound having a carboxy group as a hydrophilic group) | 11.2% by mass |
| Solid content of D-120N (tri- or higher functional isocyanate compound, Mitsui Chemicals, Inc.) | 21.3% by mass |
| SR833S (tricyclodecanedimethanol diacrylate, a difunctional polymerizable compound, Sartomer Arkema Inc.) | 26% by mass |
| SR399E (dipentaerythritol pentaacrylate, pentafunctional polymerizable compound, Sartomer Arkema Inc.) | 17.4% by mass |
| IRGACURE (registered trademark) 819 (photopolymerization initiator, BASF SE) | 3% by mass |
| SpeedCure EDB (photopolymerization initiator, Lambson Limited) | 1% by mass |
| ITX (2-isopropylthioxanthone, a sensitizer) | 0.3% by mass |

(Preparation of Water-Phase Component)

Sodium hydroxide was added to 45 g of distilled water by an 0.5% by mass with respect to the solid content of an oil phase thereof so that a degree of neutralization of the isocyanate compound having a carboxy group became 90%, and therefore a water-phase component was prepared.

(Formation of Microcapsule)

The oil-phase component was mixed with the water-phase component, the obtained mixture was emulsified and dispersed using a homogenizer for 12 minutes at 12,000 rpm, thereby obtaining an emulsion.

The obtained emulsion was added to 25 g of distilled water and stirred for 4 hours at 45° C., such that the ethyl acetate was distilled off.

Thereafter, the mixture was further stirred at 50° C. for 24 hours and diluted with distilled water so that the concentration of solid contents of the aqueous dispersion of the obtained microcapsule 27 (MC27) became 20% by mass, and therefore an aqueous dispersion was obtained.

The microcapsule 27 includes: the shell that has the hydrophilic group and the three-dimensional cross-linked structure containing at least one bond selected from a urethane bond or a urea bond; and the core that contains the difunctional polymerizable compound, the pentafunctional polymerizable compound, the photopolymerization initiator, and the sensitizer.

Example 28

44 g of an oil-phase component having a concentration of solid contents of 36% by mass was prepared by using a total solid content shown in the following "Composition of Total Solid Content of Oil-Phase Component" and ethyl acetate as an organic solvent.

The composition of the total solid content (a total of 100% by mass) of the oil-phase component is as follows.

—Composition of Total Solid Content of Oil-Phase Component—

| | |
|---|---|
| Solid content of TAKENATE D-116N (isocyanate compound having an ethylene oxide group as a hydrophilic group, Mitsui Chemicals, Inc.) | 19.7% by mass |
| Solid content of the above-described isocyanate compound having a carboxy group (isocyanate compound having a carboxy group as a hydrophilic group) | 11.1% by mass |
| Solid content of D-120N (tri- or higher functional isocyanate compound, Mitsui Chemicals, Inc.) | 21.2% by mass |
| SR833S (tricyclodecanedimethanol diacrylate, a difunctional polymerizable compound, Sartomer Arkema Inc.) | 25.9% by mass |
| SR399E (dipentaerythritol pentaacrylate, pentafunctional polymerizable compound, Sartomer Arkema Inc.) | 17.2% by mass |
| Omnipol 9210 (photopolymerization initiator, IGM Resins B. V.) | 1% by mass |
| SpeedCure 7040 (photopolymerization initiator, Lambson Limited) | 3% by mass |
| SpeedCure 7010 (sensitizer, Lambson Limited) | 1% by mass |

(Preparation of Water-Phase Component)

Sodium hydroxide was added to 45 g of distilled water by an 0.5% by mass with respect to the solid content of an oil phase thereof so that a degree of neutralization of the isocyanate compound having a carboxy group became 90%, and therefore a water-phase component was prepared.

(Formation of Microcapsule)

The oil-phase component was mixed with the water-phase component, the obtained mixture was emulsified and dispersed using a homogenizer for 12 minutes at 12,000 rpm, thereby obtaining an emulsion.

The obtained emulsion was added to 25 g of distilled water and stirred for 30 minutes at room temperature and then stirred for 4 hours at 45° C., such that the ethyl acetate was distilled away.

Thereafter, the mixture was further stirred at 50° C. for 24 hours and diluted with distilled water so that the concentration of solid contents of the aqueous dispersion of the obtained microcapsule 28 (MC28) became 20% by mass, and therefore an aqueous dispersion was obtained.

The microcapsule 28 includes: the shell that has the hydrophilic group and the three-dimensional cross-linked structure containing at least one bond selected from a urethane bond or a urea bond; and the core that contains the difunctional polymerizable compound, the pentafunctional polymerizable compound, the photopolymerization initiator, and the sensitizer.

Examples 29 to 32

An aqueous dispersion was prepared in the same manner as in Example 8 except that TAKENATE D-120N was changed to a tri- or higher functional isocyanate compound shown in Table 3.

Comparative Example 1

An aqueous dispersion was prepared in the same manner as in Example 2 except that without using SR399E which is a tri- or higher functional polymerizable compound, an amount of HDDA which is a di- or lower functional polymerizable compound (1,6-hexanediol diacrylate, a difunctional polymerizable compound) was changed from 26.4% by mass to 44.0% by mass.

Comparative Example 2

An aqueous dispersion was prepared in the same manner as in Example 8 except that without using SR399E which is a tri- or higher functional polymerizable compound, an amount of SR833S which is a di- or lower functional polymerizable compound (tricyclodecanedimethanol diacrylate, a difunctional polymerizable compound, Sartomer Arkema Inc.) was changed from 26.4% by mass to 44.0% by mass.

Comparative Example 3

An aqueous dispersion was prepared in the same manner as in Example 12 except that without using SR833S which is a di- or lower functional polymerizable compound, an amount of TMPA which is a tri- or higher functional polymerizable compound (trimethylolpropane triacrylate, a trifunctional polymerizable compound) was changed from 17.6% by mass to 44.0% by mass.

Comparative Example 4

An aqueous dispersion was prepared in the same manner as in Example 1 except that without using IBOA which is a di- or lower functional polymerizable compound, an amount of SR399E which is a tri- or higher functional polymerizable compound (dipentaerythritol pentaacrylate, a pentafunctional polymerizable compound, Sartomer Arkema Inc.) was changed from 17.6% by mass to 44.0% by mass.

Comparative Example 5

An aqueous dispersion was prepared in the same manner as in Example 8 except that a mass ratio of the di- or lower functional polymerizable compound and tri- or higher functional polymerizable compound was changed to 15% by mass:85% by mass. A total mass of the di- or lower functional polymerizable compound and the tri- or higher functional polymerizable compound is same as that of Example 8.

<Checking Whether Microcapsule Aqueous Dispersion Contains Microcapsule Having Polymerizable Group>

Whether the microcapsule aqueous dispersions of Examples 1 to 32 obtained above contains a microcapsule was checked by the following method. The operation described below was performed under the condition of a liquid temperature of 25° C.

From the microcapsule aqueous dispersion obtained as above, a sample was collected. Tetrahydrofuran (THF) having a mass 100 times the mass of the total solid content (microcapsule in the present example) in the sample was added to and mixed with the collected sample, thereby preparing a diluted solution of the microcapsule aqueous dispersion. The obtained diluted solution was subjected to centrifugation (80,000 rpm, 40 minutes). After centrifugation, the presence or absence of a residue was checked by visual observation. In a case where a residue was checked, water was added to the residue, and the resultant was stirred for 1 hour by using a stirrer so as to redisperse the residue in water, thereby obtaining a redispersion. For the obtained redispersion, by using a wet-type particle size distribution measurement apparatus (LA-960, manufactured by HORIBA, Ltd.), the particle size distribution was measured by a light scattering method. In a case where the particle size distribution was checked by the operation described above, it was determined that the aqueous dispersion contained the microcapsule.

From the above result and the result of Fourier transform infrared spectroscopy (FT-IR), it was confirmed that all of the aqueous dispersions having the microcapsule actually contained the microcapsule having a polymerizable group (that is, it was confirmed that the microcapsule was actually a microcapsule having a polymerizable group).

<Volume Average Dispersed Particle Diameter of Microcapsule>

A volume average dispersed particle diameter (that is, a volume average particle diameter of dispersant-coated microcapsules) of the microcapsules of Examples 1 to 32 obtained as described above was measured by a light scattering method and all diameters was found to be 0.15 µm.

The measurement of the volume average particle diameter by the light scattering method was carried out by using a wet-type particle size distribution measurement apparatus, LA-960 (manufactured by HORIBA, Ltd.).

<Checking Whether Core Contains Photopolymerization Initiator>

In the aqueous dispersion having the microcapsule of Examples 1 to 32 obtained as above, whether the core of the microcapsule contains the photopolymerization initiator was checked by measuring an internal content rate (%) of the photopolymerization initiator. The details thereof are as described below. The operation described below was performed under the condition of a liquid temperature of 25° C.

From the aqueous dispersion having the microcapsule, two samples (hereinafter, will be referred to as "sample 1A" and "sample 2A") having the same mass were collected.

Tetrahydrofuran (THF) having a mass 100 times the mass of the total solid content in the sample 1A was added to and mixed with the sample 1A, thereby preparing a diluted solution. The obtained diluted solution was subjected to centrifugation under the condition of 80,000 rpm and 40 minutes. The supernatant (hereinafter, referred to as "supernatant 1A") generated by the centrifugation was collected. The mass of the photopolymerization initiator contained in the collected supernatant 1A was measured using a liquid chromatography device "Waters 2695" of WATERS. The obtained mass of the photopolymerization initiator was taken as "total amount of photopolymerization initiator".

Furthermore, the sample 2A was subjected to centrifugation under the same condition as in the centrifugation performed on the aforementioned diluted solution. The supernatant (hereinafter, referred to as "supernatant 2A") generated by the centrifugation was collected. The mass of the photopolymerization initiator contained in the collected supernatant 2A was measured using the aforementioned liquid chromatography device. The obtained mass of the photopolymerization initiator was taken as "amount of free photopolymerization initiator".

Based on "total amount of photopolymerization initiator" and "amount of free photopolymerization initiator", the internal content rate (% by mass) of the photopolymerization initiator was determined according to the following equation.

Internal content rate (% by mass) of photopolymerization initiator=((total amount of photopolymerization initiator−amount of free photopolymerization initiator)/total amount of photopolymerization initiator)×100

As the results, in all of the microcapsules, the internal content rates were 99% or higher, and therefore it was confirmed that the core contained the photopolymerization initiator.

<Checking Whether Core Contains Polymerizable Compound>

In the aqueous dispersions of Examples 1 to 32 obtained as above, whether the core of the microcapsule contains the polymerizable compound was checked by measuring an internal content rate (%) of the polymerizable compound.

Whether or not the polymerizable compound was contained was checked by the same method as the method used for checking whether the photopolymerization initiator was contained in the interior.

As the results, in all of the microcapsules, the internal content rates were 99% or higher, and therefore it was confirmed that the core contained the polymerizable compound. The internal content rate of the polymerizable compound referred herein is a value obtained by a total amount of the di- or lower functional polymerizable compound and the tri- or higher functional polymerizable compound.

<Checking Whether Core Contains Sensitizer>

In the aqueous dispersions of Examples 26 to 28 obtained as above, whether the core of the microcapsule contains the sensitizer was checked by measuring an internal content rate (%) of the sensitizer.

Whether or not the sensitizer was contained was checked by the same method as the method used for checking whether the photopolymerization initiator was contained.

As the results, in all of the microcapsules of the aqueous dispersions having the microcapsules in which the sensitizer was used, the internal content rates were 99% or higher, and therefore it was confirmed that the core contained the sensitizer.

[Preparation of Ink Composition]

Using any one of the aqueous dispersions of Examples 1 to 32 and the comparative aqueous dispersions of Comparative Examples 1 to 5, the respective components were mixed so as to have the following ink composition, and an ink composition of each of the examples was prepared.

—Composition of Ink Composition—

| | |
|---|---|
| The aqueous dispersion selected from each of the aqueous dispersions having the microcapsules of Examples 1 to 32 and Comparative Examples 1 to 5 | 82 parts |
| Pigment dispersion liquid (Pro-jet Cyan APD1000 (manufactured by FUJIFILM Imaging Colorants, Inc), colorant concentration: 14% by mass) | 13 parts |
| Fluorine-based surfactant (manufactured by DuPont, Capstone FS-31, solid content: 25% by mass) | 0.3 parts |
| 2-Methylpropanediol | 4.7 parts |

<Evaluation>

Using the aqueous dispersions having the microcapsules manufactured in each of the examples and the comparative examples, and the ink composition which is an aspect thereof, the following evaluation was carried out. The results are shown in Tables 2 and 3.

—Jetting Properties—

The ink composition (within a day at room temperature after the preparation) using the microcapsule aqueous dispersions of each of the examples and comparative examples was jetted from a head for 30 minutes by using an ink jet printer (SP-300V, manufactured by Roland DG Corporation), and after 5 minutes had elapsed from stopping of jetting, a solid image and a thin line were recorded on a substrate (AVERY 400 GLOSS WHITE PERMANENT manufactured by AVERY DENNISON CORPORATION) by re-jetting. The obtained image (5 cm×5 cm) was observed, and visually evaluated according to the following evaluation standard.

Evaluation Standard

A: The generation of dead pixels was not observed, and an image of having excellent image quality was obtained.

B: Although the generation of a small number of dead pixels was observed, the dead pixels were unproblematic in image quality for practical use.

C: The generation of dead pixels was observed, and the dead pixels were problematic in image quality for practical use.

D: The jetting was not possible.

—Pencil Hardness—

The ink composition using the aqueous dispersions having the microcapsules of each of the examples and the comparative examples was applied onto a polystyrene (PS) sheet ("falcon hi impact polystyrene" manufactured by Robert Home Company) as a substrate by using a No. 2 bar of K HAND COATER manufactured by RK PrintCoat Instruments Ltd so that the thickness became 12 μm. After the application, the moisture of the coated film formed was dried at 60° C. for 3 minutes, and therefore a dried film was obtained.

As an exposure light source, an experimental UV mini conveyor device CSOT (manufactured by Yuasa Power Supply Ltd.) was used which was equipped with an ozone-less metal halide lamp MAN 250L and in which a conveyor speed was set to be 9.0 m/min and an exposure intensity was set to be 2.0 W/cm$^2$, each of the dried film obtained as above was irradiated with active energy rays so as to cure the dried film, and therefore an evaluation sample having a cured film was obtained.

A pencil hardness test was performed on the surface of the cured film of each of the evaluation sample by using UNI (registered trademark) manufactured by MITSUBISHIPEN-CIL CO., LTD as a pencil, based on JIS K5600-5-4 (1999).

In the test results, the acceptable range of the pencil hardness is equal to or higher than HB, and it is preferable that the pencil hardness is equal to or higher than H. A printed matter having a pencil hardness of equal to or lower than B is not preferable, because an image is likely to be scratched in a case where the printed matter is handled.

—Adhesiveness (Crosshatch Test)—

The crosshatch test was performed on each sample which is same as the evaluation sample used for the above pencil hardness evaluation by ISO 2409 (crosscut method), and therefore the adhesiveness was evaluated according to the following standard. In addition, in the same manner, the crosshatch test was also performed on a sample in which the substrate was changed to a polypropylene (PP) sheet ("Cor-rex" manufactured by Robert Home) in the samples for evaluation described above, and therefore the adhesiveness was evaluated according to the following standard.

In the above evaluation, it was evaluated that 0 to 2 are practically acceptable levels.

The symbol "%" that indicates lattice peeling in the following standards 0 to 5 is a proportion, which is expressed in percentage, of the number of lattices in which peeling was observed at 25 lattices formed by cut at right angles with 1 mm intervals.

Proportion (%) of peeled lattices=[(number of peeled lattices)/(total number of lattices)]×100

Evaluation Standard

0: The cut portion was smooth, and all lattices were not peeled off.

1: Small peeling was observed on the coated film at the intersection of the cuts. The part where peeling was observed was 5% or less of the total number of lattices.

2: Peeling was observed in at least one of the portion along the cut portion of the coated film and the intersection of the cuts. The part where peeling was observed exceeded 5% and was 15% or less of the total number of lattices.

3: Partial or complete peeling was observed along the cut portion of the coated film, or partial or complete peeling was observed in various portions of the lattices. The part where peeling was observed exceeded 15% and was 35% or less of the total number of lattices.

4: Partial or complete peeling was observed along the cut portion of the coated film, or partial or complete peeling was observed in various portions of the lattices. The part where peeling was observed exceeded 35% and was 65% or less of the total number of lattices.

5: The part where peeling was observed exceeded 65% of the total number of lattices.

TABLE 2

| | | Shell component | | | Core component | | | | | |
|---|---|---|---|---|---|---|---|---|---|---|
| | | Isocyanate compound into which hydrophilic group is introduced | | Isocyanate compound Tri- or higher functional isocyanate compound | Di- or lower functional polymerizable compound | | | | | |
| | | Isocyanate compound 1 having hydrophilic group | Isocyanate compound 2 having hydrophilic group | | Name | Number of functional groups | Molecular weight | C=C valence (mmol/g) | SP value | Proportion*[1] (% by mass) |
| Example 1 | MC1 | D-116N (EO) | Isocyanate compound having carboxy group | D-120N | IBOA | 1 | 208.30 | 4.80 | 17.2 | 60 |
| Example 2 | MC2 | D-116N (EO) | Isocyanate compound having carboxy group | D-120N | HDDA | 2 | 226.27 | 8.84 | 18.1 | 60 |
| Example 3 | MC3 | D-116N (EO) | Isocyanate compound having carboxy group | D-120N | 3MPDDA | 2 | 226.27 | 8.84 | 18.0 | 60 |
| Example 4 | MC4 | D-116N (EO) | Isocyanate compound having carboxy group | D-120N | NDDA | 2 | 282.38 | 7.08 | 17.7 | 60 |
| Example 5 | MC5 | D-116N (EO) | Isocyanate compound having carboxy group | D-120N | DDDA | 2 | 268.35 | 7.45 | 17.5 | 60 |
| Example 6 | MC6 | D-116N (EO) | Isocyanate compound having carboxy group | D-120N | TPGDA | 2 | 300.35 | 6.66 | 18.0 | 60 |

TABLE 2-continued

| | | | | | | | | | | |
|---|---|---|---|---|---|---|---|---|---|---|
| Example 7 | MC7 | D-116N (EO) | Isocyanate compound having carboxy group | D-120N | A-200 | 2 | 302.32 | 6.62 | 18.9 | 60 |
| Example 8 | MC8 | D-116N (EO) | Isocyanate compound having carboxy group | D-120N | SR833SS | 2 | 304.38 | 6.57 | 18.0 | 60 |
| Example 9 | MC9 | D-116N (EO) | Isocyanate compound having carboxy group | D-120N | APG-400 | 2 | 536.00 | 3.73 | 17.2 | 60 |
| Example 10 | MC10 | D-116N (EO) | Isocyanate compound having carboxy group | D-120N | A-BPE-10 | 2 | 688.80 | 2.90 | 18.2 | 60 |
| Example 11 | MC11 | D-116N (EO) | Isocyanate compound having carboxy group | D-120N | A-BPE-20 | 2 | 1216.00 | 1.64 | 18.0 | 60 |
| Example 12 | MC12 | D-116N (EO) | Isocyanate compound having carboxy group | D-120N | SR833S | 2 | 304.38 | 6.57 | 18.0 | 60 |
| Example 13 | MC13 | D-116N (EO) | Isocyanate compound having carboxy group | D-120N | SR833S | 2 | 304.38 | 6.57 | 18.0 | 60 |
| Example 14 | MC14 | D-116N (EO) | Isocyanate compound having carboxy group | D-120N | SR833S | 2 | 304.38 | 6.57 | 18.0 | 60 |
| Example 15 | MC15 | D-116N (EO) | Isocyanate compound having carboxy group | D-120N | SR833S | 2 | 304.38 | 6.57 | 18.0 | 60 |
| Example 16 | MC16 | D-116N (EO) | Isocyanate compound having carboxy group | D-120N | SR833S | 2 | 304.38 | 6.57 | 18.0 | 60 |
| Example 17 | MC17 | D-116N (EO) | Isocyanate compound having carboxy group | D-120N | SR833S | 2 | 304.38 | 6.57 | 18.0 | 60 |
| Example 18 | MC18 | D-116N (EO) | Isocyanate compound having carboxy group | D-120N | SR833S | 2 | 304.38 | 6.57 | 18.0 | 95 |
| Example 19 | MC19 | D-116N (EO) | Isocyanate compound having carboxy group | D-120N | SR833S | 2 | 304.38 | 6.57 | 18.0 | 80 |
| Example 20 | MC20 | D-116N (EO) | Isocyanate compound having carboxy group | D-120N | SR833S | 2 | 304.38 | 6.57 | 18.0 | 70 |
| Example 21 | MC21 | D-116N (EO) | Isocyanate compound having carboxy group | D-120N | SR833S | 2 | 304.38 | 6.57 | 18.0 | 50 |
| Example 22 | MC22 | D-116N (EO) | Isocyanate compound having carboxy group | D-120N | SR833S | 2 | 304.38 | 6.57 | 18.0 | 30 |
| Example 23 | MC23 | D-116N (EO) | Isocyanate compound having carboxy group | D-120N | SR833S | 2 | 304.38 | 6.57 | 18.0 | 20 |

| | Core component | | | | | | | | | Evaluation | | | |
|---|---|---|---|---|---|---|---|---|---|---|---|---|---|
| | Tri- or higher functional polymerizable compound | | | | | | | | | | | | |
| | Name | Number of functional groups | Molecular weight | C=C valence (mmol/g) | SP value | Proportion*1 (% by mass) | ΔSP*2 | Photo-polymerization initiator | Photo-polymerization initiator | Sensi-tizer | Pencil hardness | Jetting properties | Adhesiveness PS PP |
| Example 1 | SR399E | 5 | 524.51 | 9.53 | 18.8 | 40 | 1.6 | IRGACURE 819 | — | — | F | A | 2 2 |
| Example 2 | SR399E | 5 | 524.51 | 9.53 | 18.8 | 40 | 0.7 | IRGACURE 819 | — | — | H | A | 1 1 |
| Example 3 | SR399E | 5 | 524.51 | 9.53 | 18.8 | 40 | 0.8 | IRGACURE 819 | — | — | H | A | 1 1 |
| Example 4 | SR399E | 5 | 524.51 | 9.53 | 18.8 | 40 | 1.1 | IRGACURE 819 | — | — | H | A | 0 1 |
| Example 5 | SR399E | 5 | 524.51 | 9.53 | 18.8 | 40 | 1.3 | IRGACURE 819 | — | — | H | A | 0 1 |
| Example 6 | SR399E | 5 | 524.51 | 9.53 | 18.8 | 40 | 0.8 | IRGACURE 819 | — | — | H | A | 0 0 |
| Example 7 | SR399E | 5 | 524.51 | 9.53 | 18.8 | 40 | 0.1 | IRGACURE 819 | — | — | H | A | 0 0 |
| Example 8 | SR399E | 5 | 524.51 | 9.53 | 18.8 | 40 | 0.8 | IRGACURE 819 | — | — | H | A | 0 0 |
| Example 9 | SR399E | 5 | 524.51 | 9.53 | 18.8 | 40 | 1.6 | IRGACURE 819 | — | — | H | A | 1 1 |
| Example 10 | SR399E | 5 | 524.51 | 9.53 | 18.8 | 40 | 0.6 | IRGACURE 819 | — | — | H | A | 1 1 |
| Example 11 | SR399E | 5 | 524.51 | 9.53 | 18.8 | 40 | 0.8 | IRGACURE 819 | — | — | H | A | 2 1 |
| Example 12 | TMPA | 3 | 296.32 | 10.12 | 18.3 | 40 | 0.3 | IRGACURE 819 | — | — | F | A | 1 1 |
| Example 13 | A-TMMT | 4 | 352.34 | 11.35 | 18.9 | 40 | 0.9 | IRGACURE 819 | — | — | H | A | 1 1 |
| Example 14 | CD501 | 3 | 644.79 | 4.65 | 16.9 | 40 | 1.1 | IRGACURE 819 | — | — | H | A | 0 1 |
| Example 15 | UA-306H | 6 | 764.77 | 7.85 | 19.9 | 40 | 1.9 | IRGACURE 819 | — | — | H | A | 0 1 |
| Example 16 | DCPA-30 | 6 | 924.00 | 6.49 | 18.0 | 40 | 0.0 | IRGACURE 819 | — | — | H | A | 0 0 |
| Example 17 | DPEA-12 | 6 | 1107.19 | 5.42 | 16.4 | 40 | 1.6 | IRGACURE 819 | — | — | H | A | 0 1 |
| Example 18 | SR399E | 5 | 524.51 | 9.53 | 18.8 | 5 | 0.8 | IRGACURE 819 | — | — | F | A | 0 0 |
| Example 19 | SR399E | 5 | 524.51 | 9.53 | 18.8 | 20 | 0.8 | IRGACURE 819 | — | — | H | A | 0 0 |
| Example 20 | SR399E | 5 | 524.51 | 9.53 | 18.8 | 30 | 0.8 | IRGACURE 819 | — | — | H | A | 0 0 |
| Example 21 | SR399E | 5 | 524.51 | 9.53 | 18.8 | 50 | 0.8 | IRGACURE 819 | — | — | H | A | 0 0 |
| Example 22 | SR399E | 5 | 524.51 | 9.53 | 18.8 | 70 | 0.8 | IRGACURE 819 | — | — | H | A | 1 1 |
| Example 23 | SR399E | 5 | 524.51 | 9.53 | 18.8 | 80 | 0.8 | IRGACURE 819 | — | — | H | A | 1 1 |

*1 A proportion (% by mass) with respect to a total mass of the di- or lower functional polymerizable compound and the tri- or higher functional polymerizable compound

*2 ΔSP indicates an absolute value of a value obtained by subtracting an SP value of the di- or lower functional polymerizable compound from an SP value of the tri- or higher functional polymerizable compound

TABLE 3

| | | Shell component | | | Core component | | | | |
|---|---|---|---|---|---|---|---|---|---|
| | | Isocyanate compound into which hydrophilic group is introduced | | Isocyanate compound Tri- or higher functional isocyanate compound | Di- or lower functional polymerizable compound | | | | |
| | | Isocyanate compound 1 having hydrophilic group | Isocyanate compound 2 having hydrophilic group | | Name | Number of functional groups | Molecular weight | C=C valence (mmol/g) | SP value | Proportion*¹ (% by mass) |
| Example 24 | MC24 | D-116N (EO) | Isocyanate compound having carboxy group | D-120N | SR833S | 2 | 304.38 | 6.57 | 18.0 | 60 |
| Example 25 | MC25 | D-116N (EO) | Isocyanate compound having carboxy group | D-120N | SR833S | 2 | 304.38 | 6.57 | 18.0 | 60 |
| Example 26 | MC26 | D-116N (EO) | Isocyanate compound having carboxy group | D-120N | SR833S | 2 | 304.38 | 6.57 | 18.0 | 60 |
| Example 27 | MC27 | D-116N (EO) | Isocyanate compound having carboxy group | D-120N | SR833S | 2 | 304.38 | 6.57 | 18.0 | 60 |
| Example 28 | MC28 | D-116N (EO) | Isocyanate compound having carboxy group | D-120N | SR833S | 2 | 304.38 | 6.57 | 18.0 | 60 |
| Example 29 | MC29 | D-116N (EO) | Isocyanate compound having carboxy group | D-127N | SR833S | 2 | 304.38 | 6.57 | 18.0 | 60 |
| Example 30 | MC30 | D-116N (EO) | Isocyanate compound having carboxy group | TSA-100 | SR833S | 2 | 304.38 | 6.57 | 18.0 | 60 |
| Example 31 | MC31 | D-116N (EO) | Isocyanate compound having carboxy group | TSS-100 | SR833S | 2 | 304.38 | 6.57 | 18.0 | 60 |
| Example 32 | MC32 | D-116N (EO) | Isocyanate compound having carboxy group | TKA-100 | SR833S | 2 | 304.38 | 6.57 | 18.0 | 60 |
| Comparative example 1 | Comparison MC1 | D-116N (EO) | Isocyanate compound having carboxy group | D-120N | HDDA | 2 | 226.27 | 8.84 | 18.1 | 100 |
| Comparative example 2 | Comparison MC2 | D-116N (EO) | Isocyanate compound having carboxy group | D-120N | SR833S | 2 | 304.38 | 6.57 | 18.0 | 100 |
| Comparative example 3 | Comparison MC3 | D-116N (EO) | Isocyanate compound having carboxy group | D-120N | — | — | — | — | — | — |
| Comparative example 4 | Comparison MC4 | D-116N (EO) | Isocyanate compound having carboxy group | D-120N | — | — | — | — | — | — |
| Comparative example 5 | Comparison MC5 | D-116N (EO) | Isocyanate compound having carboxy group | D-120N | SR833S | 2 | 304.38 | 6.57 | 18.0 | 10 |

| | Core component | | | | | | | | | Evaluation | | | |
|---|---|---|---|---|---|---|---|---|---|---|---|---|---|
| | Tri- or higher functional polymerizable compound | | | | | | | | | | | | |
| | Name | Number of functional groups | Molecular weight | C=C valence (mmol/g) | SP value | Proportion*¹ (% by mass) | ΔSP*² | Photo-polymerization initiator | Photo-polymerization initiator | Sensitizer | Pencil hardness | Jetting properties | Adhesiveness PS PP |
| Example 24 | SR399E | 5 | 524.51 | 9.53 | 19 | 40 | 0.8 | IRGACURE 369 | — | — | H | A | 0 0 |
| Example 25 | SR399E | 5 | 524.51 | 9.53 | 19 | 40 | 0.8 | IRGACURE 184 | — | — | H | A | 0 0 |
| Example 26 | SR399E | 5 | 524.51 | 9.53 | 19 | 40 | 0.8 | IRGACURE 819 | — | ITX | 2H | A | 0 0 |
| Example 27 | SR399E | 5 | 524.51 | 9.53 | 19 | 40 | 0.8 | IRGACURE 819 | SpeedCure EDB | ITX | H | A | 0 0 |
| Example 28 | SR399E | 5 | 524.51 | 9.53 | 19 | 40 | 0.8 | Omnipol 9210 | SpeedCure 7040 | SpeedCure 7010 | 2H | A | 0 0 |
| Example 29 | SR399E | 5 | 524.51 | 9.53 | 19 | 40 | 0.8 | IRGACURE 819 | — | — | H | A | 0 0 |
| Example 30 | SR399E | 5 | 524.51 | 9.53 | 19 | 40 | 0.8 | IRGACURE 819 | — | — | H | A | 0 0 |
| Example 31 | SR399E | 5 | 524.51 | 9.53 | 19 | 40 | 0.8 | IRGACURE 819 | — | — | H | A | 0 0 |
| Example 32 | SR399E | 5 | 524.51 | 9.53 | 19 | 40 | 0.8 | IRGACURE 819 | — | — | H | A | 0 0 |
| Comparative example 1 | — | — | — | — | — | 0 | — | IRGACURE 819 | — | — | 3B | A | 4 5 |
| Comparative example 2 | — | — | — | — | — | 0 | — | IRGACURE 819 | — | — | 3B | A | 4 5 |

TABLE 3-continued

| | | | | | | | | | | | | | | |
|---|---|---|---|---|---|---|---|---|---|---|---|---|---|---|
| Comparative example 3 | TMPA | 3 | 296.32 | 10.12 | 18 | 100 | — | IRGACURE 819 | — | — | H | A | 5 | 5 |
| Comparative example 4 | SR399E | 5 | 524.51 | 9.53 | 19 | 100 | — | IRGACURE 819 | — | — | H | A | 5 | 5 |
| Comparative example 5 | SR399E | 5 | 524.51 | 9.53 | 19 | 90 | 0.8 | IRGACURE 819 | — | — | H | A | 4 | 4 |

[1] A proportion (% by mass) with respect to a total mass of the di- or lower functional polymerizable compound and the tri- or higher functional polymerizable compound
[2] ΔSP indicates an absolute value of a value obtained by subtracting an SP value of the di- or lower functional polymerizable compound from an SP value of the tri- or higher functional polymerizable compound Details of the components in Tables 2 and 3 are as below.

D-116N: TAKENATE D-116N manufactured by Mitsui Chemicals, Inc., the isocyanate compound having an ethylene oxide (EO) group as a hydrophilic group, an ethyl acetate solution having a solid content of 50% by mass D-120N: TAKENATE D-120N manufactured by Mitsui Chemicals, Inc., the H6XDI and TMP-adduct modified isocyanate and the tri- or higher functional isocyanate compound, an ethyl acetate solution having a solid content of 75% by mass, an isocyanate group content 4.29 mmol/g D-127N: TAKENATE D-127N manufactured by Mitsui Chemicals, Inc., H6XDI isocyanurate-modified isocyanate, a tri- or higher functional isocyanate compound, an ethyl acetate solution having a solid content of 75% by mass, isocyanate group content 5.15 mmol/g TKA-100: DURANATE TKA-100, Asahi Kasei Corporation, isocyanurate form of hexamethylene diisocyanate, a tri- or higher functional isocyanate compound, isocyanate group content 5.16 mmol/g TSA-100: DURANATE TSA-100, Asahi Kasei Corporation, isocyanurate form of hexamethylene diisocyanate, a tri- or higher functional isocyanate compound, isocyanate group content 5.95 mmol/g TSS-100: DURANATE TSS-100, Asahi Kasei Corporation, isocyanurate form of hexamethylene diisocyanate, a tri- or higher functional isocyanate compound, isocyanate group content 4.19 mmol/g IBOA: Isobornyl acrylate, a monofunctional polymerizable compound HDDA: 1,6-Hexanediol diacrylate, a difunctional polymerizable compound 3MPDDA: 3-Methylpentadiol diacrylate, a difunctional polymerizable compound NDDA: 1,9-Nonanediol diacrylate, a difunctional polymerizable compound DDDA: 1,10-Decanediol diacrylate, a difunctional polymerizable compound TPGDA: Tripropylene glycol diacrylate, a difunctional polymerizable compound A-200: Shin-Nakamura Chemical Co., Ltd., a difunctional polymerizable compound, polyethylene glycol diacrylate SR833S: Sartomer Arkema Inc., a difunctional polymerizable compound, tricyclodecanedimethanol diacrylate APG-400: Shin-Nakamura Chemical Co., Ltd., a difunctional polymerizable compound, polyethylene glycol diacrylate A-BPE-10: Shin-Nakamura Chemical Co., Ltd., a difunctional polymerizable compound, bisphenol A ethoxylate diacrylate A-BPR-20: Shin-Nakamura Chemical Co., Ltd., a difunctional polymerizable compound, bisphenol A ethoxylate diacrylate SR399E: Sartomer Arkema Inc., pentafunctional polymerizable compound, dipentaerythritol pentaacrylate TMPA: A trifunctional polymerizable compound, trimethylolpropane triacrylate A-TMMT: Shin-Nakamura Chemical Co., Ltd., a tetrafunctional polymerizable compound, pentaerythritol tetraacrylate CD501: Sartomer Arkema Inc., a trifunctional polymerizable compound, propoxylated (6) trimethylolpropane triacrylate UA-306H: KYOEISHA CHEMICAL Co., LTD., a hexafunctional polymerizable compound, pentaerythritol triacrylate hexamethylene diisocyanate, a urethane prepolymer DCPA-30: Nippon Kayaku Co., Ltd., a hexafunctional polymerizable compound, caprolactone-modified dipentaerythritol hexaacrylate DPEA-12: Nippon Kayaku Co., Ltd., a hexafunctional polymerizable compound, polyethylene glycol-modified dipentaerythritol hexaacrylate IRGACURE819: BASF SE, an acylphosphine oxide-based photopolymerization initiator SpeedCure EDB: Lambson Limited, a photopolymerization initiator, an amine-based coinitiator Omnipol 9210: IGM Resins B. V, photopolymerization initiator, polymeric α-aminoketone SpeedCure 7040: Lambson Limited, photopolymerization initiator, polymer type amine-based coinitiator ITX: sensitizer, 2-isopropylthioxanthone SpeedCure 7010: Lambson Limited, sensitizer, thioxanthone-based Based on Tables 2 and 3, it is understood that in the aqueous dispersions of the microcapsule of each of the examples, all evaluation results of the adhesiveness and the pencil hardness were favorable, and therefore the film having excellent adhesiveness to the substrate and hardness can be formed.

Based on the comparison between Example 3 and Example 4, the comparison between Example 8 and Example 9, and the comparison between Example 12 and Example 13, it is understood that in the case where, in the core of the microcapsule, the di- or lower functional polymerizable compound is a difunctional polymerizable compound having the weight-average molecular weight of 250 to 500, and the weight-average molecular weight of the tri- or higher functional polymerizable compound was 350 to 1200, the film having excellent adhesiveness to the substrate and hardness can be formed.

Based on the comparison between Example 2, Example 8, and Example 9, and the comparison between Example 13, Example 14, and Example 16, it is understood that in the case where, in the core of the microcapsule, the di- or lower functional polymerizable compound is a difunctional polymerizable compound in which the C=C valence is 4 mmol/g to 8 mmol/g, and the C=C valence of the tri- or higher functional polymerizable compound is 5 mmol/g to 10 mmol/g, the film having excellent adhesiveness to the substrate can be formed.

Based on the comparison between Example 8 and Example 9, it is understood that in the case where, in the core of the microcapsule, a difference between the solubility parameter of the di- or lower functional polymerizable compound and the solubility parameter of the tri- or higher functional polymerizable compound is 1.5 MPa$^{1/2}$ or less, the film having excellent adhesiveness to the substrate can be formed.

Based on the comparison between Example 8 and Example 26, it is understood that in the case where the core of the microcapsule contains the polymerizable compound, the photopolymerization initiator, and the sensitizer, the hardness of the film becomes excellent.

The entire content of Japanese patent application No. 2016-021361 filed on Feb. 5, 2016 is incorporated into the present specification by reference.

All of the documents, the patent applications, and the technical standards described in the present specification are incorporated into the present specification by reference, as if each of the documents, the patent applications, and the technical standards is specifically and independently described by reference.

What is claimed is:

1. A composition comprising:
    an ink containing:
        water; and
        a microcapsule which comprises:
            a shell that has a three-dimensional cross-linked structure containing at least one bond selected from a urethane bond or a urea bond; and
            a core that is in the interior of the shell and contains a di- or lower functional polymerizable compound, a tri- or higher functional polymerizable compound, and a photopolymerization initiator,
            wherein a proportion of the di- or lower functional polymerizable compound is from 20% by mass to 90% by mass with respect to a total mass of the di- or lower functional polymerizable compound and the tri- or higher functional polymerizable compound,
            wherein a weight-average molecular weight of the di- or lower functional polymerizable compound is 250 to 500, and
            wherein a weight-average molecular weight of the tri- or higher functional polymerizable compound is 350 to 1200.

2. The composition according to claim 1, wherein the shell has a hydrophilic group.

3. The composition according to claim 1, wherein the shell has a polymerizable group bound by a covalent bond.

4. The composition according to claim 1, wherein C=C valence of the di- or lower functional polymerizable compound is 4 mmol/g to 8 mmol/g, and C=C valence of the tri- or higher functional polymerizable compound is 5 mmol/g to 10 mmol/g.

5. The composition according to claim 1, wherein the di- or lower functional polymerizable compound is a difunctional polymerizable compound.

6. The composition according to claim 1, wherein an absolute value of a difference between a solubility parameter of the di- or lower functional polymerizable compound and a solubility parameter of the tri- or higher functional polymerizable compound is 1.5 MPa$^{1/2}$ or less.

7. The composition according to claim 1, wherein the total mass of the di- or lower functional polymerizable compound and the tri- or higher functional polymerizable compound is 30% by mass to 70% by mass with respect to a total solid content of the microcapsule, and
the proportion of the di- or lower functional polymerizable compound is 50% by mass to 90% by mass with respect to the total mass.

8. The composition according to claim 1, wherein the photopolymerization initiator contains at least one of a carbonyl compound or an acylphosphine oxide compound.

9. The composition according to claim 1, wherein the core further contains a sensitizer.

10. The composition according to claim 1, further comprising:
    a colorant.

11. The composition according to claim 1, wherein a content of an anionic surfactant is 1% by mass or less with respect to a total mass of the aqueous dispersion.

12. The composition according to claim 1, wherein a total solid content of the microcapsule is 50% by mass or more with respect to a total solid content of the aqueous dispersion.

13. The composition according to claim 1, which is used as an ink jet ink.

14. An image forming method comprising:
    an application step of applying the composition according to claim 1 onto a substrate; and
    an irradiation step of irradiating the aqueous dispersion applied onto the substrate with active energy rays.

15. A composition comprising:
    an ink containing:
        water; and
        a microcapsule which comprises:
            a shell that has a three-dimensional cross-linked structure containing at least one bond selected from a urethane bond or a urea bond;
            a core that is in the interior of the shell and contains a di- or lower functional polymerizable compound, a tri- or higher functional polymerizable compound, and a photopolymerization initiator,
            wherein a proportion of the di- or lower functional polymerizable compound is from 20% by mass to 90% by mass with respect to a total mass of the di- or lower functional polymerizable compound and the tri- or higher functional polymerizable compound,
            wherein the shell has a hydrophilic group and a polymerizable group bound by a covalent bond,
            wherein a weight-average molecular weight of the di- or lower functional polymerizable compound is 250 to 500, and
            wherein a weight-average molecular weight of the tri- or higher functional polymerizable compound is 350 to 1200.

* * * * *